United States Patent
Lim et al.

(10) Patent No.: US 11,064,200 B2
(45) Date of Patent: Jul. 13, 2021

(54) ENCODING APPARATUS, DECODING APPARATUS, ENCODING METHOD, AND DECODING METHOD

(71) Applicant: Panasonic Intellectual Property Corporation of America, Torrance, CA (US)

(72) Inventors: Chong Soon Lim, Singapore (SG); Ru Ling Liao, Singapore (SG); Hai Wei Sun, Singapore (SG); Sughosh Pavan Shashidhar, Singapore (SG); Han Boon Teo, Singapore (SG); Takahiro Nishi, Nara (JP); Ryuichi Kanoh, Osaka (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/574,728

(22) Filed: Sep. 18, 2019

(65) Prior Publication Data
US 2020/0014925 A1    Jan. 9, 2020

Related U.S. Application Data

(63) Continuation of application No. PCT/JP2018/012305, filed on Mar. 27, 2018.
(Continued)

(51) Int. Cl.
*H04N 19/122* (2014.01)
*H04N 19/103* (2014.01)
(Continued)

(52) U.S. Cl.
CPC ......... *H04N 19/122* (2014.11); *H04N 19/103* (2014.11); *H04N 19/176* (2014.11); *H04N 19/513* (2014.11)

(58) Field of Classification Search
CPC .... H04N 19/176; H04N 19/61; H04N 19/513; H04N 19/122
See application file for complete search history.

(56) References Cited

U.S. PATENT DOCUMENTS

| | | | |
|---|---|---|---|
| 2009/0304084 A1* | 12/2009 | Hallapuro | H04N 19/593 375/240.16 |
| 2011/0194613 A1* | 8/2011 | Chen | H04N 19/107 375/240.24 |

(Continued)

FOREIGN PATENT DOCUMENTS

| WO | 2011/075071 | 6/2011 |
|---|---|---|

OTHER PUBLICATIONS

International Search Report (ISR) dated Jul. 3, 2018 in International (PCT) Application No. PCT/JP2018/012305.
(Continued)

*Primary Examiner* — Zhubing Ren
(74) *Attorney, Agent, or Firm* — Wenderoth, Lind & Ponack, L.L.P.

(57) ABSTRACT

An encoding apparatus includes: a circuit; and a memory. The circuit, using the memory: writes a first parameter that specifies an arrangement order for a plurality of parameters which includes a second parameter, into a header; writes a second parameter for a block into a bitstream according to the arrangement order wherein the second parameter, when positioned earlier in the arrangement order than later in the arrangement order, is written with less bits; and performs encoding operation for a block using the second parameter.

23 Claims, 50 Drawing Sheets

Related U.S. Application Data

(60) Provisional application No. 62/477,674, filed on Mar. 28, 2017, provisional application No. 62/477,634, filed on Mar. 28, 2017, provisional application No. 62/477,623, filed on Mar. 28, 2017.

(51) Int. Cl.
*H04N 19/176* (2014.01)
*H04N 19/513* (2014.01)

(56) References Cited

U.S. PATENT DOCUMENTS

| | | | |
|---|---|---|---|
| 2012/0250765 A1 | 10/2012 | Wu et al. | |
| 2012/0250766 A1 | 10/2012 | Wu et al. | |
| 2012/0307903 A1* | 12/2012 | Sugio | H04N 19/107 375/240.16 |
| 2012/0314766 A1* | 12/2012 | Chien | H04N 19/11 375/240.12 |
| 2013/0142259 A1* | 6/2013 | Lim | H04N 19/176 375/240.12 |
| 2017/0251213 A1* | 8/2017 | Ye | H04N 19/513 |

OTHER PUBLICATIONS

ITU-T Recommendation H.265, "High efficiency video coding", Apr. 2015.

Jianle Chen, et al., "Algorithm Description of Joint Exploration Test Model 1", Joint Video Exploration Team (JVET) of ITU-T SG 16 WP 3 and ISO/IEC JTC 1/SC 29/WG 11, Document: JVET-A1001, Oct. 2015, pp. 1-25.

Jianle Chen, et al., "Algorithm Description of Joint Exploration Test Model 5", Joint Video Exploration Team (JVET) of ITU-T SG 16 WP 3 and ISO/IEC JTC 1/SC 29/WG 11, Document: JVET-E1001_v1, Jan. 2017, pp. 1-41.

* cited by examiner

FIG. 3

| TRANSFORM TYPE | BASIS FUNCTION $T_i(j)$, $i, j = 0, 1, ..., N - 1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$<br>WHERE $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$<br>WHERE $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ | ual
ENCODING APPARATUS, DECODING APPARATUS, ENCODING METHOD, AND DECODING METHOD

CROSS REFERENCE TO RELATED APPLICATIONS

This application is a U.S. continuation application of PCT International Patent Application Number PCT/JP2018/012305 filed on Mar. 27, 2018, claiming the benefit of priority of U.S. Provisional Patent Application Ser. Nos. 62/477,623, 62/477,634, and 62/477,674 all filed on Mar. 28, 2017, the entire contents of which are hereby incorporated by reference.

BACKGROUND

1. Technical Field

The present disclosure can be used in any multimedia data coding and, more particularly, in image and video coding.

2. Description of the Related Art

In conventional image and video coding methods, an image is typically partitioned into blocks and encoding and decoding processes are performed at block level. In the most recent video codec development, a significant number of coding tools are utilized at the block level to improve coding efficiency. These tools are typically adapted at the block level, which includes enabling and disabling each of these tools, to improve the performance and such block level adaptation are signaled to the decoder using parameters at each block level of the compressed bitstream.

SUMMARY

There is a demand to improve coding efficiency.

An encoding apparatus according to an aspect of the present disclosure includes: a circuit; and a memory, wherein the circuit, using the memory: writes a first parameter that specifies an arrangement order for a plurality of parameters which includes a second parameter, into a header; writes a second parameter for a block into a bitstream according to the arrangement order wherein the second parameter, when positioned earlier in the arrangement order than later in the arrangement order, is written with less bits; and performs encoding operation for a block using the second parameter.

A decoding apparatus according to an aspect of the present disclosure includes: a circuit; and a memory, wherein the circuit, using the memory: parses a first parameter that specifies an arrangement order for a plurality of parameters which includes a second parameter, from a header; parses a second parameter for a block from a bitstream according to the arrangement order wherein the second parameter, when positioned earlier in the arrangement order than later in the arrangement order, is parsed with less bits; and performs decoding operation for a block using the second parameter.

According to the present disclosure, it is possible to improve coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

DETAILED DESCRIPTION OF THE EMBODIMENTS

Figure 1:
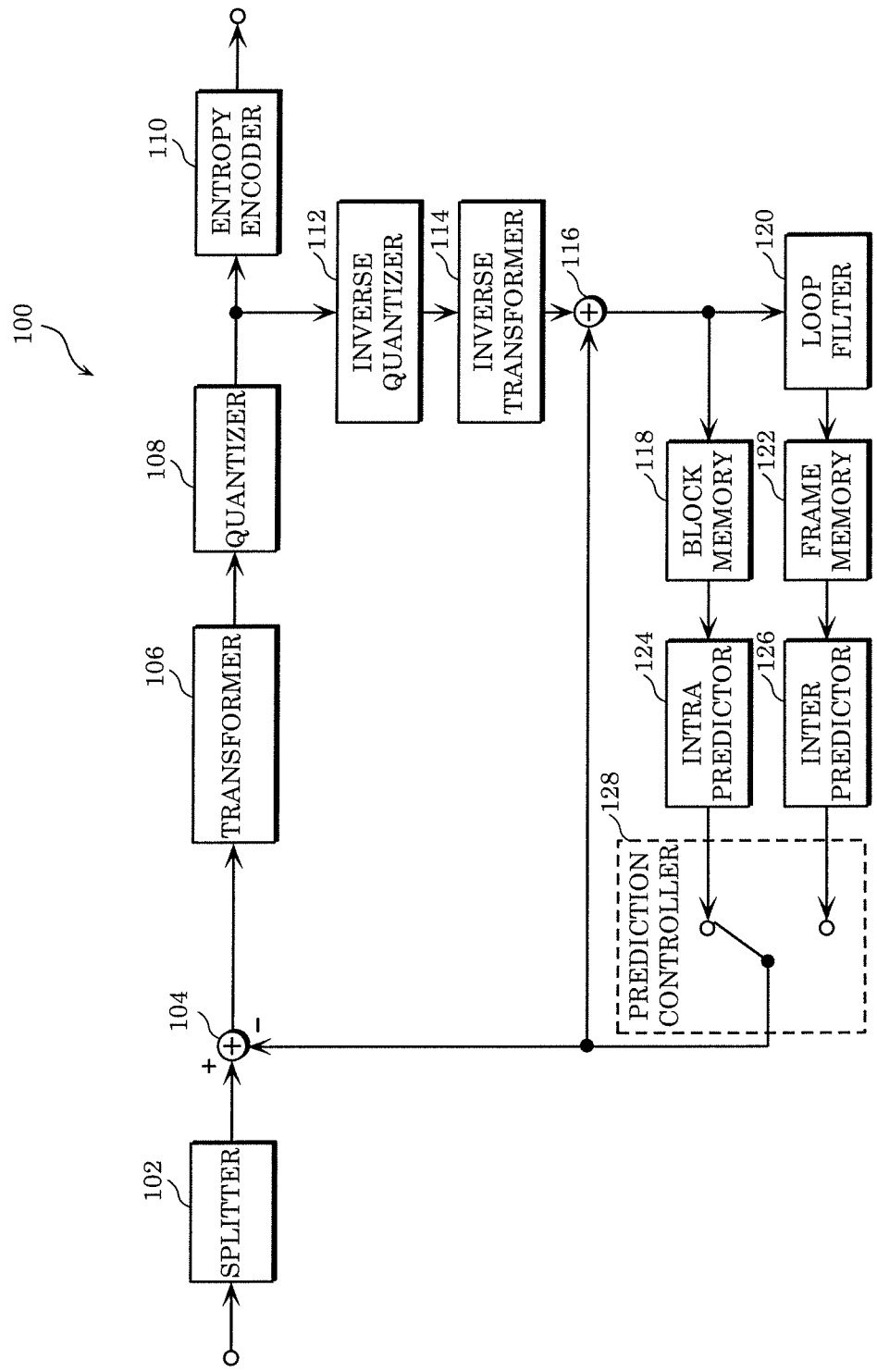
FIG. 1 is a block diagram illustrating a functional configuration of the encoder according to Embodiment 1.

To achieve more compression efficiency, the general approach in the latest video codec development is to add more coding tools at the block level. By exhaustively testing with significant number of coding tools, a typical video encoder can choose the best combination of coding tools that achieves the best performance in compressing an image block. However, not all coding tools are useful for all use cases. For example, a number of tools are only useful for particular type of video, particular compression rates etc. In these cases, only after consolidating all the decisions made for all the blocks of a picture, a particular tool is then judged to be not effective for the picture. In these cases, there will be redundancy in signaling parameters related to that particular coding tool at the block level during the encoding process of the block as it was required to support adaptively for the coding tool.

To solve the above problem, current disclosure introduces new methods of flexible syntax structure to add more flexibility in signaling parameters for coding tools at the block level of a picture. Based on the current disclosure, new parameters are written and parsed at a picture header or a slice header to control the signaling of the block level parameters and a second encoding process is used to determine these parameters based on the first encoding process of a picture. By controlling the block level parameters, the current disclosure improves the coding efficiency by reducing the redundancy in signaling the block specific parameters for a coding tool whenever a coding tool is judged not to be optimum for a picture.

What is novel about current disclosure is that, as compared to prior arts, current disclosure introduces a two pass encoding scheme and a flexible block level syntax structure to improve the compression efficiency.

Accordingly, video coding tools can be adapted for different type of processed images. Thus the effect of the disclosure is in the form of improving compression efficiency.

The details of the present disclosure are described in the following. It will be apparent to those skilled in the art that combinations of the described embodiments can be carried out to further increase the benefit of the present disclosure.

Hereinafter, embodiment(s) will be described with reference to the drawings. Note that the embodiment(s) described below each show a general or specific example. The numerical values, shapes, materials, components, the arrangement and connection of the components, steps, order of the steps, etc., indicated in the following embodiment(s) are mere examples, and therefore are not intended to limit the scope of the claims. Therefore, among the components in the following embodiment(s), those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) Regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

(Encoder Outline)

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

(Splitter)

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
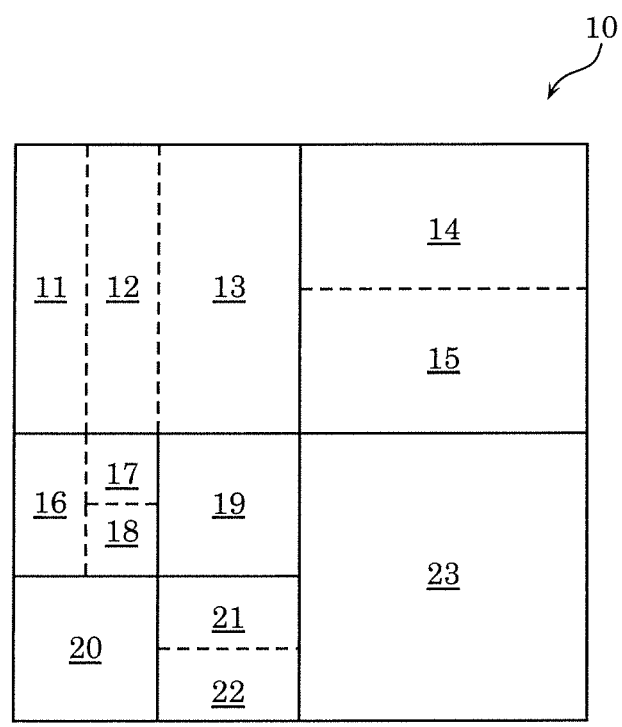
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

(Subtractor)

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

(Transformer)

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signaled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signaled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

(Quantizer)

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

(Entropy Encoder)

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

(Inverse Quantizer)

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

(Inverse Transformer)

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

(Adder)

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

(Block Memory)

Block memory 118 is storage for storing blocks in a picture to be encoded (hereinafter referred to as a current picture) for reference in intra prediction. More specifically, block memory 118 stores reconstructed blocks output from adder 116.

(Loop Filter)

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
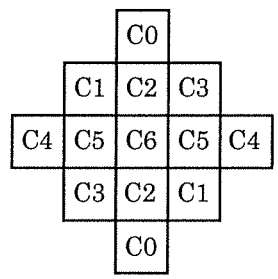
FIG. 4A illustrates one example of a filter shape used in ALF.
Figure 4B:
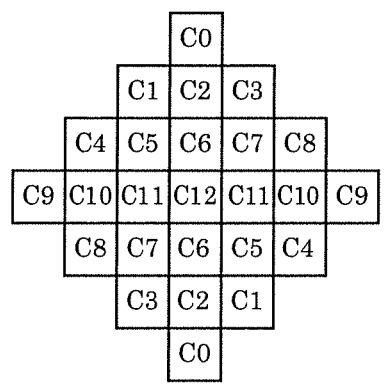
FIG. 4B illustrates another example of a filter shape used in ALF.
Figure 4C:
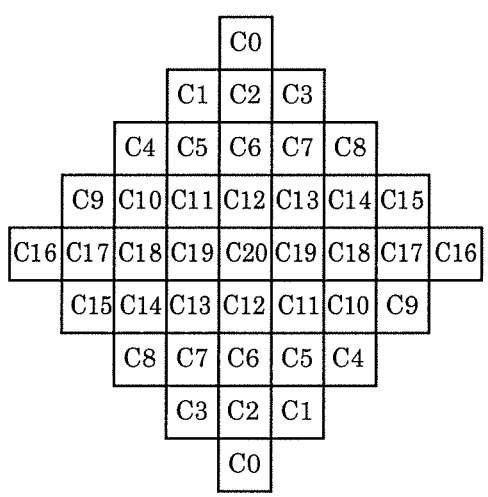
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signaled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signaled at the picture level or CU level. Note that the signaling of information indicating whether ALF is enabled or disabled need not be performed at the picture level or CU level, and may be performed at another level (for example, at the sequence level, slice level, tile level, or CTU level). The coefficients set for the plurality of selectable filters (for example, 15 or 25 filters) is signaled at the picture level. Note that the signaling of the coefficients set need not be performed at the picture level, and may be performed at another level (for example, at the sequence level, slice level, tile level, CTU level, CU level, or sub-block level).

(Frame Memory)

Frame memory 122 is storage for storing reference pictures used in inter prediction, and is also referred to as a frame buffer. More specifically, frame memory 122 stores reconstructed blocks filtered by loop filter 120.

(Intra Predictor)

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128. For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see: ITU-T Recommendation H.265 "High efficiency video coding", April 2015 (Non Patent Literature 1); and Joint Video Exploration Team (JVET) of ITU-T SG16 WP3 and ISO/IEC JTC1/SC29/WG11 1nd Meeting: Geneva, CH, 19-21 Oct. 2015, JVET-A1001, "Algorithm Description of Joint Exploration Test Model 1" (Non Patent Literature 2)).

Figure 5A:
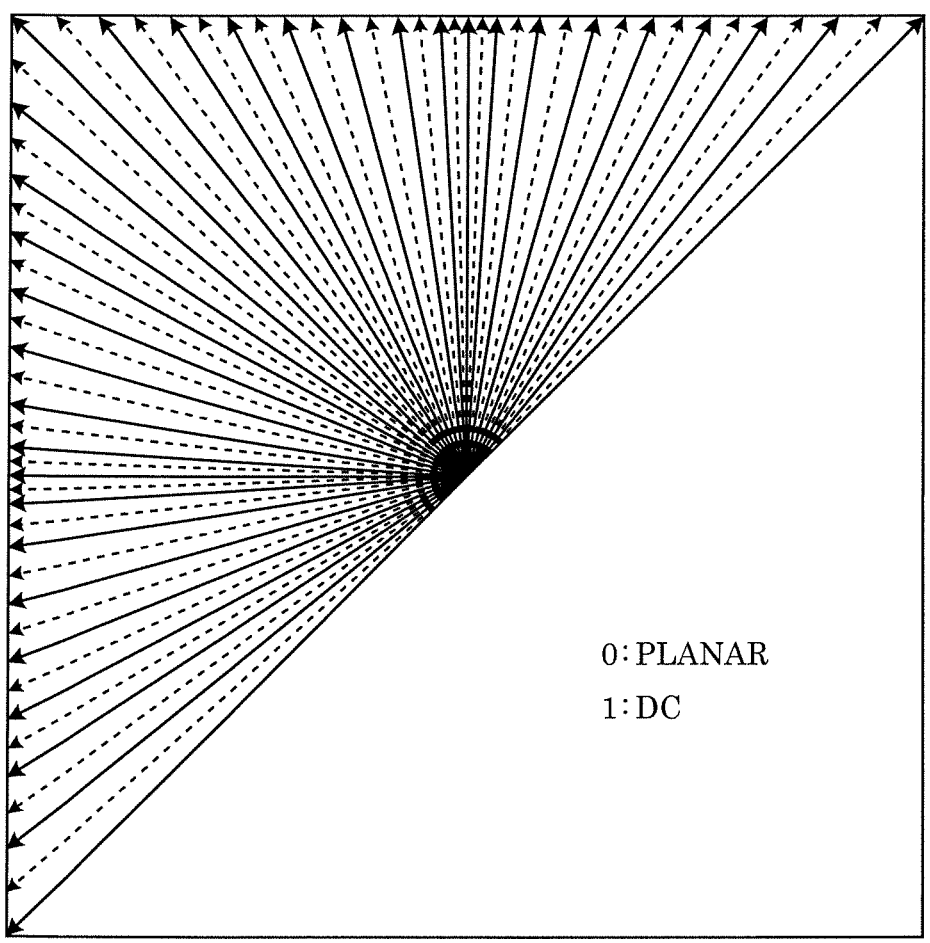
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signaled at the CU level. Note that the signaling of this information need not be performed at the CU level, and may be performed at another level (for example, on the sequence level, picture level, slice level, tile level, or CTU level).

(Inter Predictor)

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signaled. A motion vector predictor may be used for the signaling of the motion vector. In other words, the difference between the motion vector and the motion vector predictor may be signaled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signaled at the sequence level. Moreover, information indicating whether to apply the OBMC mode or not (referred to as, for example, an OBMC flag) is signaled at the CU level. Note that the signaling of such information need not be performed at the sequence level and CU level, and may be performed at another level (for example, at the picture level, slice level, tile level, CTU level, or sub-block level).

Figure 5B:
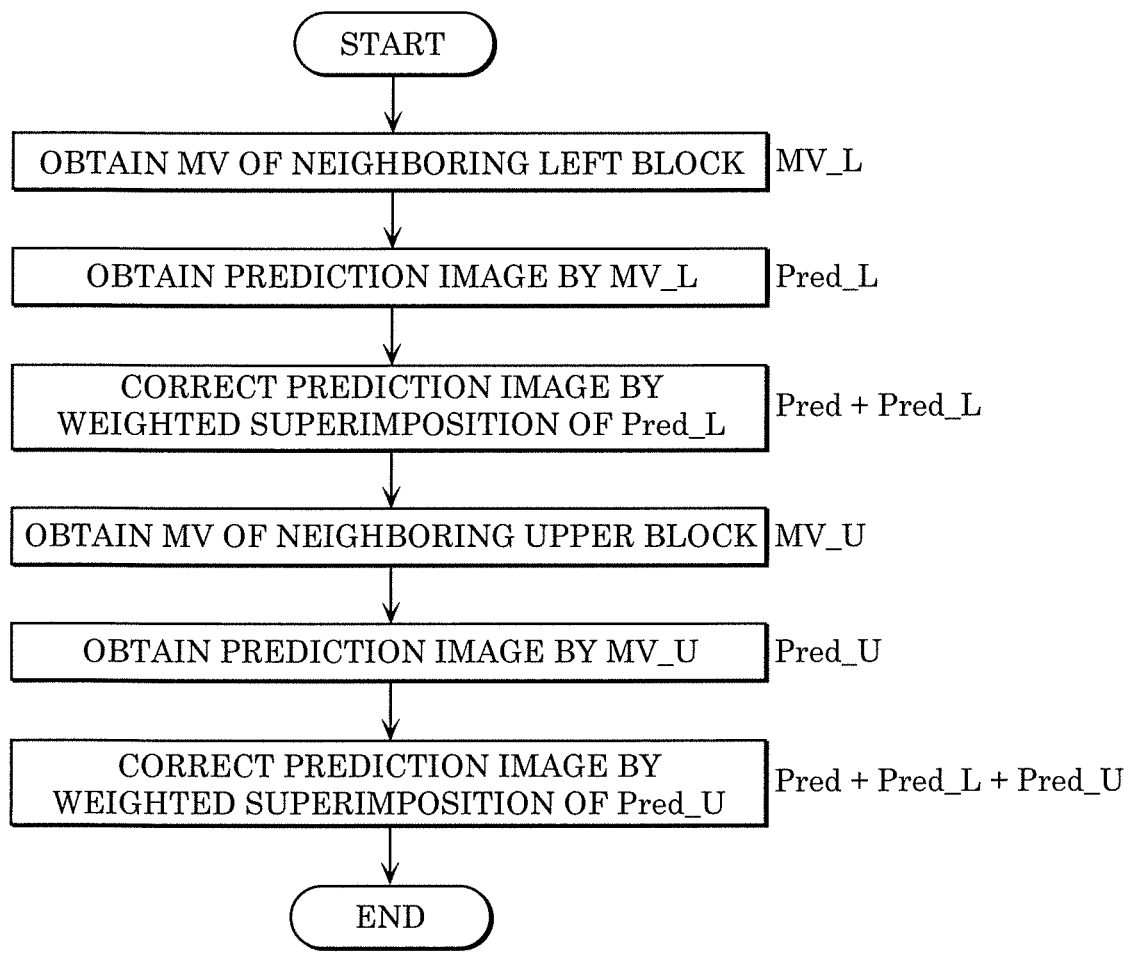
FIG. 5B is a flowchart for illustrating an outline of a prediction image correction process performed via OBMC processing.
Figure 5C:
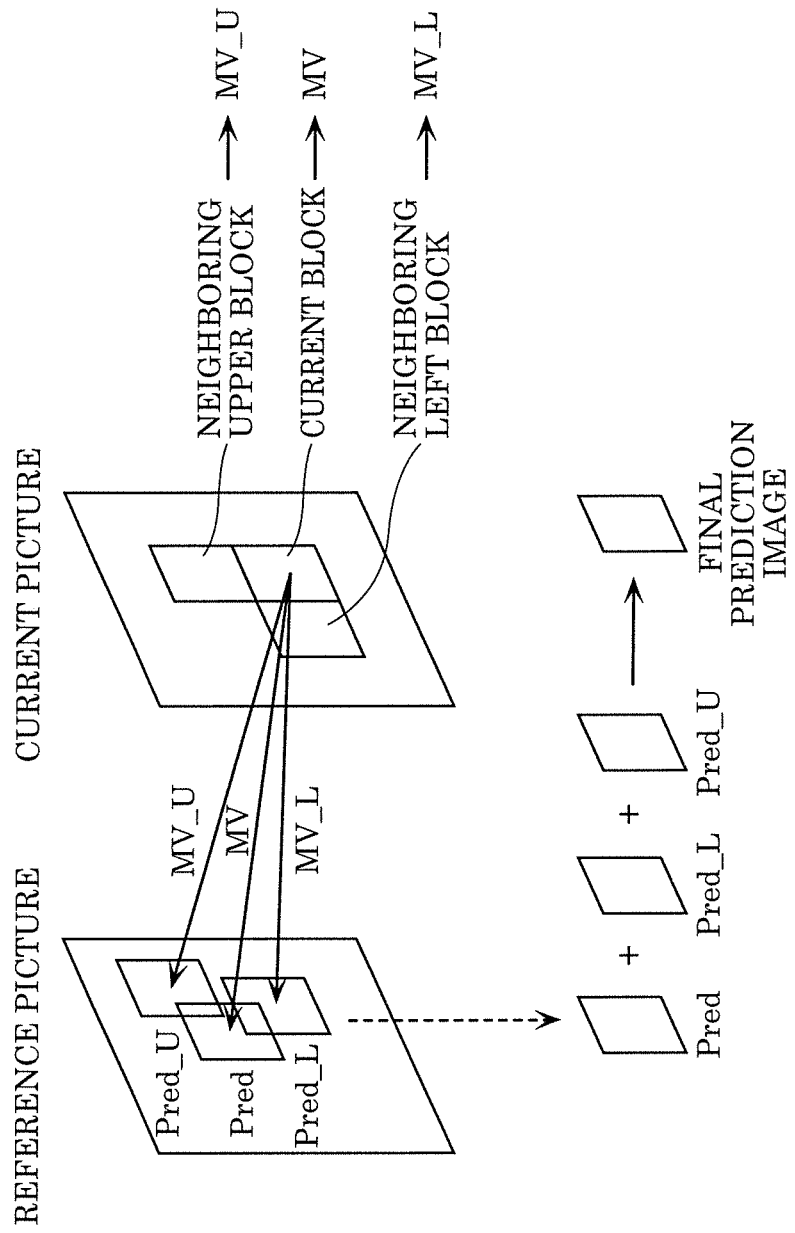
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signaled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
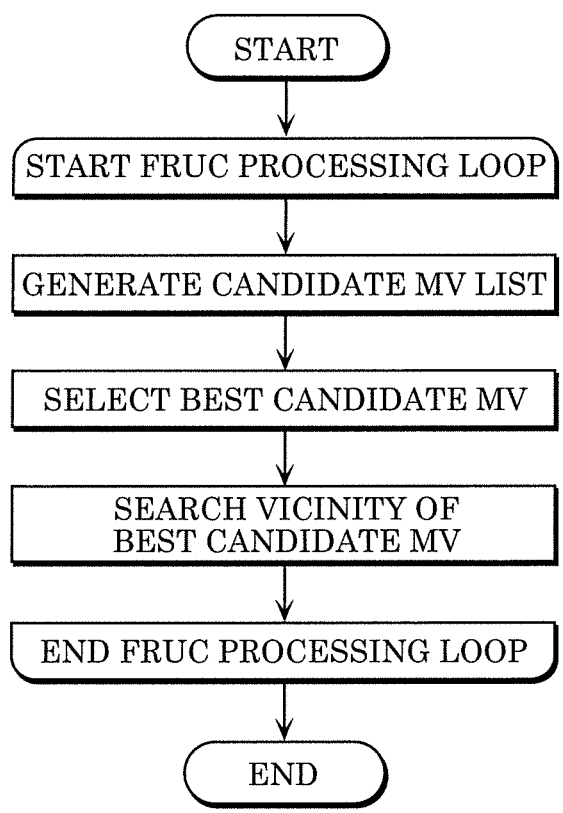
FIG. 5D illustrates one example of FRUC.

One example of FRUC processing is illustrated in FIG. 5D. First, a candidate list (a candidate list may be a merge list) of candidates each including a prediction motion vector is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

First, one candidate included in a merge list is selected as the starting point for the search by pattern matching. The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
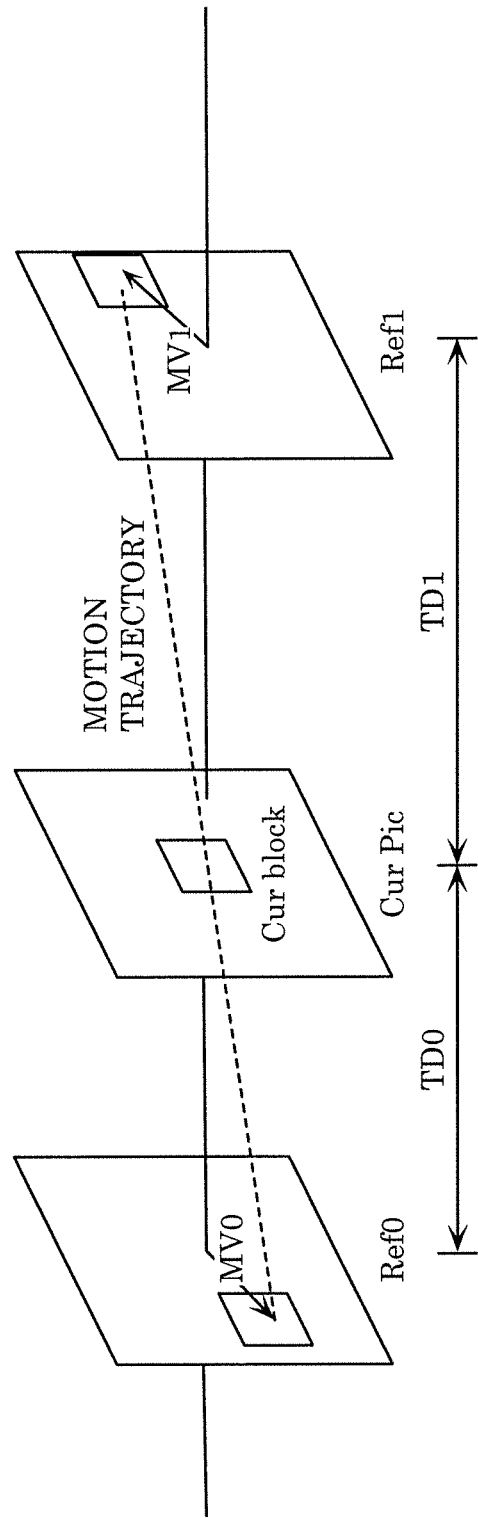
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (1) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
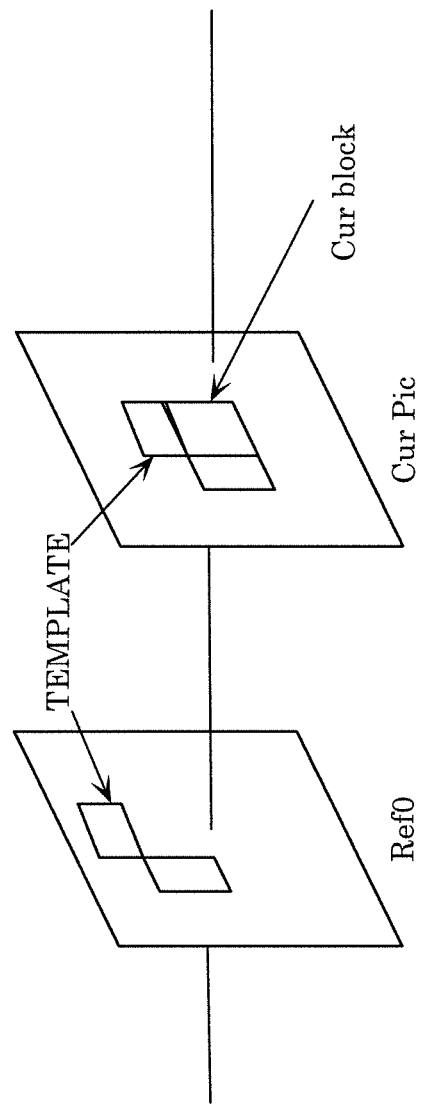
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signaled at the CU level. Moreover, when the FRUC mode is applied (for example, when the FRUC flag is set to true), information indicating the pattern matching method (first pattern matching or second pattern matching) is signaled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
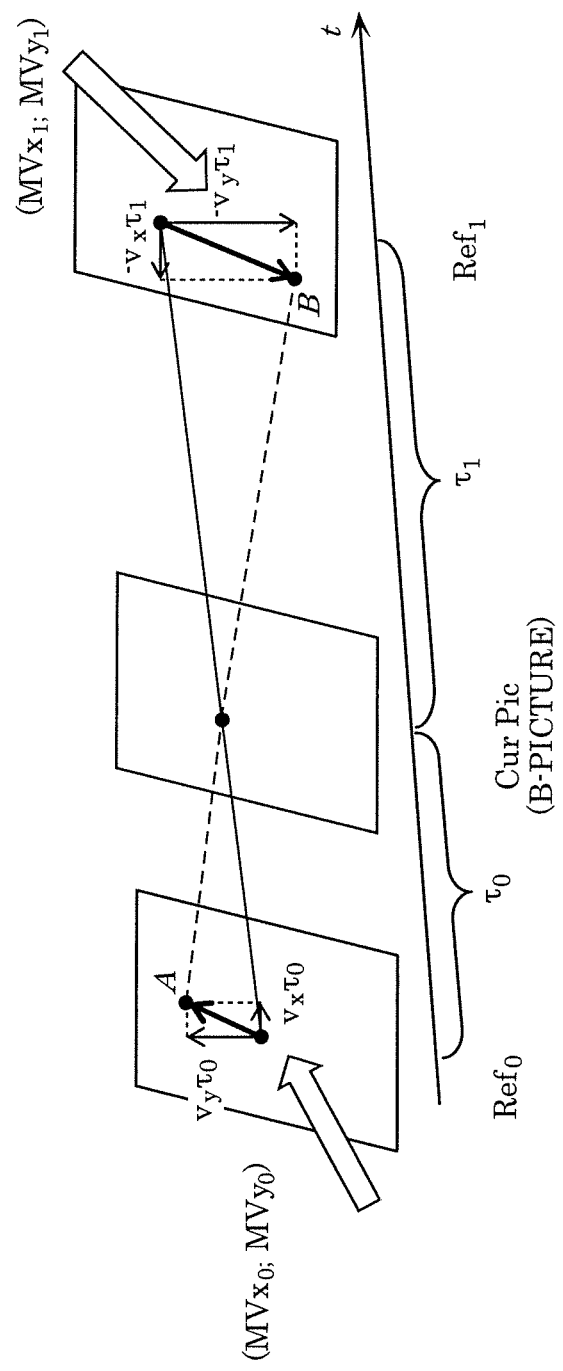
FIG. 8 is for illustrating a model assuming uniform linear motion.

FIG. 8 is for illustrating a model assuming uniform linear motion. In FIG. 8, (vx, vy) denotes a velocity vector, and τ0 and τ1 denote temporal distances between the current picture (Cur Pic) and two reference pictures (Ref0, Ref1). (MVx0, MVy0) denotes a motion vector corresponding to reference picture Ref0, and (MVx1, MVy1) denotes a motion vector corresponding to reference picture Ref1.

Here, under the assumption of uniform linear motion exhibited by velocity vector (vx, vy), (MVx0, MVy0) and (MVx1, MVy1) are represented as (vxτ0, vyτ0) and (−vxτ1, −vyτ1), respectively, and the following optical flow equation is given.

[MATH1]

$$\partial I^{(k)}/\partial t + v_x \partial I^{(k)}/\partial x + v_y \partial I^{(k)}/\partial y = 0$$

Here, I(k) denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
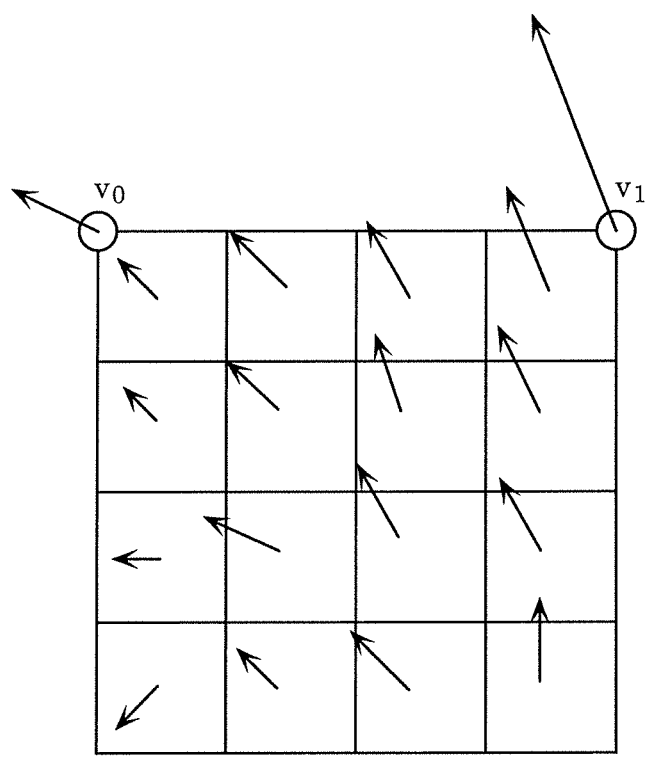
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector v0 of the top left corner control point in the current block is derived based on motion vectors of neighboring sub-blocks, and motion vector v1 of the top right corner control point in the current block is derived based on motion vectors of neighboring blocks. Then, using the two motion vectors v0 and v1, the motion vector (vx, vy) of each sub-block in the current block is derived using Equation 2 below.

[MATH 2]

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signaled at the CU level. Note that the signaling of information indicating the affine motion compensation prediction mode need not be performed at the CU level, and may be performed at another level (for example, at the sequence level, picture level, slice level, tile level, CTU level, or sub-block level).

(Prediction Controller)

Prediction controller 128 selects either the intra prediction signal or the inter prediction signal, and outputs the selected prediction signal to subtractor 104 and adder 116.

Figure 9B:
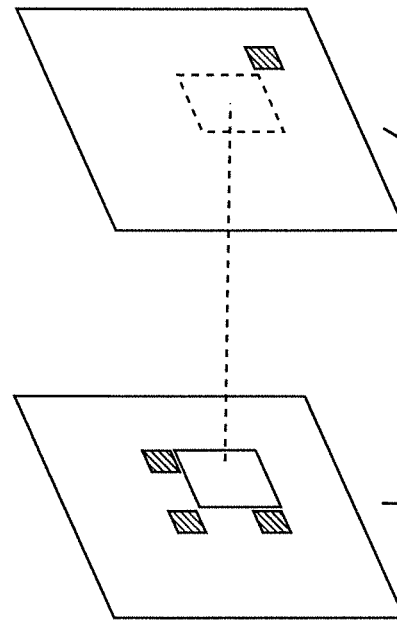
FIG. 9B is for illustrating an outline of a process for deriving a motion vector via merge mode.

Here, an example of deriving a motion vector via merge mode in a current picture will be given. FIG. 9B is for illustrating an outline of a process for deriving a motion vector via merge mode.

First, a prediction MV list in which prediction MV candidates are registered is generated. Examples of prediction MV candidates include: a spatially neighboring prediction MVs, which are MVs of encoded blocks positioned in the spatial vicinity of the current block; a temporally neighboring prediction MV, which is an MV of a block in an encoded reference picture that neighbors a block in the same location as the current block; a coupled prediction MV, which is an MV generated by combining the MV values of the spatially neighboring prediction MV and the temporally neighboring prediction MV; and a zero prediction MV, which is an MV whose value is zero.

Next, the MV of the current block is determined by selecting one prediction MV from among the plurality of prediction MVs registered in the prediction MV list.

Furthermore, in the variable-length encoder, a merge_idx, which is a signal indicating which prediction MV is selected, is written and encoded into the stream.

Note that the prediction MVs registered in the prediction MV list illustrated in FIG. 9B constitute one example. The number of prediction MVs registered in the prediction MV list may be different from the number illustrated in FIG. 9B, the prediction MVs registered in the prediction MV list may omit one or more of the types of prediction MVs given in the example in FIG. 9B, and the prediction MVs registered in the prediction MV list may include one or more types of prediction MVs in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
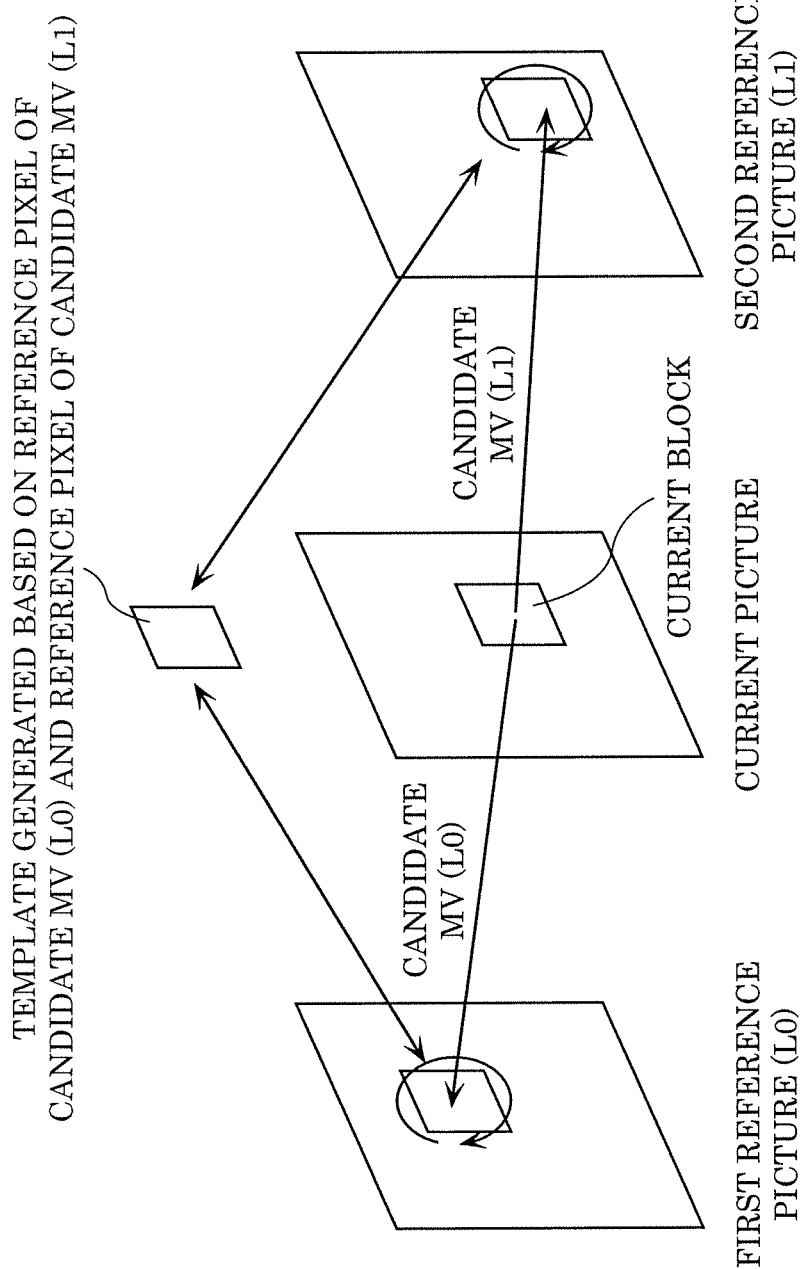
FIG. 9C is a conceptual diagram for illustrating an outline of DMVR processing.

FIG. 9C is a conceptual diagram for illustrating an outline of DMVR, processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value. Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
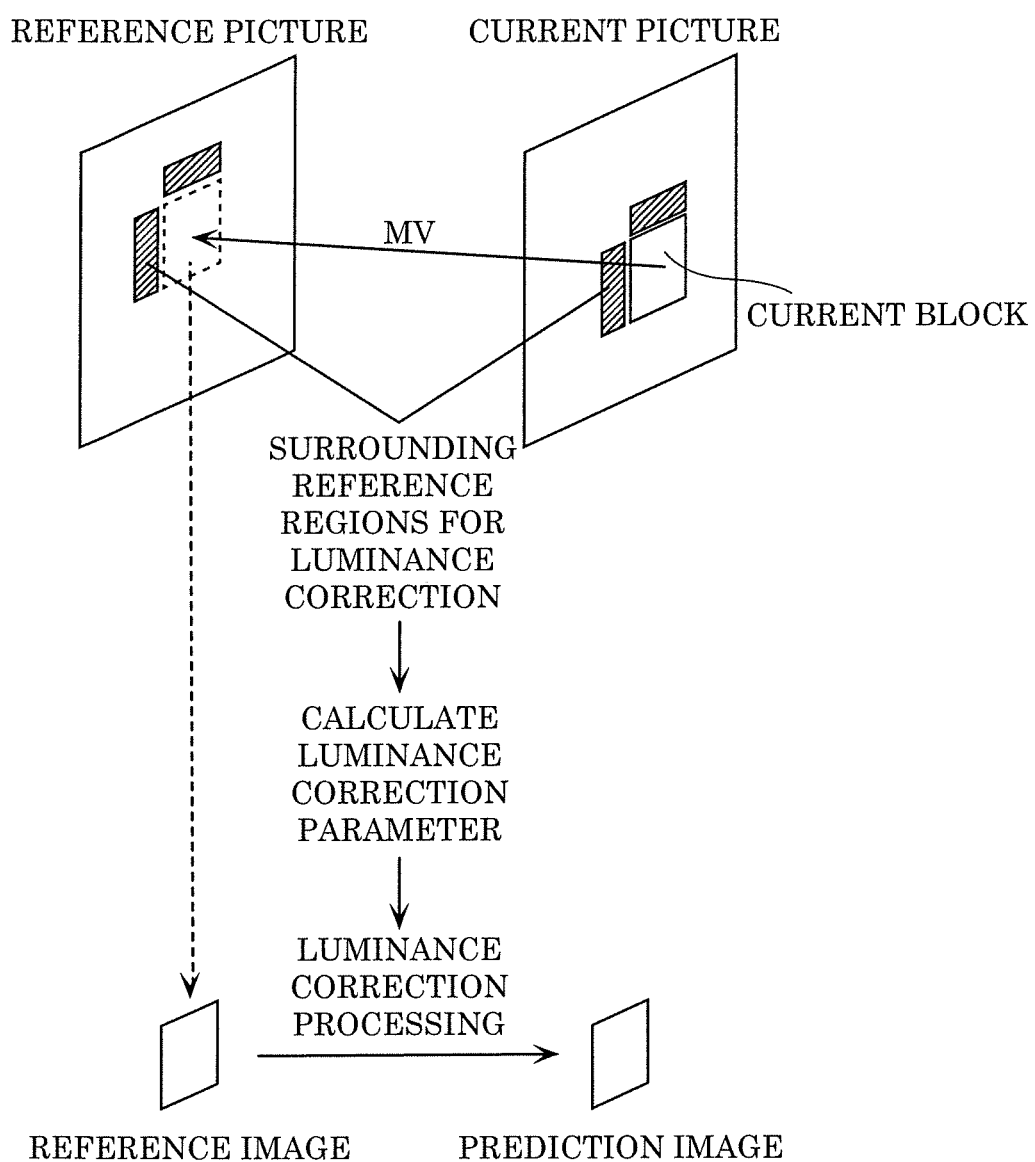
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left surrounding reference region and the encoded upper surrounding reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

(Decoder Outline)

Figure 10:
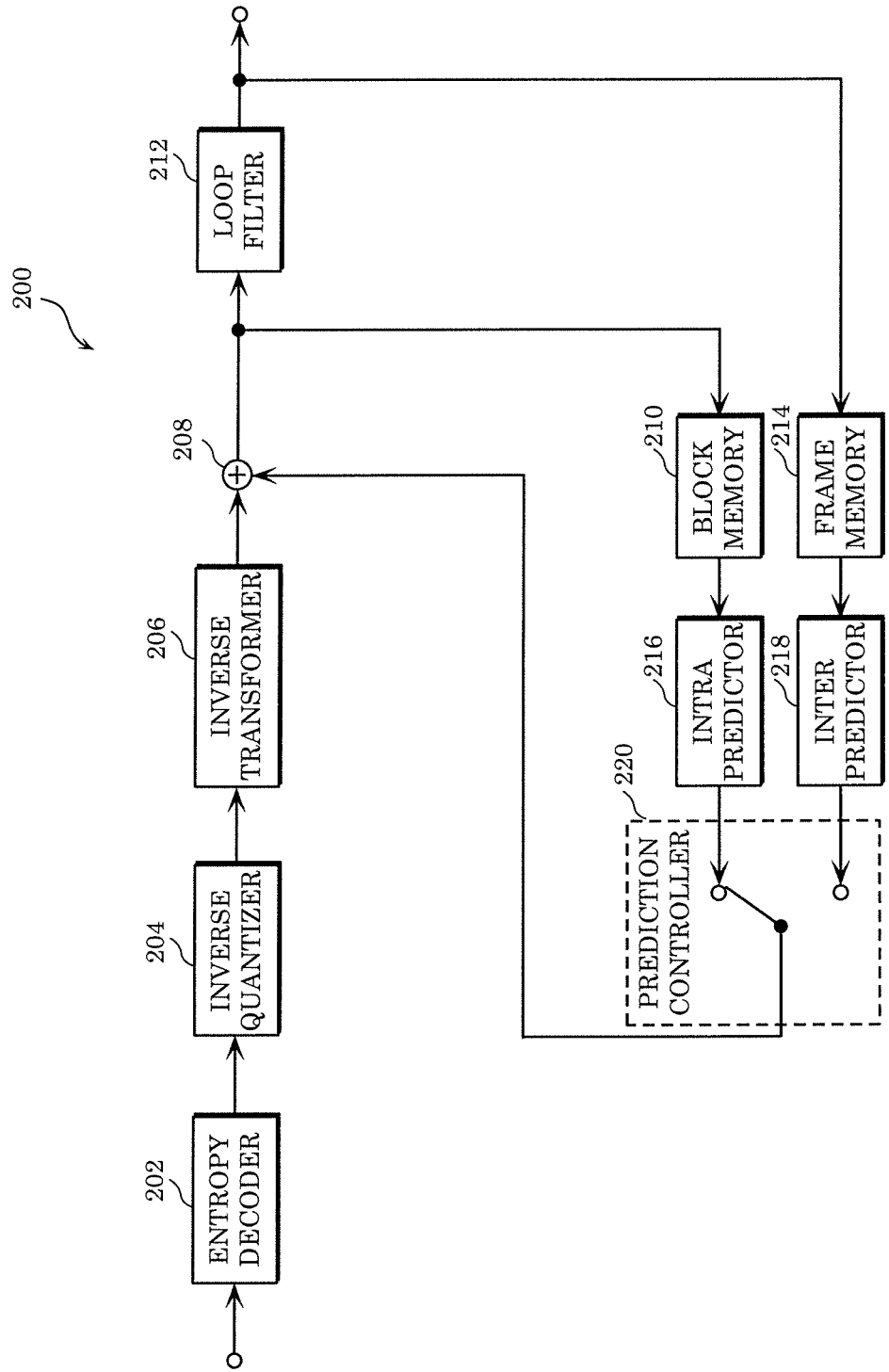
FIG. 10 is a block diagram illustrating a functional configuration of the decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

(Entropy Decoder)

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

(Inverse Quantizer)

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

(Inverse Transformer)

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

(Adder)

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

(Block Memory)

Block memory 210 is storage for storing blocks in a picture to be decoded (hereinafter referred to as a current picture) for reference in intra prediction. More specifically, block memory 210 stores reconstructed blocks output from adder 208.

(Loop Filter)

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

(Frame Memory)

Frame memory 214 is storage for storing reference pictures used in inter prediction, and is also referred to as a frame buffer. More specifically, frame memory 214 stores reconstructed blocks filtered by loop filter 212.

(Intra Predictor)

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

(Inter Predictor)

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

(Prediction Controller)

Prediction controller 220 selects either the intra prediction signal or the inter prediction signal, and outputs the selected prediction signal to adder 208.

At least of a portion of this aspect may be combined with at least a portion of one or more of other aspects. A portion of the process in flow charts, a part of the devices, syntax, and/or other features may be combined with the other aspects.

Embodiment 2

Figure 11:
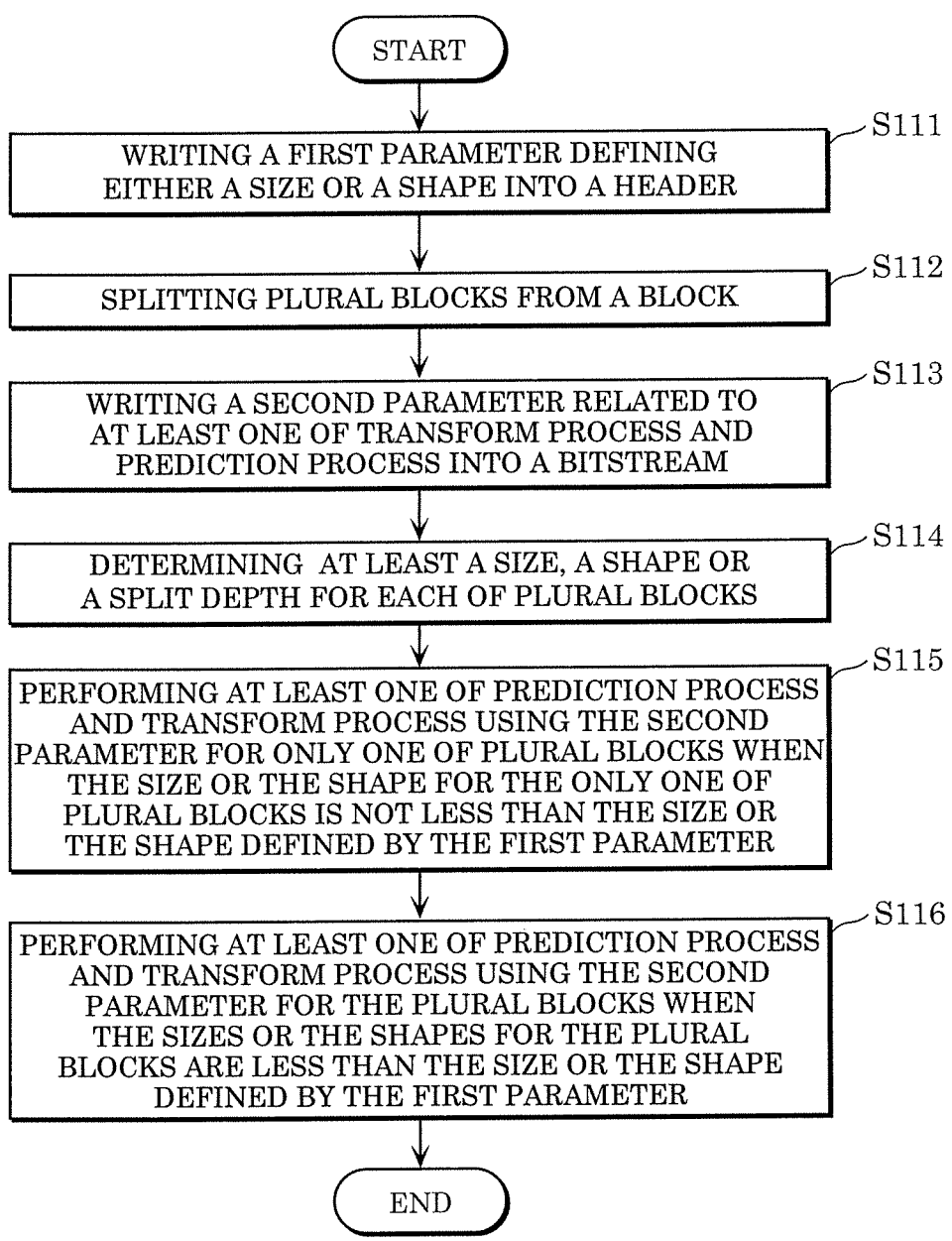
FIG. 11 is a flowchart showing a video encoding process according to Embodiment 2.
Figure 12:
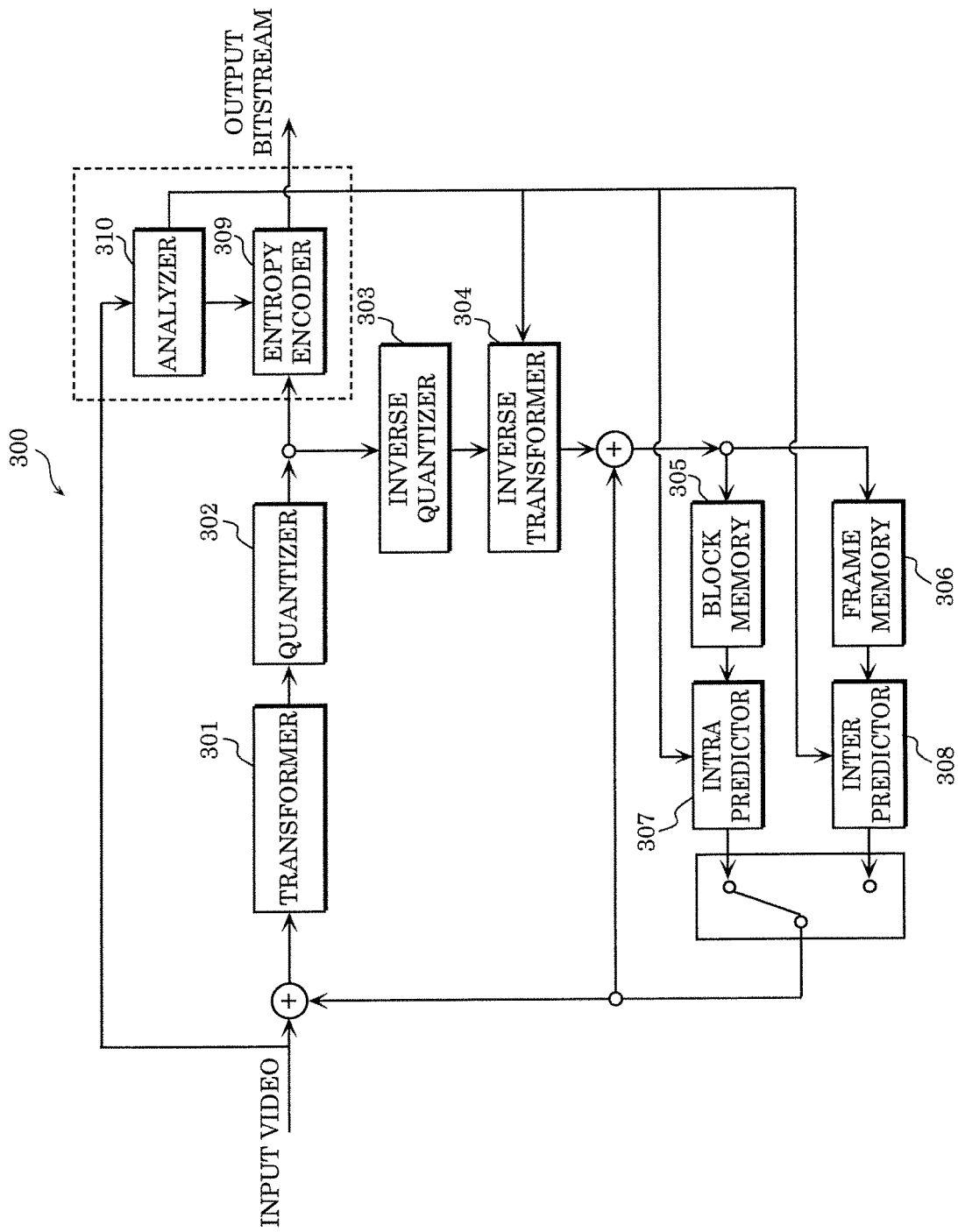
FIG. 12 is a block diagram showing an exemplary structure of video/image encoding apparatus for embodiments.

Method for encoding video using flexible syntax structure will be described according to an embodiment of the present disclosure as illustrated in FIG. 11. An apparatus for encoding video using flexible syntax structure will be described according to an embodiment of the present disclosure as illustrated in FIG. 12.

(Encoding Process)

Figure 13:
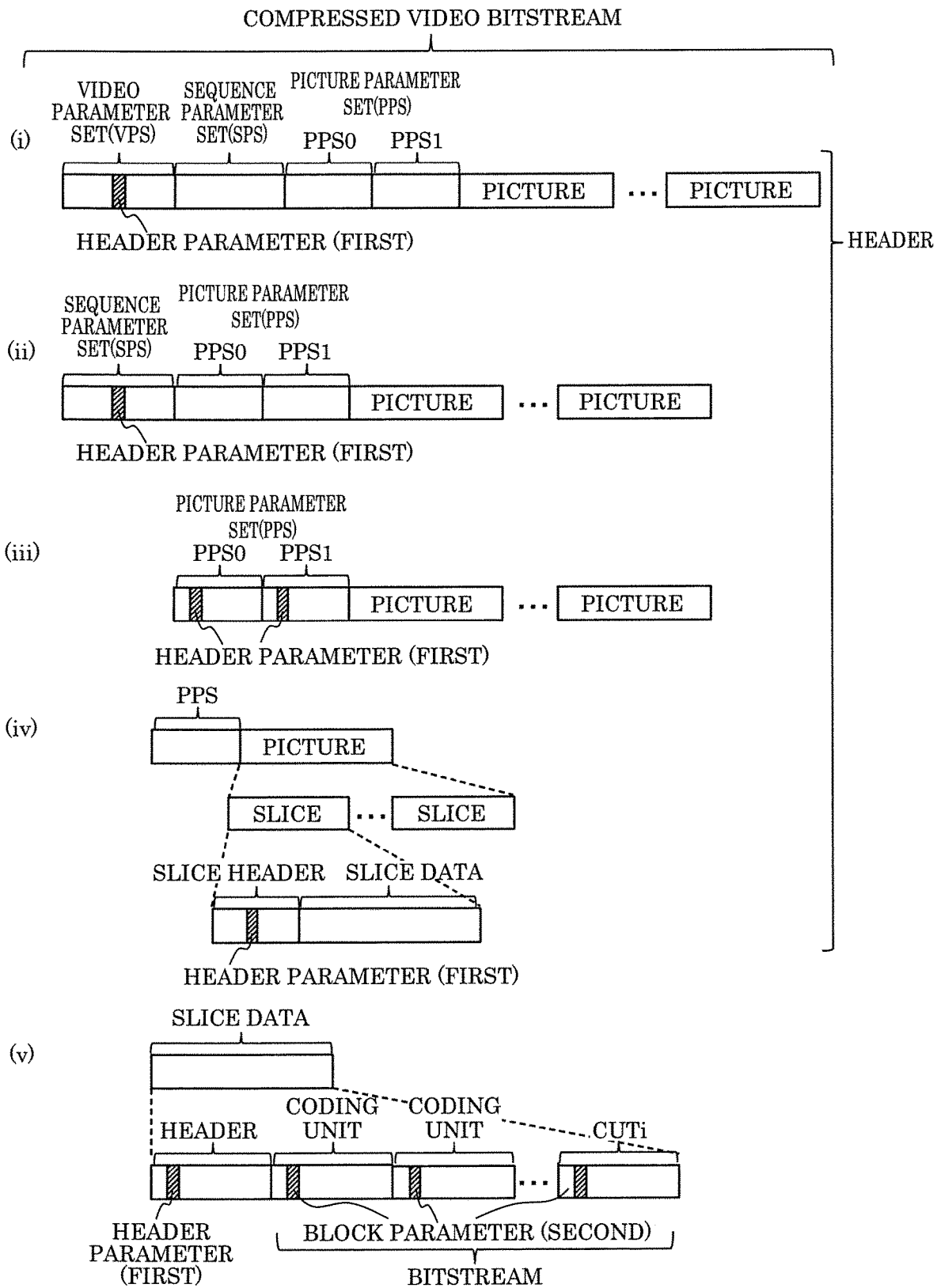
FIG. 13 is a diagram showing example locations for the header parameter and block parameter.

FIG. 11 shows a video encoding process according to Embodiment 2. As a first step S111, a first parameter defining either at least a size or a shape is written into a header. Examples of the header can be one of a video parameter set, a sequence parameter set, a picture parameter set, a slice header or an initial part of a slice data as shown in FIG. 13. The first parameter defines a minimum for one of the following attributes: a size or a shape and blocks that have attributes smaller than the minimum will have a different operation than blocks having attributes not smaller than the minimum. The first parameter can also define one or more pre-determined block shapes. The first parameter can also define a maximum split depth which defines a plurality of minimum shapes or a plurality of minimum sizes indirectly. The split depth is the number of splits operation and a specific number of split depth may define a plurality of shapes or a plurality of sizes.

At step S112, at least two blocks will be split from a single block. Then a second parameter related to at least one of the transform process and prediction process is written into a bitstream at step S113.

Examples of the second parameter can be at least one of a mode selection parameter selecting one out of plural intra prediction modes or a mode selection parameter for selecting one out of plural inter picture prediction modes which include at least one of a skip mode and a merge mode.

More examples of the second parameter can be at least one of a reference picture index, an inter prediction mode and a motion vector predictor index. The reference picture index selects a reference picture from a plurality of reference picture, the inter prediction mode selects at least a prediction from single or a prediction from plural reference pictures and the motion vector predictor index selects one of plural motion vector predictors.

More examples of the second parameter can be at least one of an intra most probable mode, an intra most probable mode index, an intra selected mode, an intra selected mode index, an intra luminance prediction mode and an intra chrominance prediction mode. The intra most probable mode decides whether intra luminance prediction mode is inferred from a plurality of neighboring intra-predicted blocks, the intra most probable mode index selects one of intra luminance prediction mode from plural intra prediction modes of neighboring intra-predicted blocks, the intra selected mode decides whether intra luminance prediction mode is selected from a set of intra prediction mode, wherein said a set of intra prediction mode is a group of intra prediction modes which contains at least one of intra prediction mode but not all of intra prediction modes. The intra selected mode index selects one of intra luminance prediction mode from a set of intra prediction mode, the intra luminance prediction mode selects one of intra prediction mode from plural intra prediction modes, the intra chrominance prediction mode selects one of intra chrominance prediction mode from plural intra chrominance prediction modes, wherein intra chrominance prediction mode can be at least one of an intra prediction mode derived from luminance prediction mode, an intra prediction mode predicted between chrominance components and an intra prediction mode.

More examples of the second parameter can be at least one of a transform mode, a multiple transform mode, a transform matrix index, a transform coded block flag, a secondary transform mode and a secondary transform matrix index. The transform mode decides whether transform is applied to the block or not, the multiple transform mode selects one or multiple transform matrix candidates from transform matrix set, wherein said transform matrix set is a group of orthogonal transform matrix, the transform matrix index selects one of transform matrix from transform matrix set, the transform coded block flag indicates whether coefficients are equal to zero or not, the secondary transform mode decides whether transform is applied to the coefficient block and the secondary transform matrix index selects one of transform matrix from a secondary transform matrix set, wherein said secondary transform matrix set contains at least one of transform matrix and said secondary transform matrix set may depend on block size.

There can be one or more types of second parameter depending on the first parameter. One type of second parameter is shared among plural blocks while another type of parameter is tied to only one block. The selection between the two or more types of second parameter is dependent on the first parameter.

Next at step S114, a size or a shape is determined for each of the plural blocks. In another possible embodiment, at step S114, a split depth is determined for each of the plural blocks The plural blocks are split recursively from a larger block and one of the block attributes like the size of the block or the shape of the block is determined to be compared with a size or a shape based on the first parameter. The first parameter may also define a plurality of sizes or shapes using a split depth.

When it is judged that the block size or the block shape for one of the plural blocks is equal to or not less than the size or equal to the shape defined by the first parameter, at least one of prediction process and transform process is performed using the second parameter for the one of the plural blocks at step S115.

In another possible embodiment, if the first parameter defines a split depth, at step S115, when it is judged that the split depth for one of the plural blocks is not greater than the split depth defined by the first parameter, at least one of prediction process and transform process is performed using the second parameter for the one of the plural blocks.

In another words, the first parameter defines either at least a shape, a minimum size or a maximum split depth at which the second parameter is signaled in a bitstream. Blocks with shape not equal to the defined shapes, with size less than the minimum size or with split depth greater than the maximum split depth will share the second parameter with another block.

Figure 14:
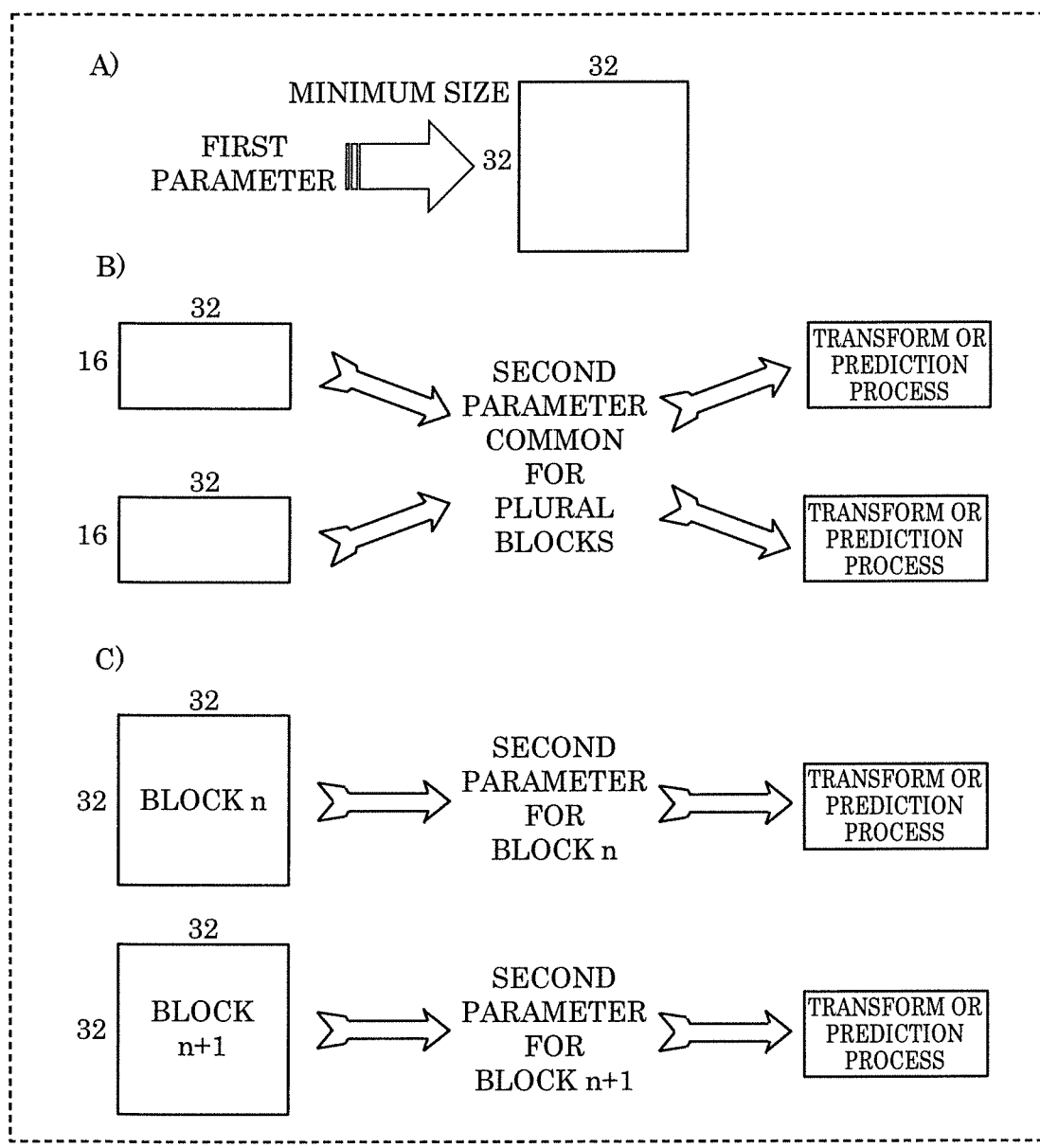
FIG. 14 is a diagram showing an example of plural blocks using the same second parameter based on a minimum size for one of prediction process and transform process.

Thus at step S116, when it is judged that the block sizes for the plural blocks are not equal to or less than the size by the first parameter, at least one of prediction processes and transform processes are performed using the second parameter for the plural blocks. The plural blocks share the same second parameter. FIG. 14 shows an example on plural blocks using the same second parameter when the block sizes are less than the size defined by the first parameter. As shown in the figure, the first parameter defines a minimum size for a block (e.g. 32×32). As the plural 32 by 16 blocks are both smaller than the minimum size and they are both split from the same block, the plural blocks will thus share the same second parameter for one of transform and prediction process. And when the plural blocks are not smaller than the minimum size defined by the first parameter (for example, each block has a size of 32×32), each of the plural block will use its own second parameter for one of transform and prediction processes.

Figure 15:
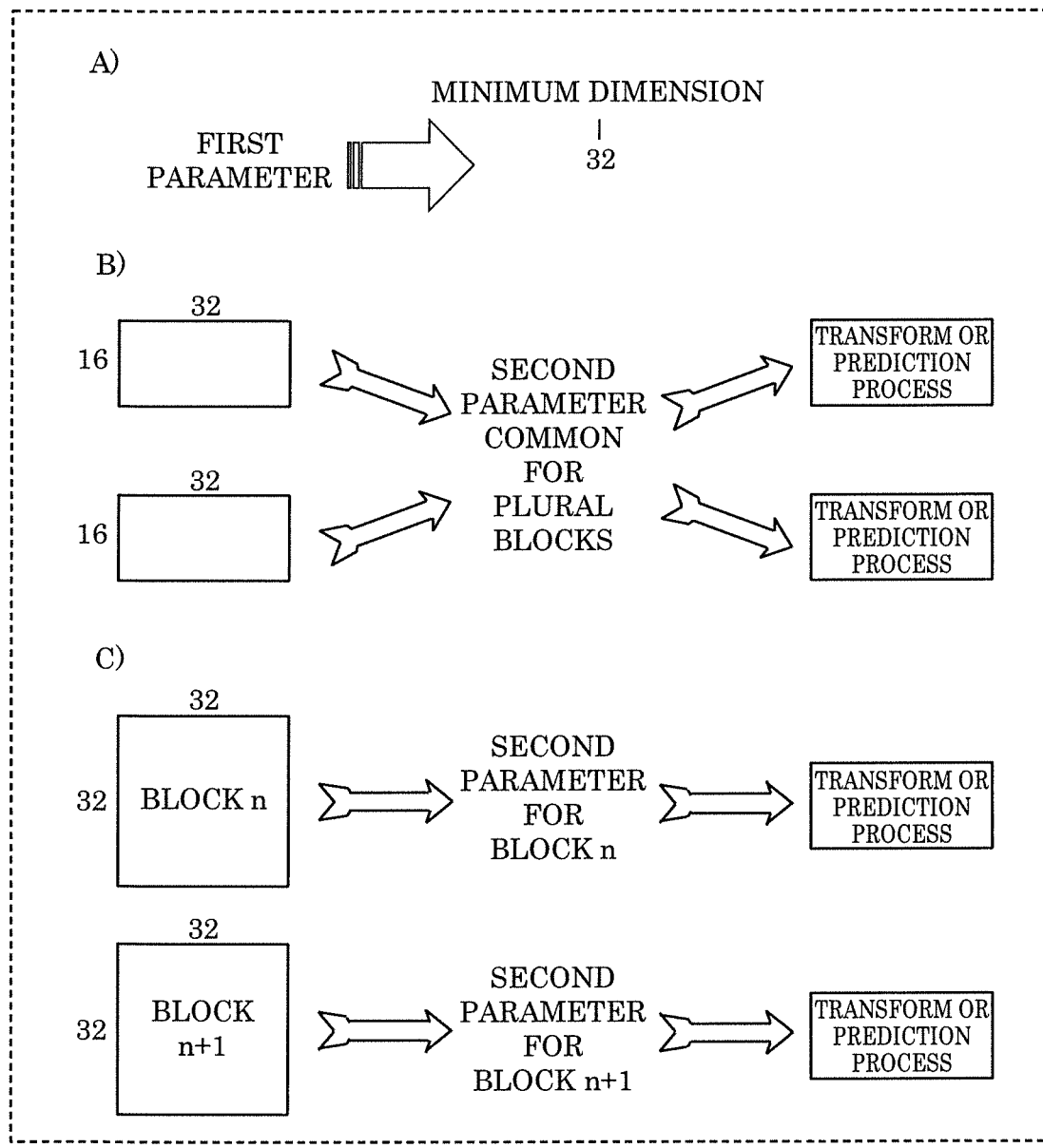
FIG. 15 is a diagram showing an example of plural blocks using the same second parameter based on a minimum dimension for one of prediction process and transform process.

FIG. 15 shows another example on plural blocks using the same second parameter when the block sizes are less than a size defined by the first parameter. As shown in the figure, the first parameter defines a minimum dimension size for a block (e.g. 32). As the plural 32 by 16 blocks have one of the dimension size smaller than the minimum size defined by the first parameter and they are both split from the same block, the plural blocks will share the same second parameter for one of transform or prediction process.

Also shown in the figure, when the plural blocks are both dimensions not smaller than the minimum size defined by the first parameter (for example, each block has a size of 32×32), each of the plural block will use its own second parameter for one of transform and prediction processes.

In another possible embodiment, at step S116, when it is judged that the block shapes for the plural blocks are not equal to the size defined by the first parameter, at least one of prediction processes and transform processes are performed using the second parameter for the plural blocks. The plural blocks share the same second parameter.

Figure 16:
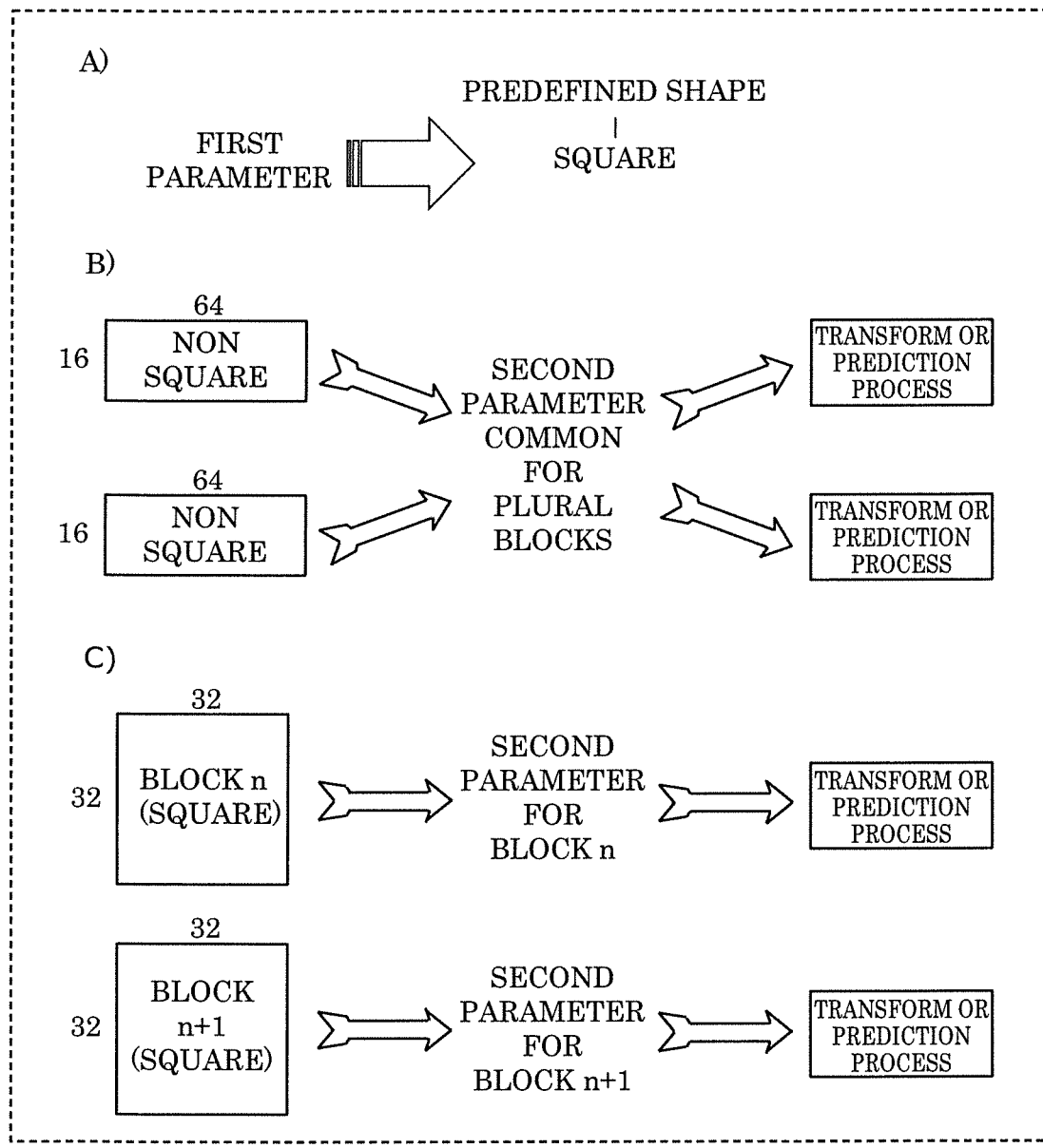
FIG. 16 is a diagram showing an example of plural blocks using the same second parameter based on a block shape for one of prediction process and transform process.

FIG. 16 shows another example on plural blocks using the same second parameter when the block sizes are not equal to one or more shapes defined by the first parameter. As shown in the figure, the first parameter defines at least a shape for a block (e.g. square shape). As the plural 64 by 16 blocks have rectangular shapes (not equal to square shape) and they are both split from the same block, the plural blocks will share the same second parameter for one of transform or prediction process. Also shown in the figure, when the plural 32×32 blocks are both square equal to the shape defined by the first parameter, each of the plural 32×32 blocks will use its own second parameter for one of transform and prediction processes.

In another possible embodiment, if the first parameter defines a split depth, at step S116, when it is judged that the split depths for the plural blocks are greater than the split depth defined by the first parameter, at least one of prediction processes and transform processes are performed using the second parameter for the plural blocks. The plural blocks share the same second parameter.

(Encoding Apparatus)

FIG. 12 is a block diagram which shows a structure of video/image encoding apparatus in an embodiment of the present disclosure.

The video encoding apparatus 300 is an apparatus for encoding an input video/image bitstream on a block-by-block basis so as to generate an encoded output bitstream. As shown in FIG. 12, a transformer 301, a quantizer 302, an inverse quantizer 303, an inverse transformer 304, a block memory 305, a frame memory 306, an intra predictor 307, an inter predictor 308, an entropy encoder 309 and an analyzer 310.

An input video is inputted to an adder, and the added value is outputted to the transformer 301. The transformer 301 transforms the added values into frequency coefficients, and outputs the resulting frequency coefficients to the quantizer 302. The quantizer 302 quantizes the inputted frequency coefficients, and outputs the resulting quantized values to the inverse quantizer 303 and the entropy encoder 309.

The inverse quantizer 303 inversely quantizes the sample values outputted from the quantizer 302, and outputs the frequency coefficients to the inverse transformer 304. The inverse transformer 304 performs inverse frequency transform on the frequency coefficients so as to transform the frequency coefficients into sample values of the bitstream, and outputs the resulting sample values to an adder.

The adder adds the sample values of the bitstream outputted from the inverse transformer 304 to the predicted video/image values outputted from the inter/intra predictor 307, 308, and outputs the resulting added values to the block memory 305 or the frame memory 306 for further prediction. The inter/intra predictor 307, 308 searches within reconstructed videos/images stored in the block memory 305 or from reconstructed videos/images in frame memory 308 and estimates a video/image area which is e.g. most similar to the input videos/images for prediction.

The analyzer 310 analyses the input video, determines common parameters and outputs the analysis results to the entropy encoder 309. The analyzer 310 also outputs the analysis results to one of the inverse transformer 304 or the inter/intra predictor 307, 308 whereby the analyzer 310 produces a second parameter that controls one of the transform or prediction units.

The entropy encoder 309 encodes the quantized values outputted from the quantizer 302 and the results from the analyzer 310, and outputs a bitstream. The results from the analyzer 310 is written as first parameter into a header and a plurality of second parameters into the bitstream by the entropy encoder 309. A second parameter controls a module in the inverse transformer 304 or a module in the inter/intra predictor 307 & 308. There can be one or more types of second parameter depending on the first parameter. One type of second parameter is shared among plural blocks while another type of parameter is tied to only one block. The selection between the two or more types of second parameter is dependent on the first parameter.

At least of a portion of this aspect may be combined with at least a portion of one or more of other aspects. A portion of the process in flow charts, a part of the devices, syntax, and/or other features may be combined with the other aspects.

Embodiment 3

Figure 17:
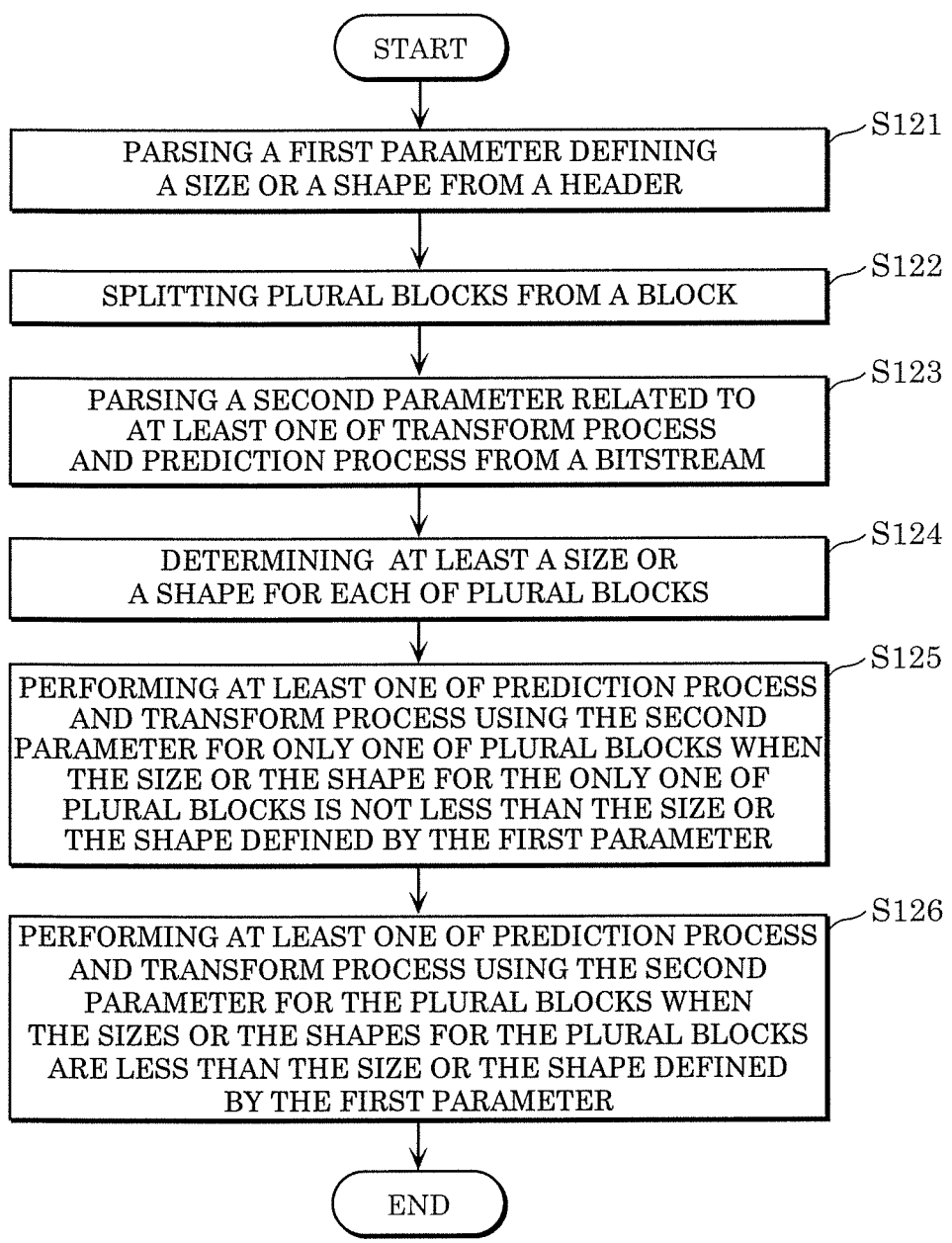
FIG. 17 is a flowchart showing a video decoding process according to Embodiment 3.
Figure 18:
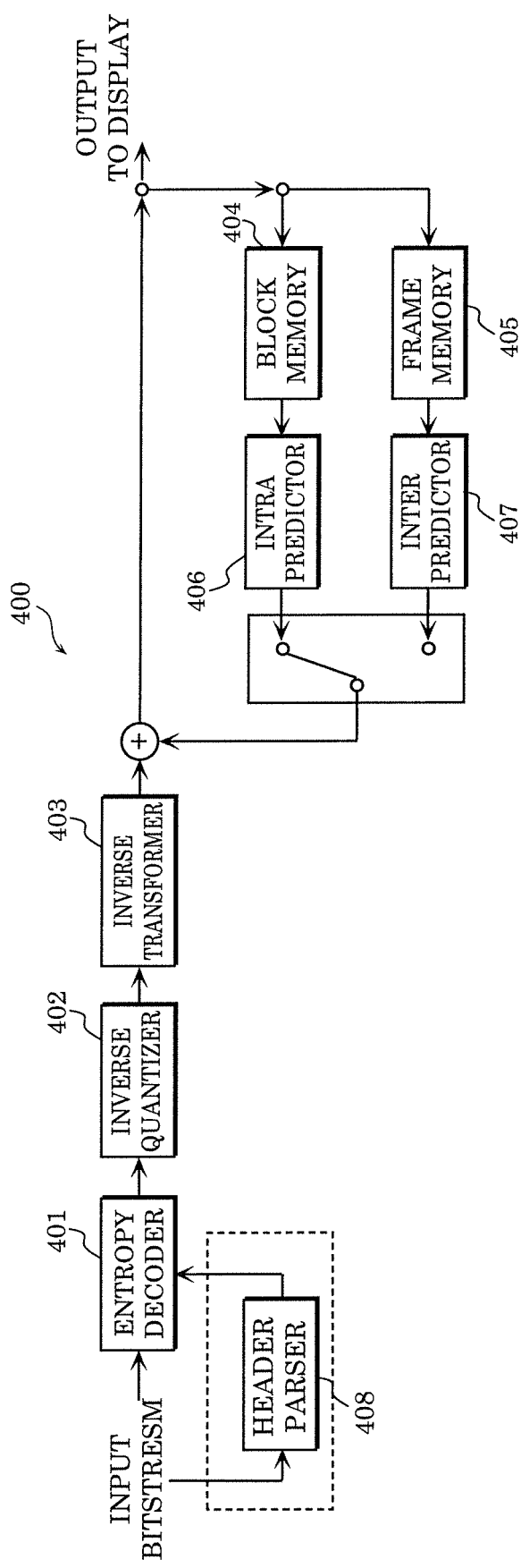
FIG. 18 is a block diagram showing an exemplary structure of a video decoding apparatus for embodiments.

Method for decoding video using flexible syntax structure will be described according to an embodiment of the present disclosure as illustrated in FIG. 17. An apparatus for decoding video using flexible syntax structure will be described according to an embodiment of the present disclosure as illustrated in FIG. 18.

(Decoding Process)

FIG. 17 shows a video decoding process according to Embodiment 3. As a first step S121, a first parameter defining either at least a size or a shape is parsed from a header. Examples of the header can be one of a video parameter set, a sequence parameter set, a picture parameter set, a slice header or an initial part of a slice data as shown in FIG. 13. Details of the first parameter are the same as in Embodiment 2.

At step S122, at least two blocks will be split from a single block. Then a second parameter related to at least one of the transform process and prediction process is parsed from a bitstream at step S123. Details of the second parameter are the same as in Embodiment 2.

Next at step S124, a size or a shape is determined for each of the plural blocks. In another possible embodiment, at step S124, a split depth is determined for each of the plural blocks The plural blocks are split recursively from a larger block and one of the block attributes like the size of the block or the shape of the block is determined to be compared with a size or a shape based on the first parameter. The first parameter may also define a plurality of sizes or shapes using a split depth.

When it is judged that the block size or the block shape for one of the plural blocks is not less than the size or the shape defined by the first parameter, at least one of prediction process and transform process is performed using the second parameter for the one of the plural blocks at step S125.

In another possible embodiment, if the first parameter defines a split depth, at step S125, when it is judged that the split depth for one of the plural blocks is not greater than the split depth defined by the first parameter, at least one of prediction process and transform process is performed using the second parameter for the one of the plural blocks.

In another words, the first parameter defines either a minimum shape, a minimum size or a maximum split depth at which the second parameter is signaled in a bitstream. Blocks with shape less than the minimum shape, with size less than the minimum size or with split depth greater than the maximum split depth will share the second parameter with another block.

Thus at step S126, when it is judged that the block size or the block shape for the plural blocks are less than the size or the shape defined by the first parameter, at least one of prediction processes and transform processes are performed using the second parameter for the plural blocks. The plural blocks share the same second parameter. Details of this process are the same as in step S116.

(Decoding Apparatus)

FIG. 18 is a block diagram which shows a structure of video/image decoding apparatus in an embodiment of the present disclosure.

The video decoding apparatus 400 is an apparatus for decoding an input coded bitstream on a block-by-block basis and outputting videos/images, and comprises as shown in FIG. 18, an entropy decoder 401, an inverse quantizer 402, an inverse transformer 403, a block memory 404, a picture memory 405, an intra predictor 406, an inter predictor 407 and a header parser 408.

An input encoded bitstream is inputted to the entropy decoder 401 and the header parser 408. The header parser 408 parses parameters from a header of the input encoded bitstream and outputs the parameters to the entropy decoder 401.

After the input encoded bitstream is inputted to the entropy decoder 401 and parameters are parsed from a header, the entropy decoder 401 decodes the input encoded bitstream, outputs the decoded values to the inverse quantizer 402.

The inverse quantizer 402 inversely quantizes the decoded values, and outputs the frequency coefficients to the inverse transformer 403. The inverse transformer 403 performs inverse frequency transform on the frequency coefficients to transform the frequency coefficients into sample values, and outputs the resulting pixel values to an adder. The adder adds the resulting pixel values to the predicted video/image values outputted from the intra/inter predictor 406, 407, and outputs the resulting values to display, and outputs the resulting values to the block memory 404 or the picture memory 405 for further prediction. In addition, the intra/inter predictor 406, 407 searches within videos/images stored in the block memory 404 or from reconstructed videos/images in the frame memory 405 at the derived block partitioning information from the block partitioning information decision 408, and estimates a video/image area which is e.g. most similar to the decoded videos/images for prediction.

At least of a portion of this aspect may be combined with at least a portion of one or more of other aspects. A portion of the process in flow charts, a part of the devices, syntax, and/or other features may be combined with the other aspects.

Embodiment 4

Figure 19:
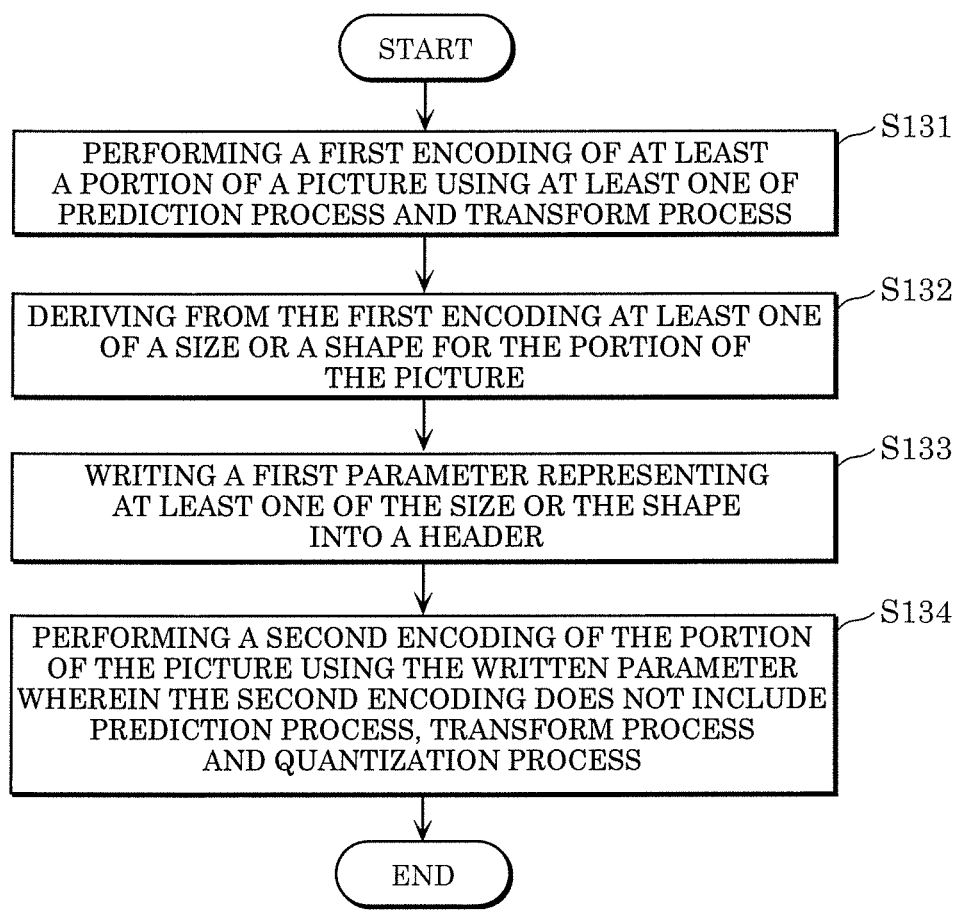
FIG. 19 is a flowchart showing a video encoding process according to Embodiment 4.
Figure 20:
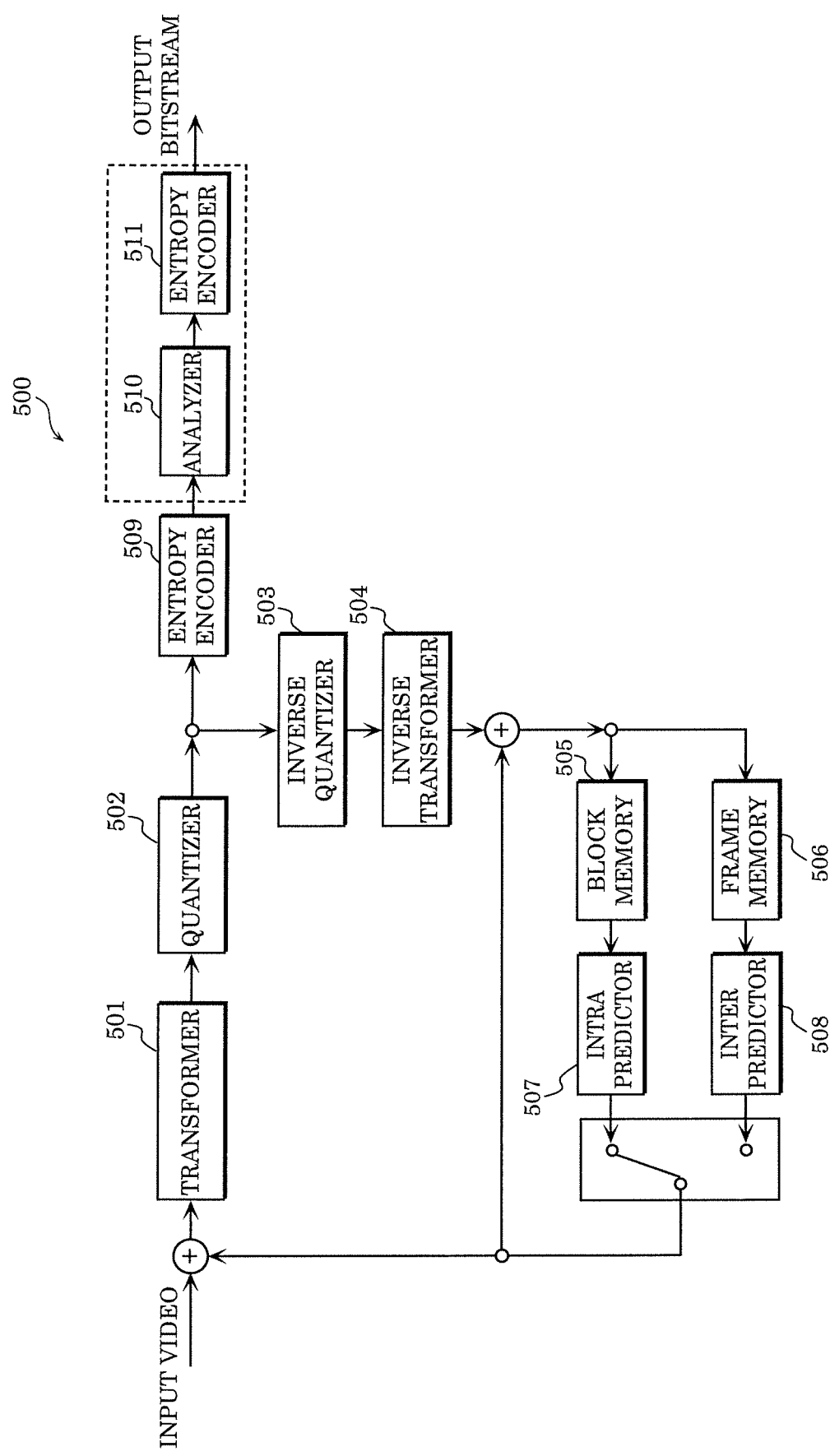
FIG. 20 is a block diagram showing an exemplary structure of video/image encoding apparatus for embodiments.

Method for encoding video using flexible syntax structure will be described according to an embodiment of the present disclosure as illustrated in FIG. 19. An apparatus for encoding video using flexible syntax structure will be described according to an embodiment of the present disclosure as illustrated in FIG. 20.

(Encoding Process)

FIG. 19 shows a video encoding process according to Embodiment 4. As a first step S131, a first encoding is performed to encode at least a portion of a picture using at least a prediction process and a transform process. Next at step S132, from the first coding, a size or a shape is derived for the portion of a picture. The size or the shape is derived as a minimum size or minimum shape.

In another possible embodiment, a split depth is derived for the portion of a picture. The split depth is derived as a maximum split depth.

Next at step S133, a first parameter presenting at least one of the size and the shape is written into a header. Examples of the header can be one of a video parameter set, a sequence parameter set, a picture parameter set, a slice header or an initial part of a slice data as shown in FIG. 13. Details of the first parameter are the same as in Embodiment 2.

Finally, at step S134, a second encoding of the portion of the picture is performed using the first parameter. The second encoding does not include prediction process, transform process and quantization process. An example of the second encoding includes an entropy coding process only to generate the output bitstream wherein the bitstream produced by second encoding is smaller in size than the first encoding. During the second encoding, a second parameter is coded based on the first parameter. There can be one or more types of second parameter depending on the first parameter. One type of second parameter is shared among plural blocks while another type of parameter is tied to only one block. The selection between the two or more types of second parameter is dependent on the first parameter. Details of the second parameter are the same as in Embodiment 2.

FIG. 14 shows an example on plural blocks using the same second parameter when the block sizes are less than the size defined by the first parameter. As shown in the figure, the first parameter defines a minimum size for a block (e.g. 32×32). As the plural 32 by 16 blocks are both smaller than the minimum size and they are both split from the same block, the plural blocks will thus share the same second parameter for one of transform and prediction process. When the plural blocks share the same second parameter, during the second encoding, only one second parameter is coded for at least the plural blocks that shared the second parameter.

When the plural blocks are not smaller than the minimum size defined by the first parameter (for example, each block has a size of 32×32), each of the plural block will use its own second parameter for one of transform and prediction processes. And thus one second parameter for each of the plural blocks will be coded during the second encoding.

FIG. 15 shows another example on plural blocks using the same second parameter when the block sizes are less than a size defined by the first parameter. As shown in the figure, the first parameter defines a minimum dimension size for a block (e.g. 32). As the plural 32 by 16 blocks have one of the dimension size smaller than the minimum size defined by the first parameter and they are both split from the same block, the plural blocks will share the same second parameter for one of transform or prediction process. When the plural blocks share the same second parameter, during the second encoding, only one second parameter is coded for at least the plural blocks that shared the second parameter.

Also shown in the figure, when the plural blocks are both dimensions not smaller than the minimum size defined by the first parameter (for example, each block has a size of 32×32), each of the plural block will use its own second parameter for one of transform and prediction processes. And thus one second parameter for each of the plural blocks will be coded during the second encoding.

FIG. 16 shows another example on plural blocks using the same second parameter when the block sizes are not equal to one or more shapes defined by the first parameter. As shown in the figure, the first parameter defines at least a shape for a block (e.g. square shape). As the plural 64 by 16 blocks have rectangular shapes (not equal to square shape) and they are both split from the same block, the plural blocks will share the same second parameter for one of transform or prediction process. When the plural blocks share the same second parameter, during the second encoding, only one second parameter is coded for at least the plural blocks that shared the second parameter.

Also shown in the figure, when the plural 32×32 blocks are both square equal to the shape defined by the first parameter, each of the plural 32×32 blocks will use its own second parameter for one of transform and prediction processes. And thus one second parameter for each of the plural blocks will be coded during the second encoding.

(Encoding Apparatus)

FIG. 20 is a block diagram which shows a structure of video/image encoding apparatus in an embodiment of the present disclosure.

The video encoding apparatus 500 is an apparatus for encoding an input video/image bitstream on a block-by-block basis so as to generate an encoded output bitstream. As shown in FIG. 20, a transformer 501, a quantizer 502, an inverse quantizer 503, an inverse transformer 504, a block memory 505, a frame memory 506, an intra predictor 507, an inter predictor 508, a first entropy encoder 509, an analyzer 510, a second entropy encoder 511.

An input video is inputted to an adder, and the added value is outputted to the transformer 501. The transformer 501 transforms the added values into frequency coefficients, and outputs the resulting frequency coefficients to the quantizer 502. The quantizer 502 quantizes the inputted frequency coefficients, and outputs the resulting quantized values to the inverse quantizer 503 and the entropy encoder 509.

The inverse quantizer 503 inversely quantizes the sample values outputted from the quantizer 502, and outputs the frequency coefficients to the inverse transformer 504. The inverse transformer 504 performs inverse frequency transform on the frequency coefficients so as to transform the frequency coefficients into sample values of the bitstream, and outputs the resulting sample values to an adder.

The adder adds the sample values of the bitstream outputted from the inverse transformer 504 to the predicted video/image values outputted from the inter/intra predictor 507, 508, and outputs the resulting added values to the block memory 505 or the frame memory 506 for further prediction. The inter/intra predictor 507, 508 searches within reconstructed videos/images stored in the block memory 505 or from reconstructed videos/images in frame memory 508 and estimates a video/image area which is e.g. most similar to the input videos/images for prediction.

The entropy encoder 509 encodes the quantized values outputted from the quantizer 502, and outputs a first bitstream. The analyzer 510 analyzes the output of the first entropy encoder 509, determines common parameters and outputs the analysis results to the second entropy encoder 511. The analyzer 510 determines from the output of the first entropy encoder 509 the decision if a plurality of block parameters (second parameters) that either controls a module in the inverse transformer 504 or controls a module in the inter/intra predictors 507, 508 are similar within at least a portion of the picture.

The second entropy encoder 511 encodes the first bitstream and the analysis results and outputs a second bitstream. The second entropy encoder 511 will based on the analysis results output a first parameter into a header and a plurality of block parameters (second parameters) into a bitstream. The second entropy encoder 511 will code each second parameter based on the first parameter. FIG. 14 shows an example on plural blocks using the same second parameter when the block sizes are less than the size defined by the first parameter. As shown in the figure, the first parameter defines a minimum size for a block (e.g. 32×32). As the plural 32 by 16 blocks are both smaller than the minimum size and they are both split from the same block, the plural blocks will thus share the same second parameter for one of transform and prediction process. When the plural blocks share the same second parameter, the second entropy encoder 511 codes only one second parameter into the bitstream for at least the plural blocks that shared the second parameter.

When the plural blocks are not smaller than the minimum size defined by the first parameter (for example, each block has a size of 32×32), each of the plural block will use its own second parameter for one of transform and prediction processes. And thus the second entropy encoder 511 codes one second parameter for each of the plural blocks into a bitstream.

FIG. 15 shows another example on plural blocks using the same second parameter when the block sizes are less than a size defined by the first parameter. As shown in the figure, the first parameter defines a minimum dimension size for a block (e.g. 32). As the plural 32 by 16 blocks have one of the dimension size smaller than the minimum size defined by the first parameter and they are both split from the same block, the plural blocks will share the same second parameter for one of transform or prediction process. When the plural blocks share the same second parameter, the second entropy encoder 511 codes only one second parameter into the bitstream for at least the plural blocks that shared the second parameter.

Also shown in the figure, when the plural blocks are both dimensions not smaller than the minimum size defined by the first parameter (for example, each block has a size of 32×32), each of the plural block will use its own second parameter for one of transform and prediction processes. And thus the second entropy encoder 511 codes one second parameter for each of the plural blocks into a bitstream.

FIG. 16 shows another example on plural blocks using the same second parameter when the block sizes are not equal to one or more shapes defined by the first parameter. As shown in the figure, the first parameter defines at least a shape for a block (e.g. square shape). As the plural 64 by 16 blocks have rectangular shapes (not equal to square shape) and they are both split from the same block, the plural blocks will share the same second parameter for one of transform or prediction process. When the plural blocks share the same second parameter, the second entropy encoder 511 codes only one second parameter into the bitstream for at least the plural blocks that shared the second parameter.

Also shown in the figure, when the plural 32×32 blocks are both square equal to the shape defined by the first parameter, each of the plural 32×32 blocks will use its own second parameter for one of transform and prediction processes. And thus the second entropy encoder 511 codes one second parameter for each of the plural blocks into a bitstream.

At least of a portion of this aspect may be combined with at least a portion of one or more of other aspects. A portion of the process in flowcharts, a part of the devices, syntax, and/or other features may be combined with the other aspects.

Embodiment 5

Figure 21:
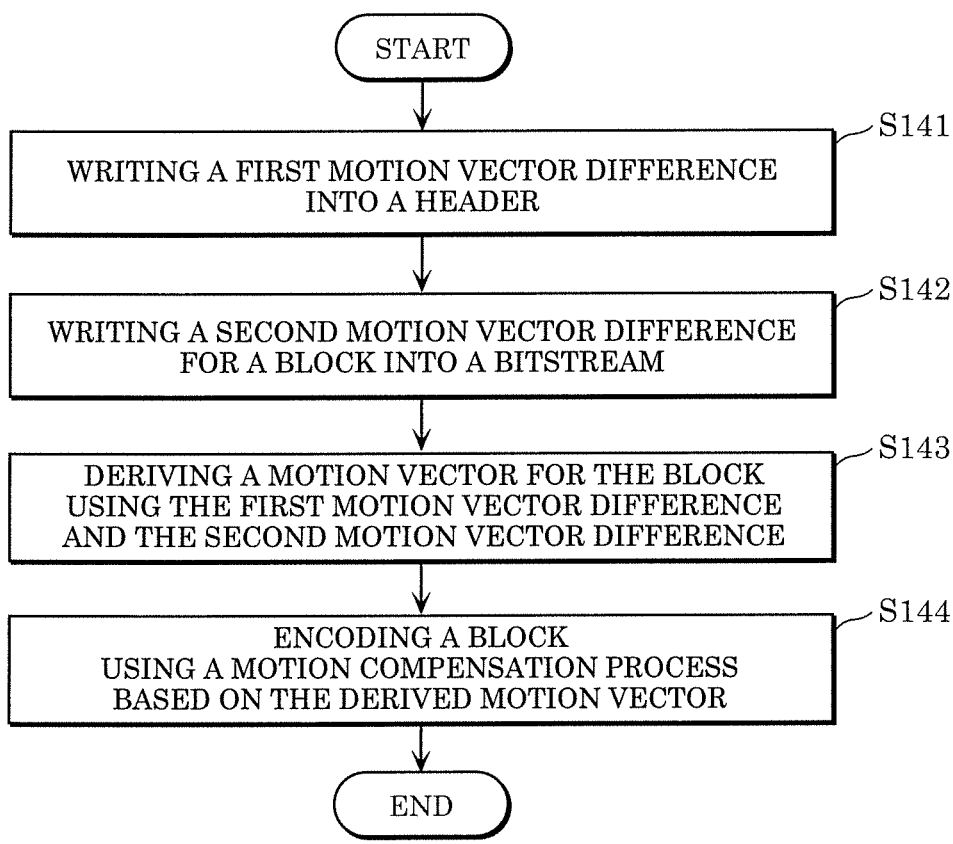
FIG. 21 is a flowchart showing a video encoding process according to Embodiment 5.

Method for encoding video using flexible syntax structure will be described according to an embodiment of the present disclosure as illustrated in FIG. 21. An apparatus for encoding video using flexible syntax structure will be described according to an embodiment of the present disclosure as illustrated in FIG. 12.

(Encoding Process)

FIG. 21 shows a video encoding process according to Embodiment 5. As a first step S141, a first motion vector difference is written into a header. Examples of the header can be one of a video parameter set, a sequence parameter set, a picture parameter set, a slice header or an initial part of a slice data as shown in FIG. 13. The first motion vector parameter is the first header parameter as shown in FIG. 13. Next in step S142, a second motion vector difference defined for a block is written into a bitstream. The second motion vector difference is located as shown in FIG. 13 as the block parameter and it is associated with a coding unit. A coding unit can be also defined as a block. At step S143, a motion vector for the block is derived using both the first motion vector difference and the second motion vector difference. The first motion vector difference is a motion vector difference common to a plurality of blocks within the picture while the second motion vector difference is a motion vector difference specific a block. Thus the motion vector for a block is derived at least by the sum of the first motion vector difference and the second motion vector difference.

And finally at step S144, the block is encoded using a motion compensation process based on the derived motion vector. An example of the relationship between the first and second motion vector differences is the total bits required to encode a plurality of blocks' second motion vector differences is lesser when the first motion vector difference is not zero as compared to the case when the first motion vector difference is zero. The plurality of blocks is the group of blocks or coding units associated with the header. Examples are the blocks within a tile, the blocks within a picture and the blocks within a slice of a picture.

(Encoding Apparatus)

FIG. 12 is a block diagram which shows a structure of video/image encoding apparatus in an embodiment of the present disclosure.

The analyzer 310 analyses the input video, determines common parameters and outputs the analysis results to the entropy encoder 309. The analyzer 310 also outputs the analysis results to the inter predictor 307, whereby the analyzer 310 produces a second parameter that controls the inter prediction units.

The entropy encoder 309 encodes the quantized values outputted from the quantizer 302 and the results from the analyzer 310, and outputs a bitstream. The results from the analyzer 310 is written as first parameter (first motion vector difference) into a header and a plurality of second parameters (second motion vector differences) into the bitstream by the entropy encoder 309.

At least of a portion of this aspect may be combined with at least a portion of one or more of other aspects. A portion of the process in flowcharts, a part of the devices, syntax, and/or other features may be combined with the other aspects.

Embodiment 6

Figure 22:
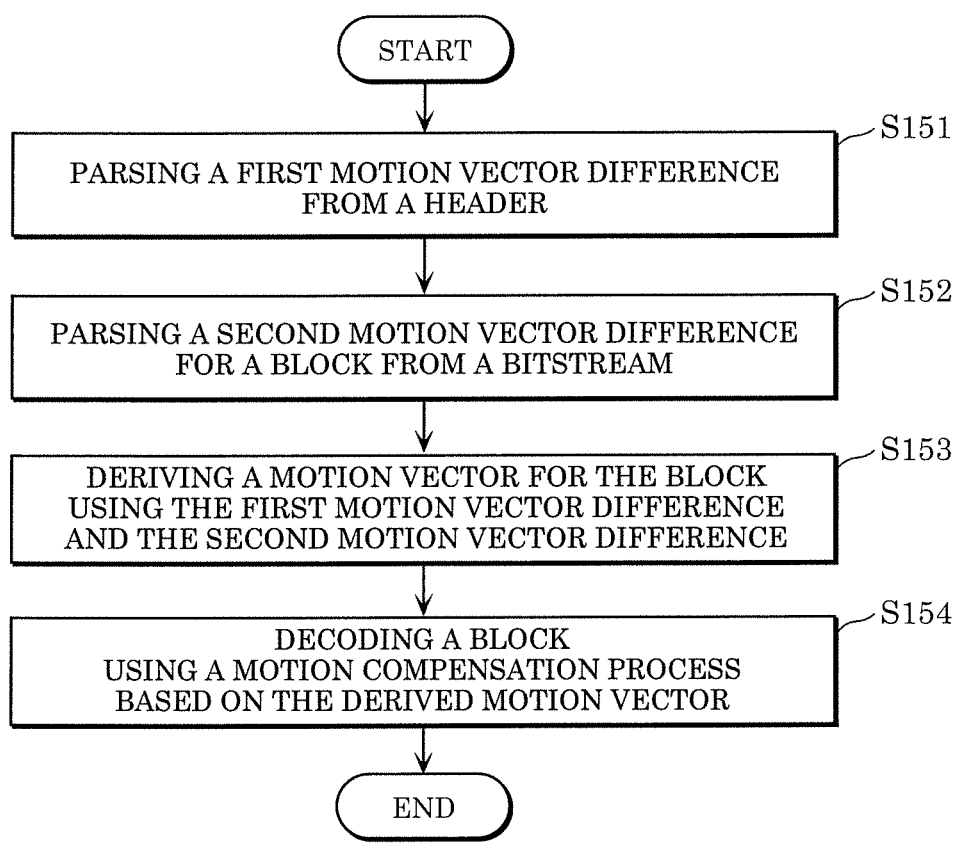
FIG. 22 is a flowchart showing a video decoding process according to Embodiment 6.

Method for decoding video using flexible syntax structure will be described according to an embodiment of the present disclosure as illustrated in FIG. 22. An apparatus for decoding video using flexible syntax structure will be described according to an embodiment of the present disclosure as illustrated in FIG. 18.

(Decoding Process)

FIG. 22 shows a video decoding process according to Embodiment 6. As a first step S151, a first motion vector difference is parsed from a header. Examples of the header can be one of a video parameter set, a sequence parameter set, a picture parameter set, a slice header or an initial part of a slice data as shown in FIG. 13. The first motion vector parameter is the first header parameter as shown in FIG. 13. Next in step S152, a second motion vector difference defined for a block is parsed from a bitstream. The second motion vector difference is located as shown in FIG. 13 as the block parameter and it is associated with a coding unit. A coding unit can be also defined as a block. At step S153, a motion vector for the block is derived using both the first motion vector difference and the second motion vector difference. The first motion vector difference is a motion vector difference common to a plurality of blocks within the picture while the second motion vector difference is a motion vector difference specific a block. Thus the motion vector for a block is derived at least by the sum of the first motion vector difference and the second motion vector difference.

And finally at step S154, the block is decoded using a motion compensation process based on the derived motion vector. An example of the relationship between the first and second motion vector differences is the total bits required to decode a plurality of blocks' second motion vector differences is lesser when the first motion vector difference is not zero as compared to the case when the first motion vector difference is zero. The plurality of blocks is the group of blocks or coding units associated with the header. Examples are the blocks within a tile, the blocks within a picture and the blocks within a slice of a picture.

(Decoding Apparatus)

FIG. 18 is a block diagram which shows a structure of video/image decoding apparatus in an embodiment of the present disclosure.

At least of a portion of this aspect may be combined with at least a portion of one or more of other aspects. A portion of the process in flow charts, a part of the devices, syntax, and/or other features may be combined with the other aspects.

Embodiment 7

Figure 23:
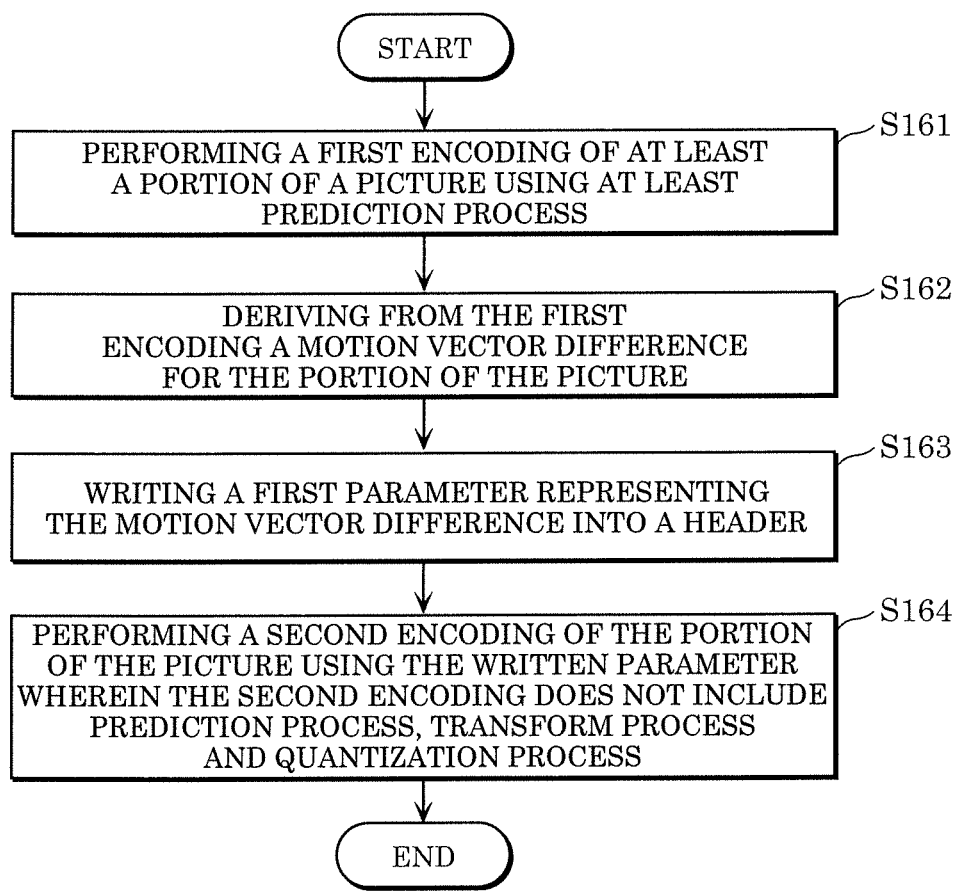
FIG. 23 is a flowchart showing a video encoding process according to Embodiment 7.

Method for encoding video using flexible syntax structure will be described according to an embodiment of the present disclosure as illustrated in FIG. 23. An apparatus for encoding video using flexible syntax structure will be described according to an embodiment of the present disclosure as illustrated in FIG. 20.

(Encoding Process)

FIG. 23 shows a video encoding process according to Embodiment 7. As a first step S161, a first encoding is performed to encode at least a portion of a picture using at least a prediction process and a transform process. Next at step S162, from the first coding, a first motion vector difference is derived for the portion of a picture.

Next at step S163, a first parameter presenting the first motion vector difference is written into a header. Examples of the header can be one of a video parameter set, a sequence parameter set, a picture parameter set, a slice header or an initial part of a slice data as shown in FIG. 13. Finally, at step S164, a second encoding of the portion of the picture is performed using the first parameter. The second encoding does not include prediction process, transform process and quantization process. An example of the second encoding includes an entropy coding process only to generate the output bitstream wherein the bitstream produced by second encoding is smaller in size than the first encoding. The second encoding includes the encoding of a second motion vector difference of a block.

An example of the relationship between the first and second motion vector differences is the total bits required to encode a plurality of blocks' second motion vector differences is lesser when the first motion vector difference is not zero as compared to the case when the first motion vector difference is zero. The first motion vector difference is a motion vector difference common to a plurality of blocks within the picture while the second motion vector difference is a motion vector difference specific a block. Thus the motion vector for a block is derived at least by the sum of the first motion vector difference and the second motion vector difference. The plurality of blocks is the group of blocks or coding units associated with the header. Examples are the blocks within a tile, the blocks within a picture and the blocks within a slice of a picture.

(Encoding Apparatus)

FIG. 20 is a block diagram which shows a structure of video/image encoding apparatus in an embodiment of the present disclosure.

The entropy encoder 509 encodes the quantized values outputted from the quantizer 502, and outputs a first bitstream. The analyzer 510 analyzes the output of the first entropy encoder 509, determines common parameters and outputs the analysis results to the second entropy encoder 511. The analyzer 510 determines, from the output of the first entropy encoder 509, an analysis result of a first motion vector difference common to a plurality of blocks within at least a portion of the picture.

The second entropy encoder 511 encodes the first bitstream and the analysis results and outputs a second bitstream. The second entropy encoder 511 will based on the analysis results output the first motion vector difference into a header and a plurality of second motion vector differences into a bitstream. The second entropy encoder 511 will code the second motion vector differences (second parameters) based on the first motion vector difference (first parameter) wherein the motion vectors of a block can be derived from the sum of the first motion vector difference and the second motion vector difference.

At least of a portion of this aspect may be combined with at least a portion of one or more of other aspects. A portion of the process in flow charts, a part of the devices, syntax, and/or other features may be combined with the other aspects.

Embodiment 8

Figure 24:
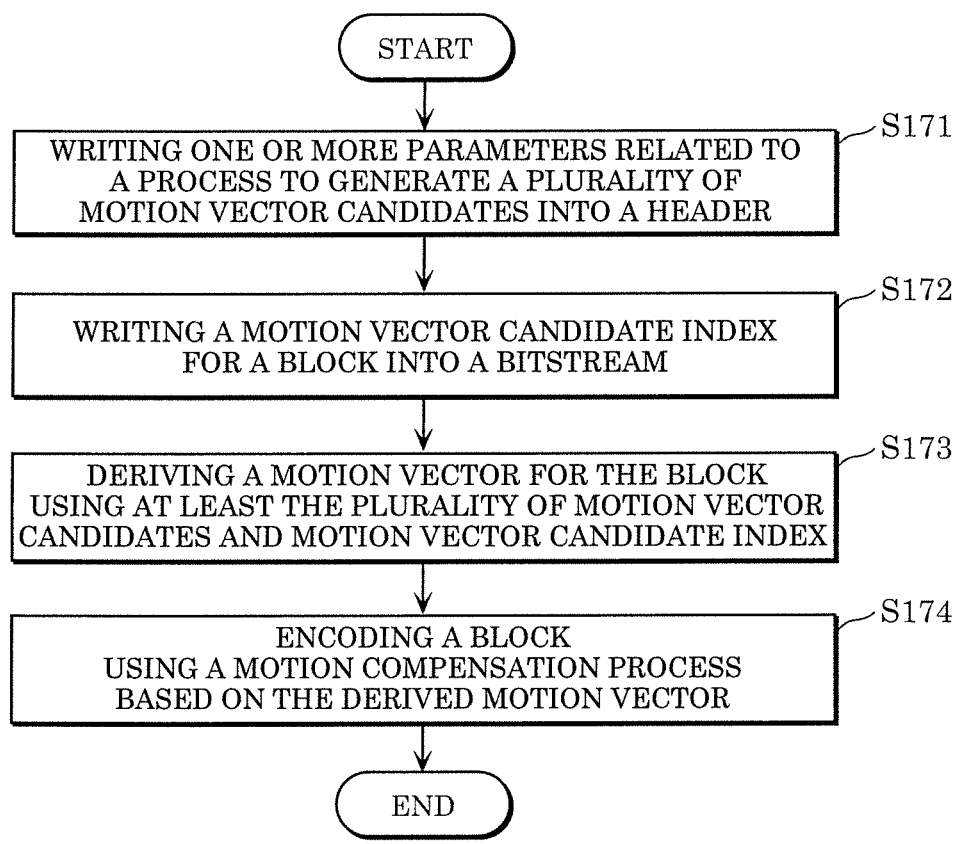
FIG. 24 is a flowchart showing a video encoding process according to Embodiment 8.

Method for encoding video using flexible syntax structure will be described according to an embodiment of the present disclosure as illustrated in FIG. 24. An apparatus for encoding video using flexible syntax structure will be described according to an embodiment of the present disclosure as illustrated in FIG. 12.

(Encoding Process)

FIG. 24 shows a video encoding process according to Embodiment 8. As a first step S171, one or more parameters related to a process to generate a plurality of motion vector candidates are written into a header. Examples of the header can be one of a video parameter set, a sequence parameter set, a picture parameter set, a slice header or an initial part of a slice data as shown in FIG. 13. The plurality of motion vector candidates makes up a list of predicted motion vectors which can be selected by each block associated with the header. The one or more parameters can be used for at least one of an operation to rearrange the order of the plurality of motion vector candidates, an operation to add or remove a motion vector candidate to/from the plurality of motion vector candidates, and an operation to select a plurality of motion vector candidates from a larger set of candidates.

Next in step S172, a motion vector candidate index for a block is written into a bitstream. The motion vector candidate index is used to select one motion vector from the plurality of motion vector candidates. The motion vector candidate index is located as shown in FIG. 13 as the block parameter and it is associated with a coding unit. A coding unit can be also defined as a block.

At step S173, a motion vector for the block is derived using at least the plurality of motion vector candidates and the motion vector candidate index. And finally at step S174, the block is encoded using a motion compensation process based on the derived motion vector. The plurality of motion vector candidates is associated with a plurality of blocks which are the blocks or coding units associated with the header. Examples are the blocks within a tile, the blocks within a picture and the blocks within a slice of a picture.
(Encoding Apparatus)

FIG. 12 is a block diagram which shows a structure of video/image encoding apparatus in an embodiment of the present disclosure.

The analyzer 310 analyses the input video, determines common parameters and outputs the analysis results to the entropy encoder 309. The analyzer 310 also outputs the analysis results to the inter/intra predictor 307 whereby the analyzer 310 produces a second parameter that controls the inter prediction units.

The entropy encoder 309 encodes the quantized values outputted from the quantizer 302 and the results from the analyzer 310, and outputs a bitstream. The results from the analyzer 310 is written as first parameter into a header and a plurality of second parameters into the bitstream by the entropy encoder 309 whereby first parameter includes one or more parameters related to a process to generate a plurality of motion vector candidates and a second parameter includes a motion vector candidate index for a block.

At least of a portion of this aspect may be combined with at least a portion of one or more of other aspects. A portion of the process in flowcharts, a part of the devices, syntax, and/or other features may be combined with the other aspects.

Embodiment 9

Figure 25:
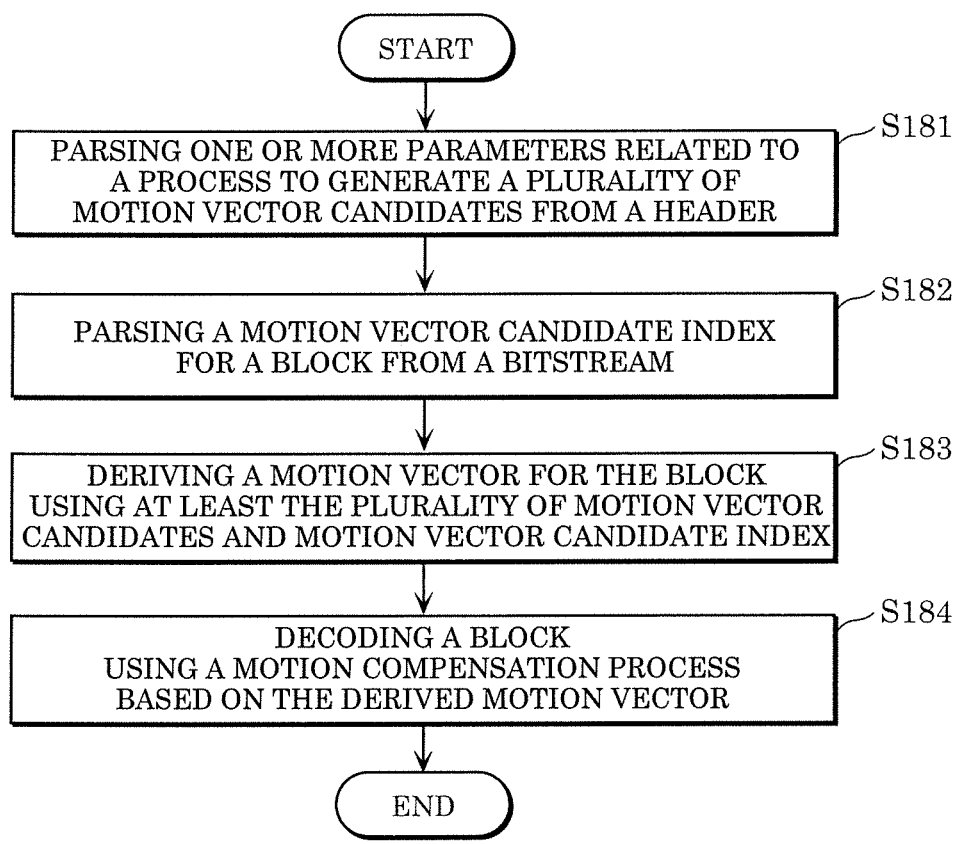
FIG. 25 is a flowchart showing a video decoding process according to Embodiment 9.

Method for decoding video using flexible syntax structure will be described according to an embodiment of the present disclosure as illustrated in FIG. 25. An apparatus for decoding video using flexible syntax structure will be described according to an embodiment of the present disclosure as illustrated in FIG. 18.
(Decoding Process)

FIG. 25 shows a video decoding process according to Embodiment 9. As a first step S181, one or more parameters related to a process to generate a plurality of motion vector candidates are parsed from a header. Examples of the header can be one of a video parameter set, a sequence parameter set, a picture parameter set, a slice header or an initial part of a slice data as shown in FIG. 13. The plurality of motion vector candidates makes up a list of predicted motion vectors which can be selected by each block associated with the header. The one or more parameters can be used for at least one of an operation to rearrange the order of the plurality of motion vector candidates, an operation to add or remove a motion vector candidate to/from the plurality of motion vector candidates, and an operation to select a plurality of motion vector candidates from a larger set of candidates.

Next in step S182, a motion vector candidate index for a block is parsed from a bitstream. The motion vector candidate index is used to select one motion vector from the plurality of motion vector candidates. The motion vector candidate index is located as shown in FIG. 13 as the block parameter and it is associated with a coding unit. A coding unit can be also defined as a block.

At step S183, a motion vector for the block is derived using at least the plurality of motion vector candidates and the motion vector candidate index. And finally at step S184, the block is decoded using a motion compensation process based on the derived motion vector. The plurality of motion vector candidates is associated with a plurality of blocks which are the blocks or coding units associated with the header. Examples are the blocks within a tile, the blocks within a picture and the blocks within a slice of a picture.
(Decoding Apparatus)

FIG. 18 is a block diagram which shows a structure of video/image decoding apparatus in an embodiment of the present disclosure.

At least of a portion of this aspect may be combined with at least a portion of one or more of other aspects. A portion of the process in flow charts, a part of the devices, syntax, and/or other features may be combined with the other aspects.

Embodiment 10

Figure 26:
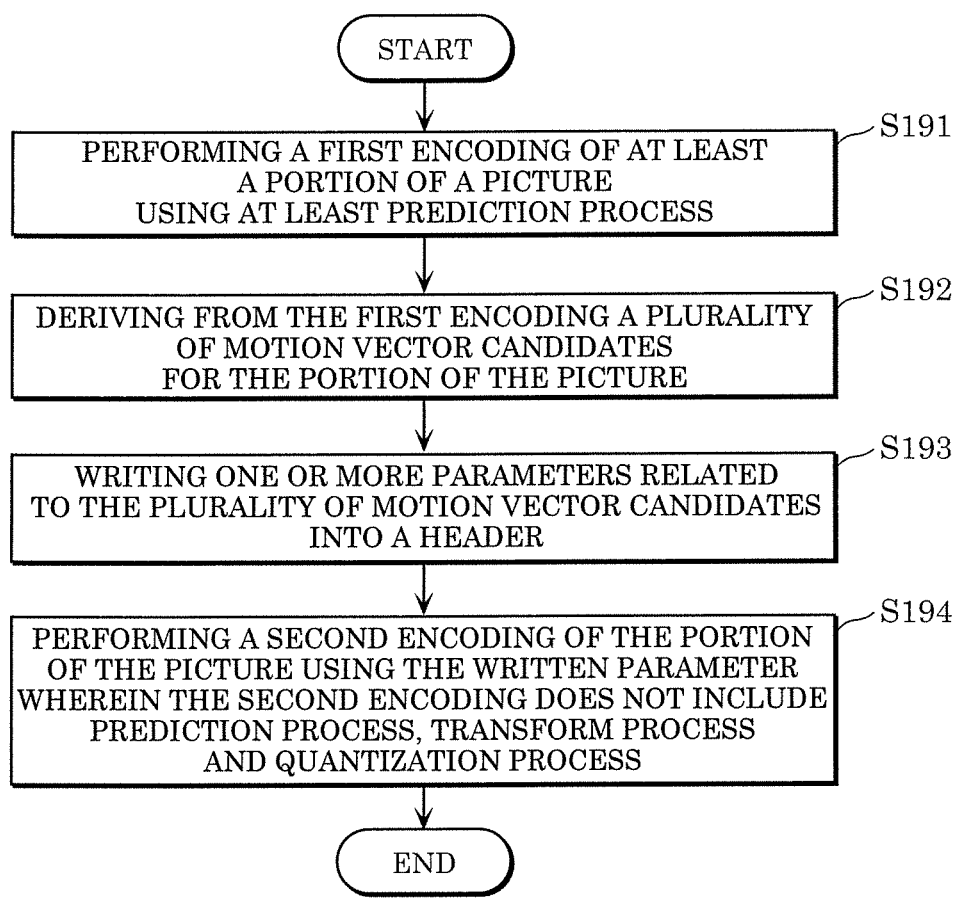
FIG. 26 is a flowchart showing a video encoding process according to Embodiment 10.

Method for encoding video using flexible syntax structure will be described according to an embodiment of the present disclosure as illustrated in FIG. 26. An apparatus for encoding video using flexible syntax structure will be described according to an embodiment of the present disclosure as illustrated in FIG. 20.
(Encoding Process)

FIG. 26 shows a video encoding process according to Embodiment 10. As a first step S191, a first encoding is performed to encode at least a portion of a picture using at least a prediction process and a transform process. Next at step S192, from the first coding, a plurality of motion vector candidates is derived for the portion of a picture.

Next at step S193, one or more parameters related to a process to derive the plurality of motion vector candidates are written into a header. Examples of the header can be one of a video parameter set, a sequence parameter set, a picture parameter set, a slice header or an initial part of a slice data as shown in FIG. 13. The one or more parameters can be used for at least one of an operation to rearrange the order of the plurality of motion vector candidates, an operation to add or remove a motion vector candidate to/from the plurality of motion vector candidates, and an operation to select a plurality of motion vector candidates from a larger set of candidates.

Finally, at step S194, a second encoding of the portion of the picture is performed using the plurality of motion vector candidates. The second encoding does not include prediction process, transform process and quantization process. An example of the second encoding includes an entropy coding process only to generate the output bitstream wherein the bitstream produced by second encoding is smaller in size than the first encoding. The second encoding includes the encoding of a motion vector candidate index of a block based on the plurality of motion vector candidates.

The plurality of motion vector candidates is associated with a plurality of blocks which are the blocks or coding units associated with the header. Examples are the blocks within a tile, the blocks within a picture and the blocks within a slice of a picture.
(Encoding Apparatus)

FIG. 20 is a block diagram which shows a structure of video/image encoding apparatus in an embodiment of the present disclosure.

The entropy encoder 509 encodes the quantized values outputted from the quantizer 502, and outputs a first bitstream. The analyzer 510 analyzes the output of the first entropy encoder 509, determines common parameters and outputs the analysis results to the second entropy encoder 511. The analyzer 510 determines, from the output of the first entropy encoder 509, an analysis result of a plurality of motion vector candidates common to a plurality of blocks within at least a portion of the picture.

The second entropy encoder 511 encodes the first bitstream and the analysis results and outputs a second bitstream. The second entropy encoder 511 will, based on the analysis results, output one or more parameters (first parameter) into a header and a plurality of motion vector candidate indexes into a bitstream, wherein the one or more parameters is used to derive the plurality of motion vector candidates and motion vector candidate index is used to select one motion vector from the plurality of motion vector candidates for each block. The one or more parameters can be used for at least one of an operation to rearrange the order of the plurality of motion vector candidates, an operation to add or remove a motion vector candidate to/from the plurality of motion vector candidates, and an operation to select a plurality of motion vector candidates from a larger set of candidates. The second entropy encoder 511 will code the motion vector candidate indexes (second parameters) based on the arrangement order for the plurality of motion vector candidates (first parameter).

At least of a portion of this aspect may be combined with at least a portion of one or more of other aspects. A portion of the process in flow charts, a part of the devices, syntax, and/or other features may be combined with the other aspects.

Embodiment 11

Figure 27:
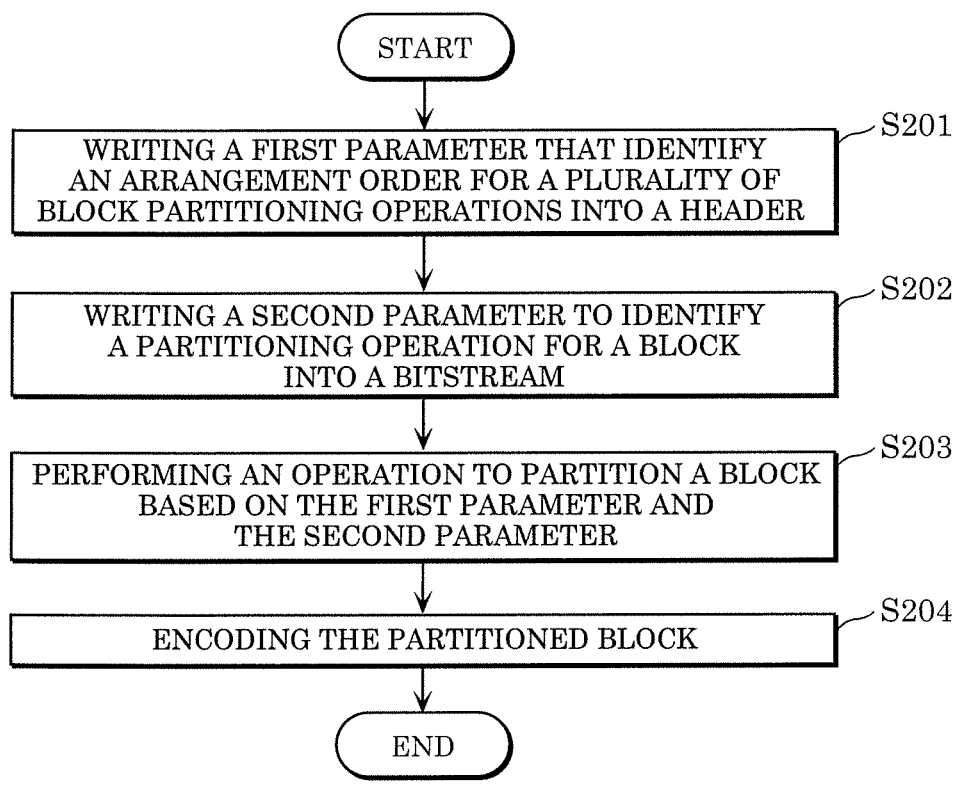
FIG. 27 is a flowchart showing a video encoding process according to Embodiment 11.

Method for encoding video using flexible syntax structure will be described according to an embodiment of the present disclosure as illustrated in FIG. 27. An apparatus for encoding video using flexible syntax structure will be described according to an embodiment of the present disclosure as illustrated in FIG. 12.

(Encoding Process)

FIG. 27 shows a video encoding process according to Embodiment 11. As a first step S201, a first parameter that identifies an arrangement order for a plurality of block partitioning operations is written into a header. Examples of the header can be one of a video parameter set, a sequence parameter set, a picture parameter set, a slice header or an initial part of a slice data as shown in FIG. 13. The plurality of block partitioning operations includes at least one of an operation to split a block into four blocks, an operation to split a block horizontally into two blocks and an operation to split a block vertically into two blocks. The first parameter can also be used for at least one of an operation to rearrange the order of the plurality of block partitioning operation, an operation to add or remove a block partitioning operation to/from the plurality of block partitioning operations, and an operation to select a plurality of block partitioning operations from a larger set.

Next in step S202, a second parameter to identify a partitioning operation for a block is written into a bitstream. The second parameter is used to select one block partitioning operation from the plurality of block partitioning operations. The second parameter is located as shown in FIG. 13 as the block parameter and it is associated with a coding unit. A coding unit can be also defined as a block.

At step S203, an operation is performed to partition a block based on the first and the second parameter. And finally at step S204, the partitioned block is encoded. The plurality of block partitioning operations is associated with a plurality of blocks which are the blocks or coding units associated with the header. Examples are the blocks within a tile, the blocks within a picture and the blocks within a slice of a picture.

(Encoding Apparatus)

FIG. 12 is a block diagram which shows a structure of video/image encoding apparatus in an embodiment of the present disclosure.

The analyzer 310 analyses the input video, determines common parameters and outputs the analysis results to the entropy encoder 309. The analyzer 310 also outputs the analysis results to the inter/intra predictor 307 whereby the analyzer 310 produces a second parameter that controls the inter prediction units.

The entropy encoder 309 encodes the quantized values outputted from the quantizer 302 and the results from the analyzer 310, and outputs a bitstream. The results from the analyzer 310 is written as first parameter into a header and a plurality of second parameters into the bitstream by the entropy encoder 309 wherein first parameter identify an arrangement order for a plurality of block partitioning operations and a second parameter selects one block partitioning operation from the plurality of block partitioning operations.

At least of a portion of this aspect may be combined with at least a portion of one or more of other aspects. A portion of the process in flow charts, a part of the devices, syntax, and/or other features may be combined with the other aspects.

Embodiment 12

Figure 28:
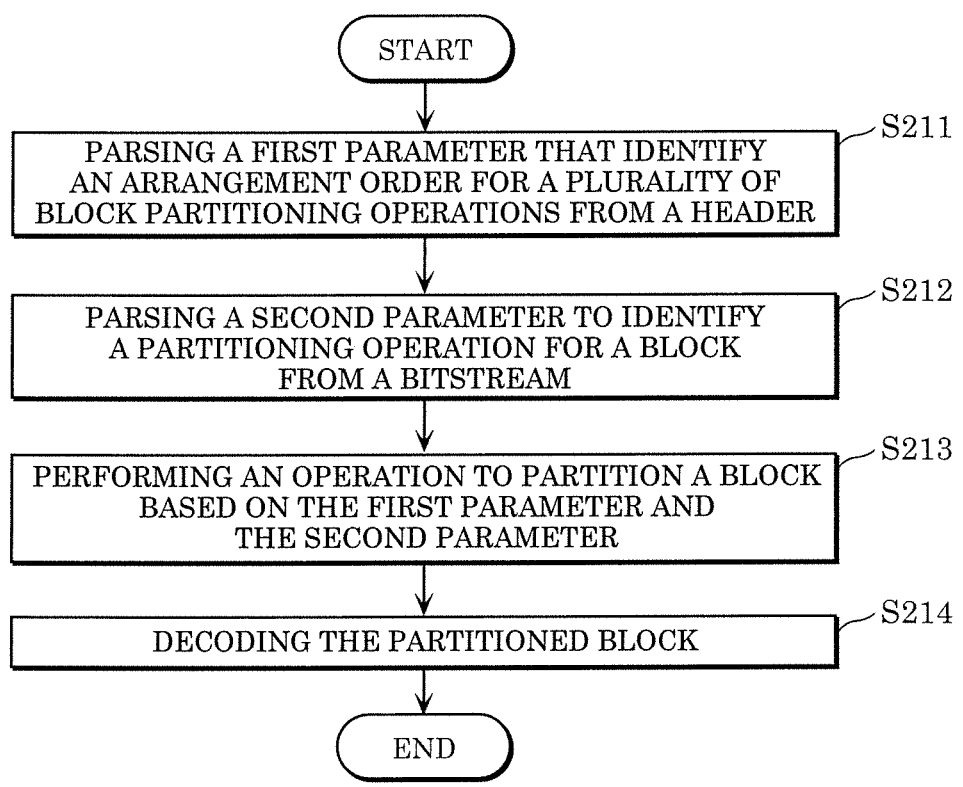
FIG. 28 is a flowchart showing a video decoding process according to Embodiment 12.

Method for decoding video using flexible syntax structure will be described according to an embodiment of the present disclosure as illustrated in FIG. 28. An apparatus for decoding video using flexible syntax structure will be described according to an embodiment of the present disclosure as illustrated in FIG. 18.

(Decoding Process)

FIG. 28 shows a video decoding process according to Embodiment 12. As a first step S211, a first parameter that identifies an arrangement order for a plurality of block partitioning operations is parsed from a header. Examples of the header can be one of a video parameter set, a sequence parameter set, a picture parameter set, a slice header or an initial part of a slice data as shown in FIG. 13. The plurality of block partitioning operations includes at least one of an operation to split a block into four blocks, an operation to split a block horizontally into two blocks and an operation to split a block vertically into two blocks. The first parameter can also be used for at least one of an operation to rearrange the order of the plurality of block partitioning operation, an operation to add or remove a block partitioning operation to/from the plurality of block partitioning operations, and an operation to select a plurality of block partitioning operations from a larger set.

Next in step S212, a second parameter to identify a partitioning operation for a block is parsed from a bitstream. The second parameter is used to select one block partitioning operation from the plurality of block partitioning operations. The second parameter is located as shown in FIG. 13 as the block parameter and it is associated with a coding unit. A coding unit can be also defined as a block.

At step S213, an operation is performed to partition a block based on the first and the second parameter. And finally at step S214, the partitioned block is decoded. The partitioned block is decoded using at least an inverse transform process.

The plurality of block partitioning operations is associated with a plurality of blocks which are the blocks or coding units associated with the header. Examples are the blocks within a tile, the blocks within a picture and the blocks within a slice of a picture.

(Decoding Apparatus)

FIG. 18 is a block diagram which shows a structure of video/image decoding apparatus in an embodiment of the present disclosure.

At least of a portion of this aspect may be combined with at least a portion of one or more of other aspects. A portion of the process in flow charts, a part of the devices, syntax, and/or other features may be combined with the other aspects.

Embodiment 13

Figure 29:
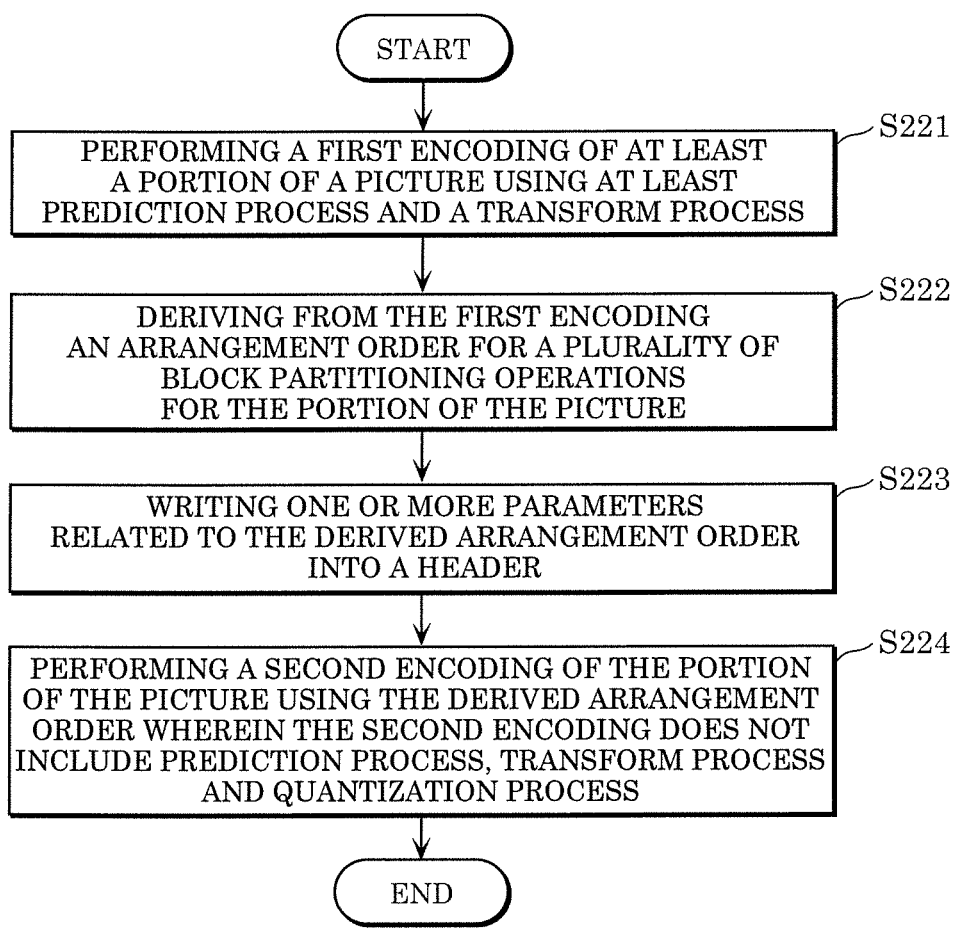
FIG. 29 is a flowchart showing a video encoding process according to Embodiment 13.

Method for encoding video using flexible syntax structure will be described according to an embodiment of the present disclosure as illustrated in FIG. 29. An apparatus for encoding video using flexible syntax structure will be described according to an embodiment of the present disclosure as illustrated in FIG. 20.

(Encoding Process)

FIG. 29 shows a video encoding process according to Embodiment 13. As a first step S221, a first encoding is performed to encode at least a portion of a picture using at least a prediction process and a transform process. Next at step S222, from the first coding, an arrangement order for a plurality of block partitioning operations is derived for the portion of a picture. The plurality of block partitioning operations includes at least one of an operation to split a block into four blocks, an operation to split a block horizontally into two blocks and an operation to split a block vertically into two blocks.

Next at step S223, one or more parameters related to a process to derive the arrangement order are written into a header. Examples of the header can be one of a video parameter set, a sequence parameter set, a picture parameter set, a slice header or an initial part of a slice data as shown in FIG. 13. The one or more parameter can also be used for at least one of an operation to rearrange the order of the plurality of block partitioning operations, an operation to add or remove a block partitioning operation to/from the plurality of block partitioning operations, and an operation to select a plurality of block partitioning operations from a larger set.

Finally, at step S224, a second encoding of the portion of the picture is performed using the derived arrangement order. The second encoding does not include prediction process, transform process and quantization process. An example of the second encoding includes an entropy coding process only to generate the output bitstream wherein the bitstream produced by second encoding is smaller in size than the first encoding. The second encoding includes the encoding of a second parameter indicating a block partitioning operation for a block based on the derived arrangement order.

The derived arrangement order for the plurality of block partitioning operations is associated with a plurality of blocks which are the blocks or coding units associated with the header. Examples are the blocks within a tile, the blocks within a picture and the blocks within a slice of a picture.

(Encoding Apparatus)

FIG. 20 is a block diagram which shows a structure of video/image encoding apparatus in an embodiment of the present disclosure.

The entropy encoder 509 encodes the quantized values outputted from the quantizer 502, and outputs a first bitstream. The analyzer 510 analyzes the output of the first entropy encoder 509, determines common parameters and outputs the analysis results to the second entropy encoder 511. The analyzer 510 determines, from the output of the first entropy encoder 509, an analysis result of an arrangement order for a plurality of block partitioning operations common to a plurality of blocks within at least a portion of the picture.

The second entropy encoder 511 encodes the first bitstream and the analysis results and outputs a second bitstream. The second entropy encoder 511 will, based on the analysis results, output one or more parameters (first parameter) into a header and a plurality of block partitioning operations (second parameters) into a bitstream, wherein the one or more parameters is used to derive the arrangement order for a plurality of block partitioning operations and block partitioning operation is used to partition a block into one or more blocks. The one or more parameters can be used at least for an operation to rearrange the order of the plurality of block partitioning operations, for an operation to add or remove a block partitioning operation to/from the plurality of block partitioning operations, and for an operation to select a plurality of block partitioning operations from a larger set. The second entropy encoder 511 will code the block partitioning operations (second parameters) based on the arrangement order for the plurality of block partitioning operations (first parameter).

At least of a portion of this aspect may be combined with at least a portion of one or more of other aspects. A portion of the process in flow charts, a part of the devices, syntax, and/or other features may be combined with the other aspects.

Embodiment 14

Figure 30:
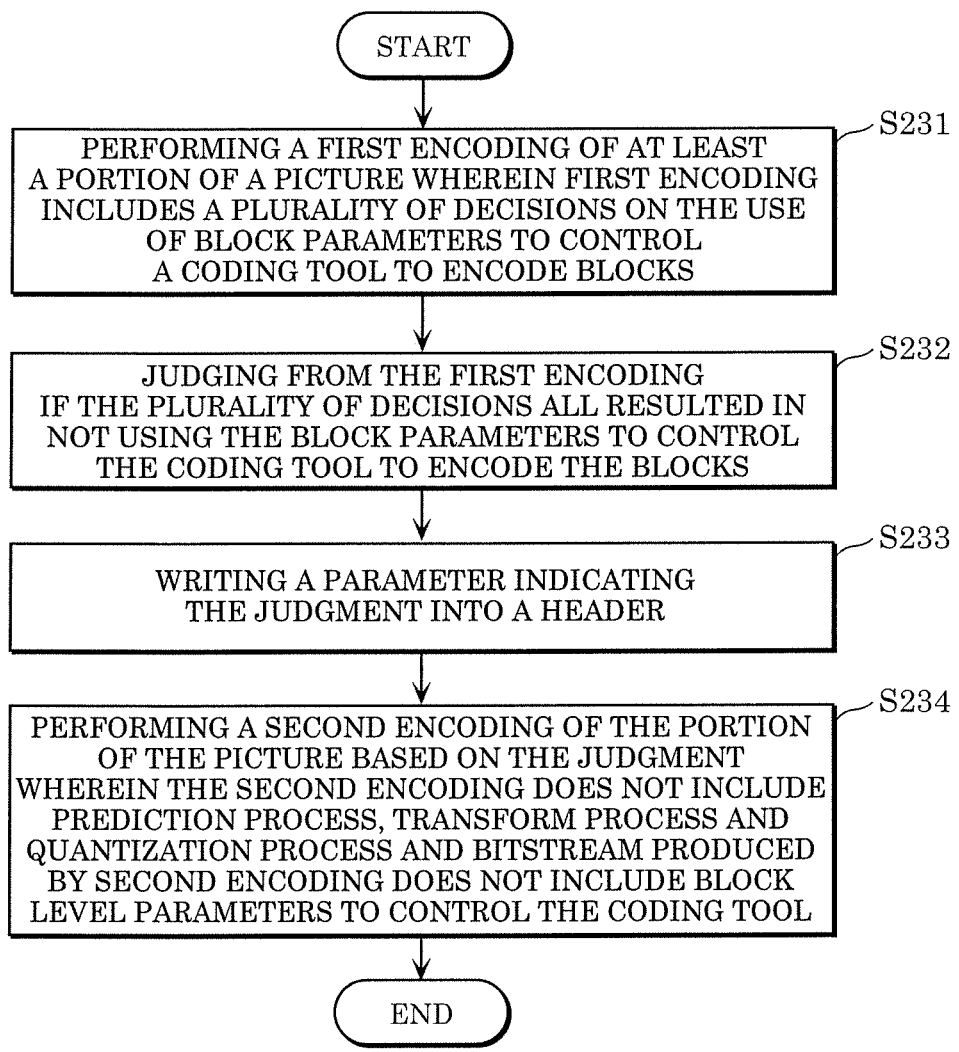
FIG. 30 is a flowchart showing a video encoding process according to Embodiment 14.

Method for encoding video using flexible syntax structure will be described according to an embodiment of the present disclosure as illustrated in FIG. 30. An apparatus for encoding video using flexible syntax structure will be described according to an embodiment of the present disclosure as illustrated in FIG. 20.

(Encoding Process)

FIG. 30 shows a video encoding process according to Embodiment 14. As a first step S231, a first encoding is performed to encode at least a portion of a picture wherein the first encoding includes making a plurality of decisions on the use of a block level parameters to control coding tool to encode blocks within the portion of the picture. Next at step S232, from the first coding, a judgment is made to see if the plurality of decisions all resulted in not using block level parameters to control the coding tool to encode the blocks within the portion of the picture.

Next at step S233, a parameter indicating the judgment is written into a header. Examples of the header can be one of a video parameter set, a sequence parameter set, a picture parameter set, a slice header or an initial part of a slice data as shown in FIG. 13.

Finally, at step S234, a second encoding of the portion of the picture is performed based on the judgment. The second encoding does not include prediction process, transform process and quantization process. An example of the second encoding includes an entropy coding process only to generate the output bitstream wherein the bitstream produced by second encoding is smaller in size than the first encoding.

From the second encoding, a bitstream, which does not include the block level parameters to control the coding tool for each block, is produced.

Examples of the block parameter can be at least one of a mode selection parameter selecting one out of plural intra prediction modes or a mode selection parameter for selecting one out of plural inter picture prediction modes which include at least one of a skip mode and a merge mode.

More examples of the block parameter can be at least one of a reference picture index, an inter prediction mode and a motion vector predictor index. The reference picture index selects a reference picture from a plurality of reference picture, the inter prediction mode selects at least a prediction from single or a prediction from plural reference pictures and the motion vector predictor index selects one of plural motion vector predictors.

More examples of the block parameter can be at least one of an intra most probable mode, an intra most probable mode index, an intra selected mode, an intra selected mode index, an intra luminance prediction mode, and an intra chrominance prediction mode. The intra most probable mode decides whether intra luminance prediction mode is inferred from a plurality of neighboring intra-predicted blocks, the intra most probable mode index selects one of intra luminance prediction mode from plural intra prediction modes of neighboring intra-predicted blocks, the intra selected mode decides whether intra luminance prediction mode is selected from a set of intra prediction mode, wherein said a set of intra prediction mode is a group of intra prediction modes which contains at least one of intra prediction mode but not all of intra prediction modes. The intra selected mode index selects one of intra luminance prediction mode from a set of intra prediction mode, the intra luminance prediction mode selects one of intra prediction mode from plural intra prediction modes, the intra chrominance prediction mode selects one of intra chrominance prediction mode from plural intra chrominance prediction modes, wherein intra chrominance prediction mode can be at least one of an intra prediction mode derived from luminance prediction mode, an intra prediction mode predicted between chrominance components and an intra prediction mode.

More examples of the block parameter can be at least one of a transform mode, a multiple transform mode, a transform matrix index, a transform coded block flag, a secondary transform mode and a secondary transform matrix index. The transform mode decides whether transform is applied to the block or not, the multiple transform mode selects one or multiple transform matrix candidates from transform matrix set, wherein said transform matrix set is a group of orthogonal transform matrix, the transform matrix index selects one of transform matrix from transform matrix set, the transform coded block flag indicates whether coefficients are equal to zero or not, the secondary transform mode decides whether transform is applied to the coefficient block and the secondary transform matrix index selects one of transform matrix from a secondary transform matrix set, wherein said secondary transform matrix set contains at least one of transform matrix and said secondary transform matrix set may depend on block size.

(Encoding Apparatus)

FIG. 20 is a block diagram which shows a structure of video/image encoding apparatus in an embodiment of the present disclosure.

The entropy encoder 509 encodes the quantized values outputted from the quantizer 502, and outputs a first bitstream. The analyzer 510 analyzes the output of the first entropy encoder 509, determines common parameters and outputs the analysis results to the second entropy encoder 511. The analyzer 510 determines, from the output of the first entropy encoder 509, an analysis result to judge if a coding tool is not used to encode the blocks within at least a portion of the picture.

The second entropy encoder 511 encodes the first bitstream and the analysis results and outputs a second bitstream. The second entropy encoder 511 will, based on the analysis results, output a first parameter into a header, wherein the first parameter is used to at least one of the operations to indicate if block parameters is not required to control a coding tool for the portion of a picture that the header is associated with and to indicate that a plurality of second parameters will not be coded in the bitstream. The second entropy encoder 511 will code the second parameters based on the first parameter whereby when the first parameter defines if a block parameter to control a coding tool is to be required, the second parameter will be coded to control the coding tool for one or more blocks.

At least of a portion of this aspect may be combined with at least a portion of one or more of other aspects. A portion of the process in flowcharts, a part of the devices, syntax, and/or other features may be combined with the other aspects.

Embodiment 15

Figure 31:
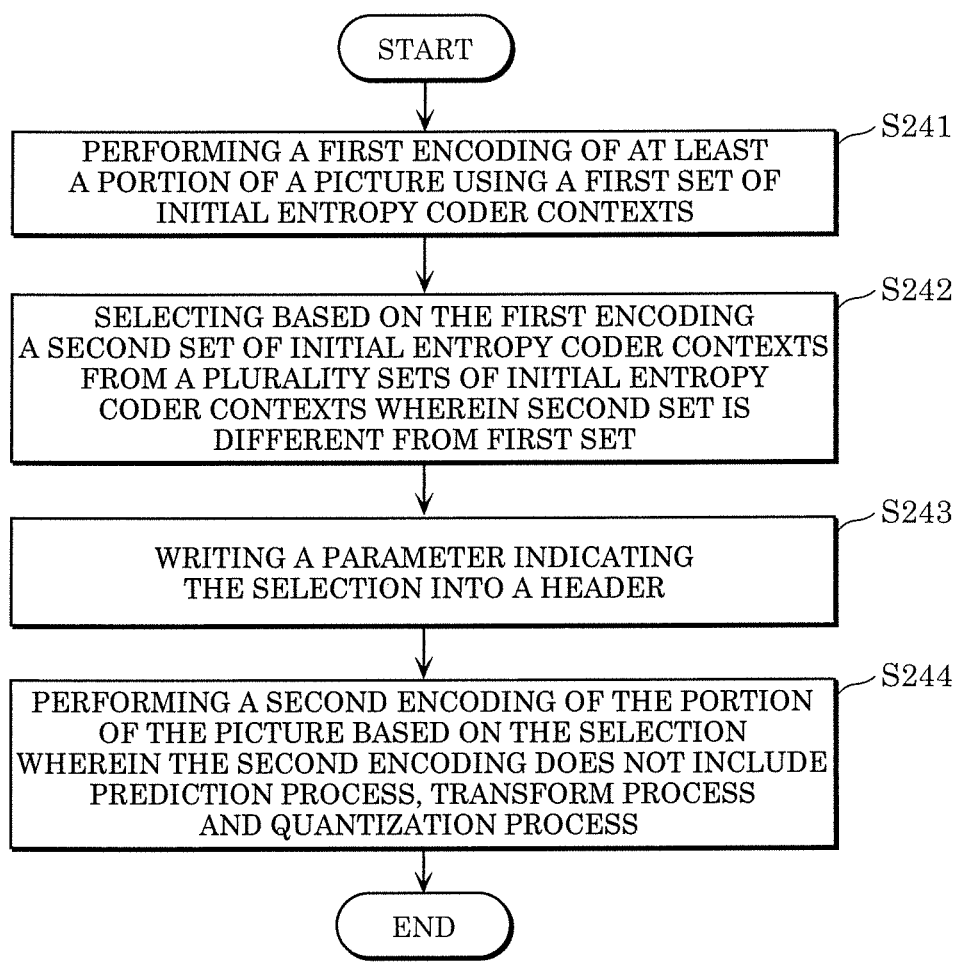
FIG. 31 is a flowchart showing a video encoding process according to Embodiment 15.

Method for encoding video using flexible syntax structure will be described according to an embodiment of the present disclosure as illustrated in FIG. 31. An apparatus for encoding video using flexible syntax structure will be described according to an embodiment of the present disclosure as illustrated in FIG. 20.

(Encoding Process)

FIG. 31 shows a video encoding process according to Embodiment 15. As a first step S241, a first encoding is performed to encode at least a portion of a picture using a first set of initial entropy coder contexts. The initial entropy coder contexts are also initial entropy coder probabilities for an entropy coder. Next at step S242, from the first coding, a second set of initial entropy coder contexts is selected from a plurality sets of initial entropy coder contexts. The selection is based on the criteria that the second set produces a smaller size bitstream than the first set.

Next at step S243, a parameter indicating the selection is written into a header. Examples of the header can be one of a video parameter set, a sequence parameter set, a picture parameter set, a slice header or an initial part of a slice data as shown in FIG. 13.

Finally, at step S244, a second encoding of the portion of the picture is performed based on the selection. The second encoding does not include prediction process, transform process and quantization process. An example of the second encoding includes an entropy coding process only to generate the output bitstream wherein the bitstream produced by second encoding is smaller in size than the first encoding.

(Encoding Apparatus)

FIG. 20 is a block diagram which shows a structure of video/image encoding apparatus in an embodiment of the present disclosure.

The entropy encoder 509 encodes the quantized values outputted from the quantizer 502, and outputs a first bitstream. The analyzer 510 analyzes the output of the first entropy encoder 509 and outputs the analysis results to the second entropy encoder 511. The analyzer 510 determines, from the output of the first entropy encoder 509, an analysis result to select one out of a plurality sets of initial entropy coder probabilities (contexts). The selection is based on the criteria that the selected set produces a smaller size bitstream than the set of initial entropy coder probabilities used by the first entropy encoder 509.

The second entropy encoder 511 encodes the first bitstream and the analysis results and outputs a second bitstream. The second entropy encoder 511 will, based on the analysis results, output a first parameter into a header, wherein the first parameter is used to select one set out of a plurality sets of initial entropy coder probabilities. The second entropy encoder 511 will code second bitstream using the selected set of initial entropy coder probabilities.

At least of a portion of this aspect may be combined with at least a portion of one or more of other aspects. A portion of the process in flow charts, a part of the devices, syntax, and/or other features may be combined with the other aspects.

Embodiment 16

Figure 32:
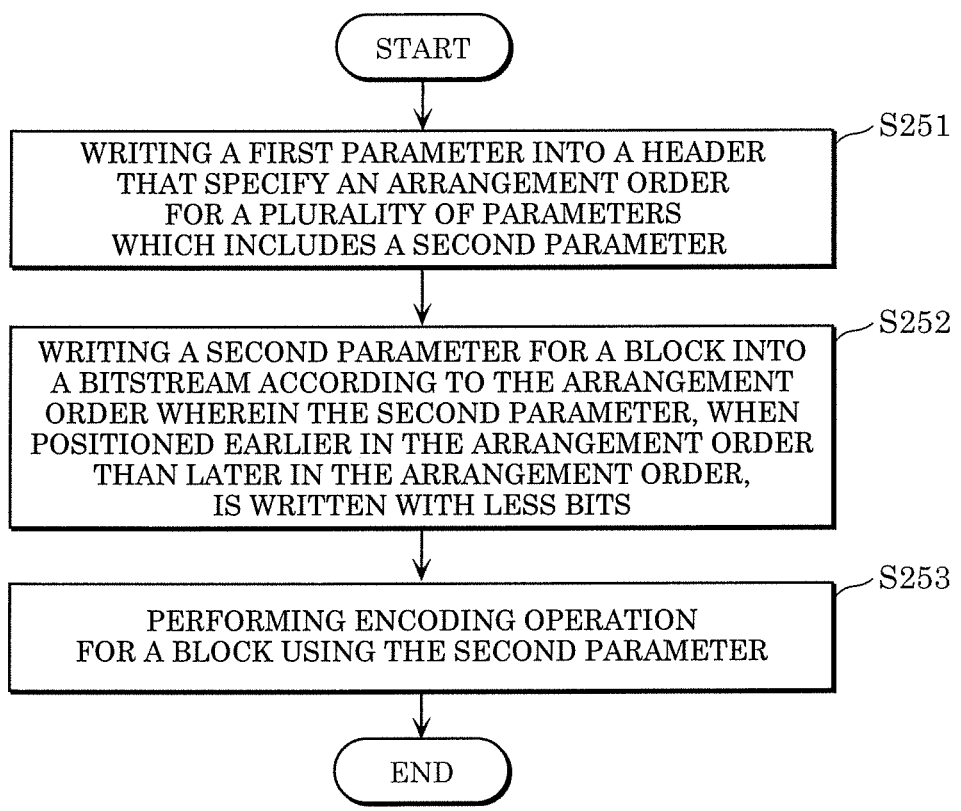
FIG. 32 is a flowchart showing a video encoding process according to Embodiment 16.

Method for encoding video using flexible syntax structure will be described according to an embodiment of the present disclosure as illustrated in FIG. 32. An apparatus for encoding video using flexible syntax structure will be described according to an embodiment of the present disclosure as illustrated in FIG. 12.
(Encoding Process)

FIG. 32 shows a video encoding process according to Embodiment 16. As a first step S251, a first parameter that identifies an arrangement order for a plurality of parameters which includes a second parameter is written into a header. Examples of the header can be one of a video parameter set, a sequence parameter set, a picture parameter set, a slice header or an initial part of a slice data as shown in FIG. 13. The first parameter can also be used for at least one of an operation to rearrange the order of the plurality of block parameters, an operation to add or remove a block parameter to/from the plurality of block parameters, and an operation to select a plurality of block parameters from a larger set.

Figure 33:
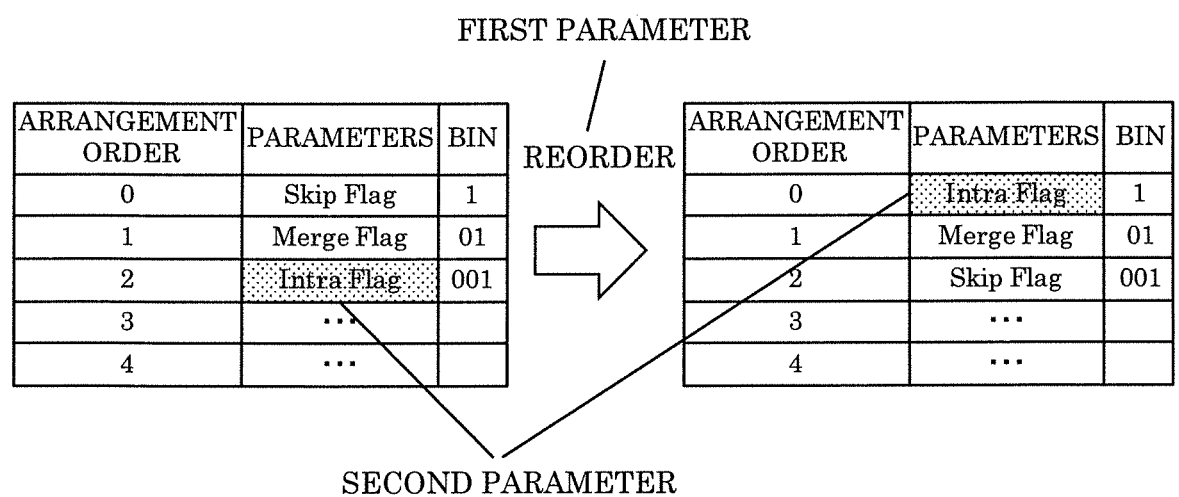
FIG. 33 is a diagram showing an example of arrangement order for a plurality of parameters which includes a second parameter.

Next in step S252, a second parameter to identify an encoding operation for a block is written into a bitstream according to the arrangement order defined by the first parameter. The second parameter, when positioned earlier in the arrangement order, is written with less bits. The second parameter is located as shown in FIG. 13 as the block parameter and it is associated with a coding unit. A coding unit can be also defined as a block. FIG. 33 shows an example of an arrangement order that includes a second parameter. In the example, the second parameter is used to indicate an intra prediction mode for a block. And as shown in the example, the first parameter is used to change the order of this second parameter to an earlier order in the arrangement. By changing the order for the second parameter, the second parameter requires less bits to encode.

At step S253, an encoding operation is performed for a block using the second parameter. Details of the second parameter are the same as in Embodiment 2.
(Encoding Apparatus)

FIG. 12 is a block diagram which shows a structure of video/image encoding apparatus in an embodiment of the present disclosure.

The analyzer 310 analyses the input video, determines common parameters and outputs the analysis results to the entropy encoder 309. The analyzer 310 also outputs the analysis results to the inter/intra predictor 307 whereby the analyzer 310 produces a second parameter that controls the inter prediction units.

The entropy encoder 309 encodes the quantized values outputted from the quantizer 302 and the results from the analyzer 310, and outputs a bitstream. The results from the analyzer 310 is written as first parameter into a header and a plurality of second parameters into the bitstream by the entropy encoder 309 wherein first parameter identify an arrangement order for a plurality of block operations and a second parameter selects one block operation from the plurality of block operations.

At least of a portion of this aspect may be combined with at least a portion of one or more of other aspects. A portion of the process in flow charts, a part of the devices, syntax, and/or other features may be combined with the other aspects.

Embodiment 17

Figure 34:
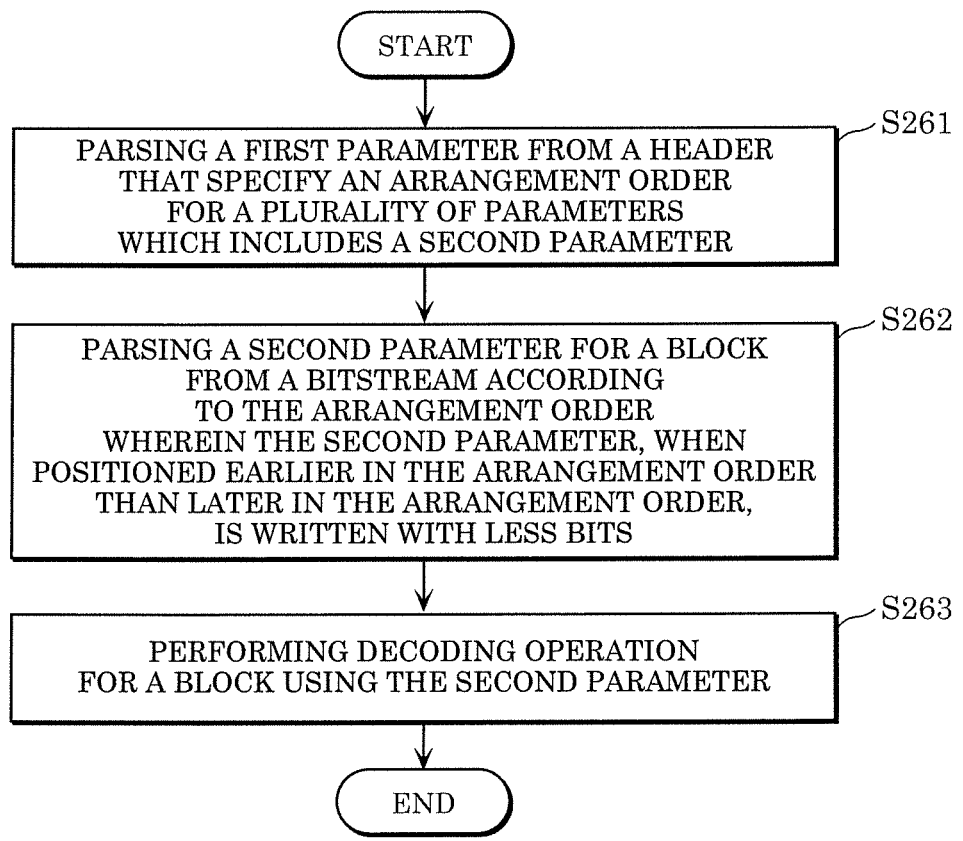
FIG. 34 is a flowchart showing a video decoding process according to Embodiment 17.

Method for decoding video using flexible syntax structure will be described according to an embodiment of the present disclosure as illustrated in FIG. 34. An apparatus for decoding video using flexible syntax structure will be described according to an embodiment of the present disclosure as illustrated in FIG. 18.
(Decoding Process)

FIG. 34 shows a video decoding process according to Embodiment 17. As a first step S261, a first parameter that identifies an arrangement order for a plurality of parameters which includes a second parameter is parsed from a header. Examples of the header can be one of a video parameter set, a sequence parameter set, a picture parameter set, a slice header or an initial part of a slice data as shown in FIG. 13. The first parameter can also be used for at least one of an operation to rearrange the order of the plurality of block parameters, an operation to add or remove a block parameter to/from the plurality of block parameters, and an operation to select a plurality of block parameters from a larger set.

Next in step S262, a second parameter to identify a decoding operation for a block is parsed from a bitstream according to the arrangement order defined by the first parameter. The second parameter, when positioned earlier in the arrangement order, is written with less bits. The second parameter is located as shown in FIG. 13 as the block parameter and it is associated with a coding unit. A coding unit can be also defined as a block. FIG. 33 shows an example of an arrangement order that includes a second parameter. In the example, the second parameter is used to indicate an intra prediction mode for a block. And as shown in the example, the first parameter is used to change the order of this second parameter to an earlier order in the arrangement. By changing the order for the second parameter, the second parameter requires less bits to parse from the bitstream.

At step S263, a decoding operation is performed for a block using the second parameter. Details of the second parameter are the same as in Embodiment 2.
(Decoding Apparatus)

FIG. 18 is a block diagram which shows a structure of video/image decoding apparatus in an embodiment of the present disclosure.

At least of a portion of this aspect may be combined with at least a portion of one or more of other aspects. A portion of the process in flow charts, a part of the devices, syntax, and/or other features may be combined with the other aspects.

Embodiment 18

Figure 35:
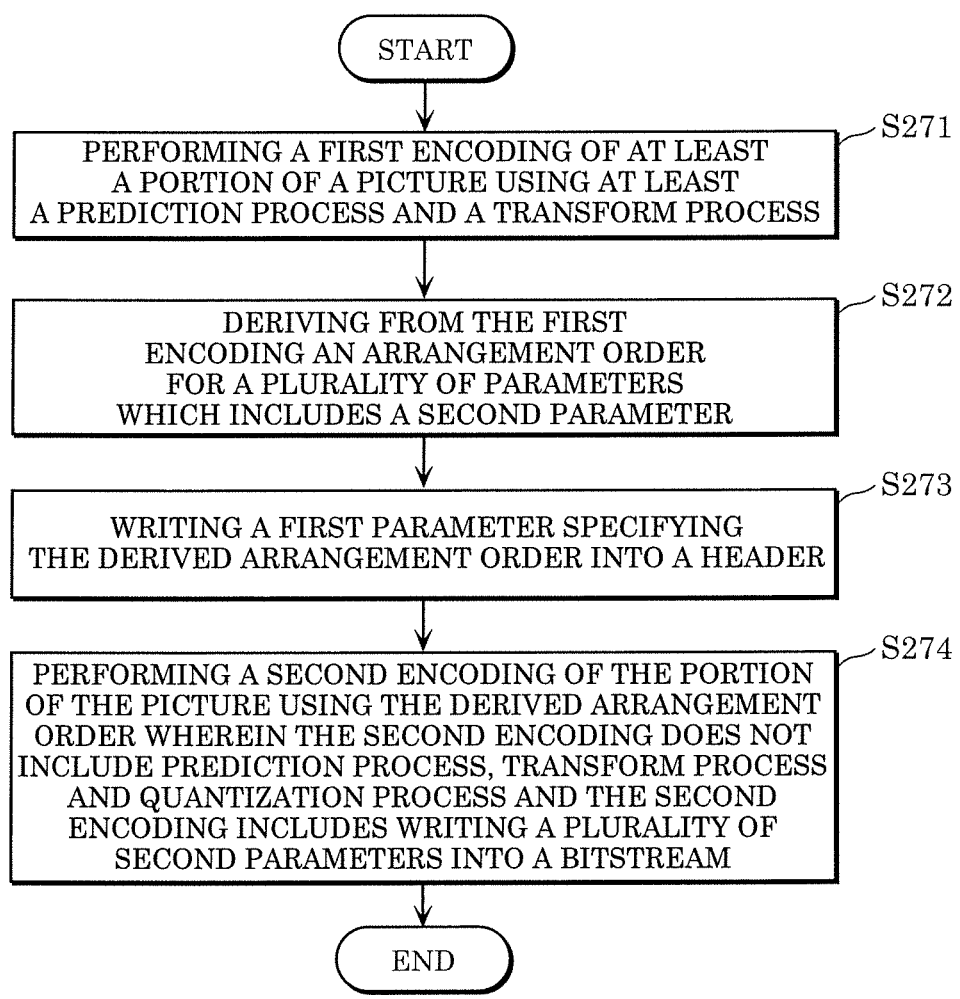
FIG. 35 is a flowchart showing a video encoding process according to Embodiment 18.

Method for encoding video using flexible syntax structure will be described according to an embodiment of the present disclosure as illustrated in FIG. 35. An apparatus for encoding video using flexible syntax structure will be described according to an embodiment of the present disclosure as illustrated in FIG. 20.
(Encoding Process)

FIG. 35 shows a video encoding process according to Embodiment 18. As a first step S271, a first encoding is performed to encode at least a portion of a picture using at least a prediction process and a transform process. Next at step S272, from the first coding, an arrangement order for a plurality of block parameters is derived for the portion of a picture. Each block parameter controls at least one encoding operation of the block.

Next at step S273, a first parameter related to a process to derive the arrangement order is written into a header. Examples of the header can be one of a video parameter set, a sequence parameter set, a picture parameter set, a slice header or an initial part of a slice data as shown in FIG. 13. The first parameter can also be used for at least one of an operation to rearrange the order of the plurality of block parameters, an operation to add or remove a block parameter to/from the plurality of block parameters, and an operation to select a plurality of block parameter from a larger set.

Finally, at step S274, a second encoding of the portion of the picture is performed using the derived arrangement order. The second encoding does not include prediction process, transform process and quantization process. An example of the second encoding includes an entropy coding process only to generate the output bitstream wherein the bitstream produced by second encoding is smaller in size than the first encoding. The second encoding includes the encoding of a second parameter indicating a block operation for a block based on the derived arrangement order. Details of the second parameter are the same as in Embodiment 2.

FIG. 33 shows an example of an arrangement order that includes a second parameter. In the example, the second parameter is used to indicate an intra prediction mode for a block. And as shown in the example, the first parameter is used to change the order of this second parameter to an earlier order in the arrangement. By changing the order for the second parameter, the second parameter requires less bits to encode in the second encoding.

The derived arrangement order for the plurality of block operations is associated with a plurality of blocks which are the blocks or coding units associated with the header. Examples are the blocks within a tile, the blocks within a picture and the blocks within a slice of a picture.
(Encoding Apparatus)

FIG. 20 is a block diagram which shows a structure of video/image encoding apparatus in an embodiment of the present disclosure.

The entropy encoder 509 encodes the quantized values outputted from the quantizer 502, and outputs a first bitstream. The analyzer 510 analyzes the output of the first entropy encoder 509, determines common parameters and outputs the analysis results to the second entropy encoder 511. The analyzer 510 determines, from the output of the first entropy encoder 509, an analysis result of an arrangement order for a plurality of block operations common to a plurality of blocks within at least a portion of the picture.

The second entropy encoder 511 encodes the first bitstream and the analysis results and outputs a second bitstream. The second entropy encoder 511 will, based on the analysis results, output a first parameter into a header and a plurality of block parameters (second parameters) into a bitstream, wherein the first parameter is used to derive the arrangement order for a plurality of block parameters and block parameter is used to encode a block into one or more blocks. The first parameter can be used at least for an operation to rearrange the order of the plurality of block parameter, for an operation to add or remove a block parameter to/from the plurality of block parameters, and for an operation to select a plurality of block parameters from a larger set. The second entropy encoder 511 will code the block parameters (second parameters) based on the arrangement order for the plurality of block parameters (first parameter).

At least of a portion of this aspect may be combined with at least a portion of one or more of other aspects. A portion of the process in flow charts, a part of the devices, syntax, and/or other features may be combined with the other aspects.

Embodiment 19

Figure 36:
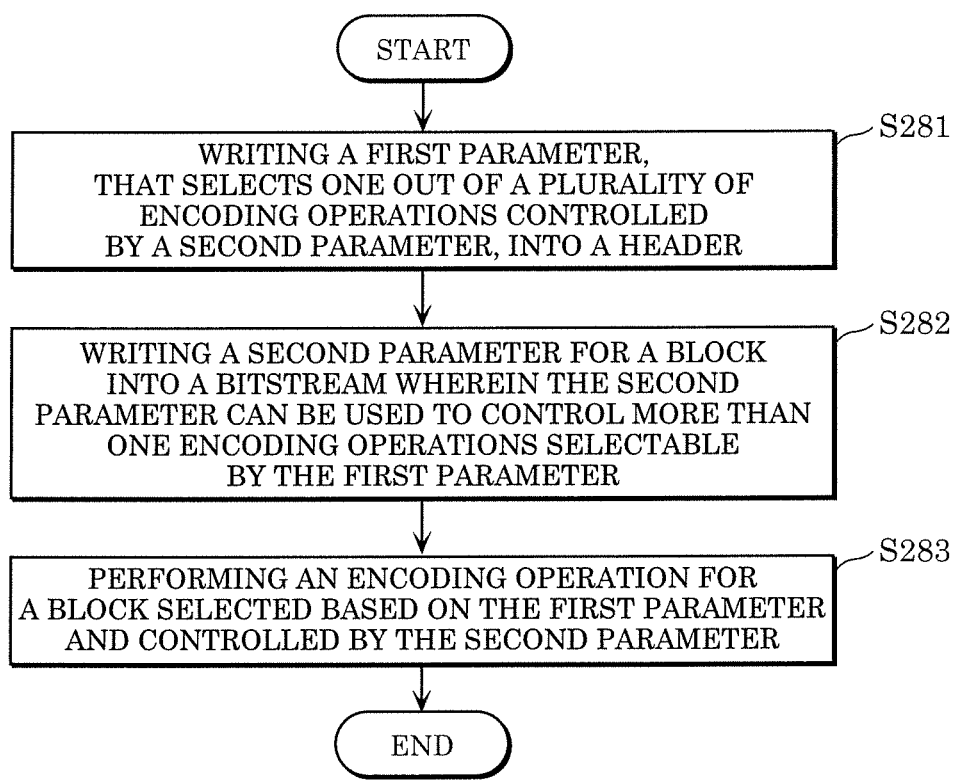
FIG. 36 is a flowchart showing a video encoding process according to Embodiment 19.

Method for encoding video using flexible syntax structure will be described according to an embodiment of the present disclosure as illustrated in FIG. 36. An apparatus for encoding video using flexible syntax structure will be described according to an embodiment of the present disclosure as illustrated in FIG. 12.
(Encoding Process)

FIG. 36 shows a video encoding process according to Embodiment 19. As a first step S281, a first parameter that selects one out of a plurality of encoding operations, controlled by a second parameter, is written into a header. Examples of the header can be one of a video parameter set, a sequence parameter set, a picture parameter set, a slice header or an initial part of a slice data as shown in FIG. 13.

Next in step S282, a second parameter for a block is written into a bitstream. The second parameter is used to control more than one encoding operation and the first parameter selects one out of a plurality of encoding operations to be controlled by the second parameter. The second parameter is located as shown in FIG. 13 as the block parameter and it is associated with a coding unit. A coding unit can be also defined as a block.

Figure 37:
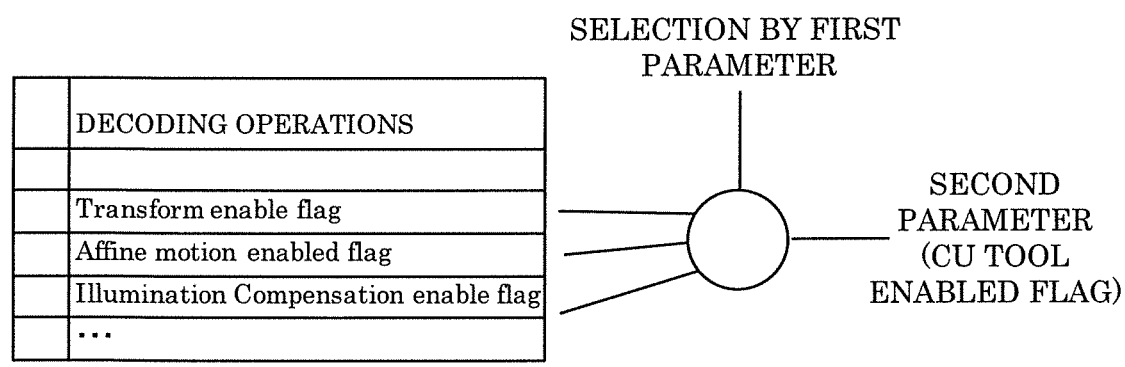
FIG. 37 is a diagram showing an example to select a decoding operation from a plurality of decoding operations which is controlled by a second parameter.

At step S283, an encoding operation is performed for a block based on the first parameter and controlled by the second parameter. FIG. 37 shows an example to select one out of a plurality of block operations using the first parameter. As shown in the example, the first parameter selects one out of the plurality of encoding tools to be controlled at the block. Based on the selection by the first parameter, the second parameter at the block level controls the enabling & disabling of the coding tool at the block level.

When selected by the first parameter, the second parameter has the same details as in Embodiment 2.
(Encoding Apparatus)

FIG. 12 is a block diagram which shows a structure of video/image encoding apparatus in an embodiment of the present disclosure.

The analyzer 310 analyses the input video, determines common parameters and outputs the analysis results to the entropy encoder 309. The analyzer 310 also outputs the analysis results to the inter/intra predictor 307 whereby the analyzer 310 produces a second parameter that controls the inter prediction units.

The entropy encoder 309 encodes the quantized values outputted from the quantizer 302 and the results from the analyzer 310, and outputs a bitstream. The results from the analyzer 310 is written as first parameter into a header and a plurality of second parameters into the bitstream by the entropy encoder 309 wherein first parameter selects one out of a plurality of coding tools and a second parameter controls the coding tool selected by the first parameter.

At least of a portion of this aspect may be combined with at least a portion of one or more of other aspects. A portion of the process in flowcharts, a part of the devices, syntax, and/or other features may be combined with the other aspects.

Embodiment 20

Figure 38:
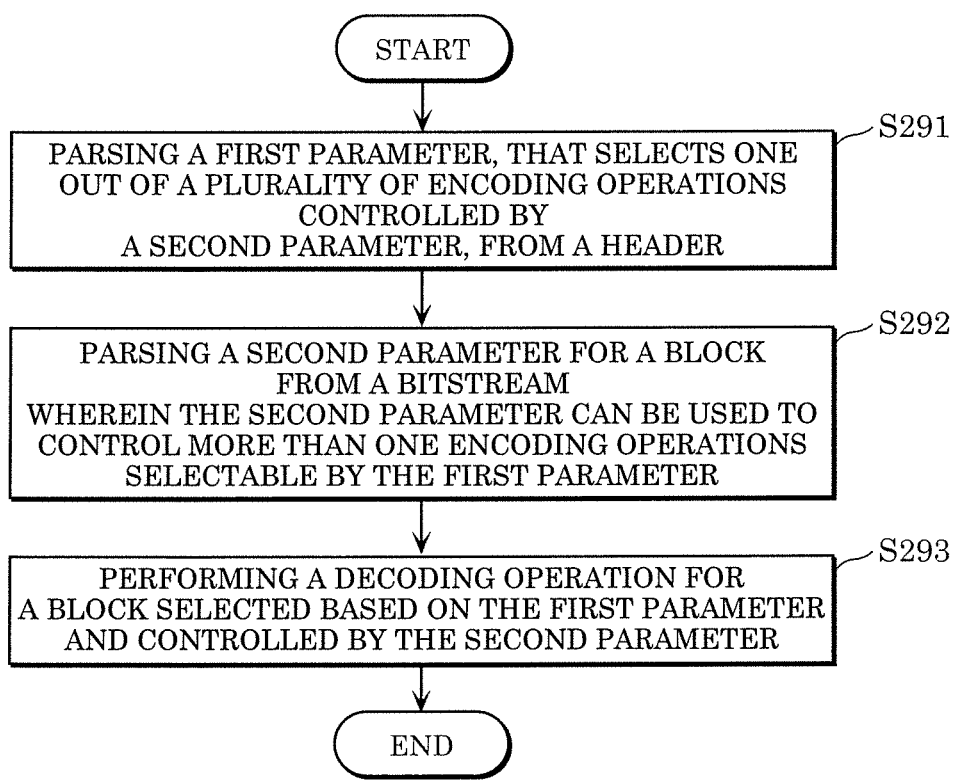
FIG. 38 is a flowchart showing a video decoding process according to Embodiment 20.

Method for decoding video using flexible syntax structure will be described according to an embodiment of the present disclosure as illustrated in FIG. 38. An apparatus for decoding video using flexible syntax structure will be described according to an embodiment of the present disclosure as illustrated in FIG. 18.

(Decoding Process)

FIG. 38 shows a video decoding process according to Embodiment 20. As a first step S291, a first parameter that selects one out of a plurality of decoding operations, controlled by a second parameter, is parsed from a header.

Examples of the header can be one of a video parameter set, a sequence parameter set, a picture parameter set, a slice header or an initial part of a slice data as shown in FIG. 13.

Next in step S292, a second parameter for a block is written into a bitstream. The second parameter is used to control more than one decoding operation and the first parameter selects one out of a plurality of decoding operations to be controlled by the second parameter. The second parameter is located as shown in FIG. 13 as the block parameter and it is associated with a coding unit. A coding unit can be also defined as a block.

At step S293, a decoding operation is performed for a block based on the first parameter and controlled by the second parameter. FIG. 37 shows an example to select one out of a plurality of block operations using the first parameter. As shown in the example, the first parameter selects one out of the plurality of decoding tools to be controlled at the block. Based on the selection by the first parameter, the second parameter at the block level controls the enabling & disabling of the decoding tool at the block level. When selected by the first parameter, the second parameter has the same details as in Embodiment 2.

(Decoding Apparatus)

FIG. 18 is a block diagram which shows a structure of video/image decoding apparatus in an embodiment of the present disclosure.

As described above, an encoding apparatus according to an aspect of the present disclosure includes: a circuit; and a memory. The circuit, using the memory: writes a first parameter that specifies an arrangement order for a plurality of parameters which includes a second parameter, into a header; writes a second parameter for a block into a bitstream according to the arrangement order wherein the second parameter, when positioned earlier in the arrangement order than later in the arrangement order, is written with less bits; and performs encoding operation for a block using the second parameter.

For example, the circuit may, using the memory: perform a first encoding of at least a portion of a picture using at least a prediction process and a transform process; derive from the first encoding the arrangement order for the plurality of parameters which includes the second parameter; write the first parameter specifying the derived arrangement order into the header; and perform a second encoding of the portion of the picture using the derived arrangement order wherein the second encoding does not include a prediction process, a transform process, and a quantization process and the second encoding includes writing a plurality of second parameters into a bitstream.

For example, the second parameter may be used in at least one of an inter prediction process, an intra prediction process, a transformation process or quantization process.

For example, writing the second parameter with less bits may include binarizing the second parameter into less binary symbols.

For example, the circuit may, using the memory; write a third parameter that identifies an arrangement order for a plurality of partitioning operations into a header; write a fourth parameter to identify a partitioning operation for a block into a bitstream; perform an operation to partition a block based on the third parameter and the fourth parameter; and encode the partitioned block.

For example, the circuit may, using the memory: perform a first encoding of at least a portion of a picture using at least a prediction process and a transform process; derive from the first encoding an arrangement order for a plurality of block partitioning operations for the portion of the picture; write one or more parameters related to the derived arrangement order into a header; and perform a second encoding of the portion of the picture using the derived arrangement order wherein the second encoding does not include a prediction process, a transform process, and a quantization process.

For example, the plurality of block partitioning operations may include at least one of an operation to split a block into four blocks, an operation to split a block horizontally into two blocks, and an operation to split a block vertically into two blocks, and the second encoding may include writing a block partitioning operation into a bitstream using the derived arrangement order.

For example, the circuit may, using the memory: write one or more parameters related to a process to define a plurality of motion vector candidates into a header; write a motion vector candidate index for a block into a bitstream; derive a motion vector for the block using at least the plurality of motion vector candidates and the motion vector candidate index; and encode a block using a motion compensation process based on the derived motion vector.

For example, the circuit may, using the memory: perform a first encoding of at least a portion of a picture using at least a prediction process; derive from the first encoding a plurality of motion vector candidates for the portion of the picture; write one or more parameters related to the plurality of motion vector candidates into a header; and performs a second encoding of the portion of the picture using the plurality of motion vector candidates wherein the second encoding does not include a prediction process, a transform process, and a quantization process.

For example, the second encoding may include writing a motion vector candidate index into a bitstream using the plurality of motion vector candidates.

For example, the one or more parameters may be used for at least one of an operation to rearrange the order of the plurality of motion vector candidates, an operation to add or remove a motion vector candidate to/from the plurality of motion vector candidates, and an operation to select a plurality of motion vector candidates from a larger set of candidates.

For example, the circuit may, using the memory: perform a first encoding of at least a portion of a picture wherein first encoding includes a plurality of decisions on use of a block parameter to control a coding tool to encode blocks; judge from the first encoding if the plurality of decisions all resulted in a common decision of not using the block parameter to control the coding tool to encode the blocks; write a parameter indicating the judgment into a header; and perform a second encoding of the portion of the picture based on the judgment wherein the second encoding does not include a prediction process, a transform process, and a quantization process, and the bitstream produced by the second encoding does not include block parameters to control the coding tool for each block.

For example, the coding tool may be one of an affine motion vector prediction tool, an illumination compensation tool, a chrominance prediction tool using luminance samples, and a block sample prediction tool utilizing a search algorithm.

For example, the circuit may, using the memory: perform a first encoding of at least a portion of a picture using a first set of initial entropy coding probabilities or contexts; select from the first encoding a second set of initial entropy coding probabilities or contexts wherein the second set is different from the first set; write a parameter indicating the selection into a header; and perform a second encoding of the portion of the picture based on the selection wherein the second encoding does not include a prediction process, a transform process, and a quantization process.

For example, the circuit may, using the memory: write a fifth parameter that selects one out of a plurality of encoding operations controlled by a sixth parameter, into a header; write the sixth parameter for a block into a bitstream wherein the sixth parameter is used to control more than one encoding operation selectable by the fifth parameter; and perform an encoding operation for a block selected based on the fifth parameter and controlled by the sixth parameter.

A decoding apparatus according to an aspect of the present disclosure includes: a circuit; and a memory. The circuit may, using the memory: parse a first parameter that specifies an arrangement order for a plurality of parameters which includes a second parameter, from a header; parse a second parameter for a block from a bitstream according to the arrangement order wherein the second parameter, when positioned earlier in the arrangement order than later in the arrangement order, is parsed with less bits; and perform decoding operation for a block using the second parameter.

For example, the second parameter may be used in at least one of an inter prediction process, an intra prediction process, a transformation process, and a quantization process.

For example, parsing the second parameter with less bits may include converting less binary symbols into a value for the second parameter.

For example, the circuit may, using the memory: parse a third parameter that identifies an arrangement order for a plurality of block partitioning operations from a header; parse a fourth parameter to identify a partitioning operation for a block from a bitstream; parse an operation to partition a block based on the third parameter and the fourth parameter; and decode the partitioned block.

For example, the plurality of block partitioning operations may include at least one of an operation to split a block into four blocks, an operation to split a block horizontally into two blocks, and an operation to split a block vertically into two blocks, and the second encoding may include writing a block partitioning operation into a bitstream using the derived arrangement order.

For example, the circuit may, using the memory: parse one or more parameters related to the process to define plurality of motion vector candidates from a header; parse a motion vector candidate index for a block from a bitstream; derive a motion vector for the block using at least the plurality of motion vector candidates and the motion vector candidate index; and decode a block using a motion compensation process based on the derived motion vector.

For example, the one or more parameters may be used for at least one of an operation to rearrange the order of the plurality of motion vector candidates, an operation to add or remove a motion vector candidate to/from the plurality of motion vector candidates, and an operation to select a plurality of motion vector candidates from a larger set of candidates.

For example, the circuit may, using the memory: parse a fifth parameter that selects one out of a plurality of decoding operations controlled by a sixth parameter, from a header; parse the sixth parameter for a block from a bitstream wherein the sixth parameter is used to control more than one decoding operation selectable by the fifth parameter; and perform a decoding operation for a block selected based on the fifth parameter and controlled by the sixth parameter.

An encoding method according to an aspect of the present disclosure includes: writing a first parameter that specifies an arrangement order for a plurality of parameters which includes a second parameter, into a header; writing a second parameter for a block into a bitstream according to the arrangement order wherein the second parameter, when positioned earlier in the arrangement order than later in the arrangement order, is written with less bits; and performing encoding operation for a block using the second parameter.

A decoding method according to an aspect of the present disclosure includes: parsing a first parameter that specifies an arrangement order for a plurality of parameters which includes a second parameter, from a header; parsing a second parameter for a block from a bitstream according to the arrangement order wherein the second parameter, when positioned earlier in the arrangement order than later in the arrangement order, is parsed with less bits; and performing decoding operation for a block using the second parameter.

Hereinbefore, a encoding apparatus and a decoding apparatus according to one or more aspects have been described based on embodiments; however, the present disclosure is not limited to these embodiments. Various modifications to these embodiments that are conceivable to those skilled in the art, as well as embodiments resulting from combinations of structural elements of different embodiments may be included within the scope of one or more aspects, as long as such modifications and embodiments do not depart from the essence of the present disclosure.

At least of a portion of this aspect may be combined with at least a portion of one or more of other aspects. A portion of the process in flow charts, a part of the devices, syntax, and/or other features may be combined with the other aspects.

Embodiment 21

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder-decoder that includes both the image encoder and the image decoder. Other configurations included in the system may be modified on a case-by-case basis.

(Usage Examples)

Figure 39:
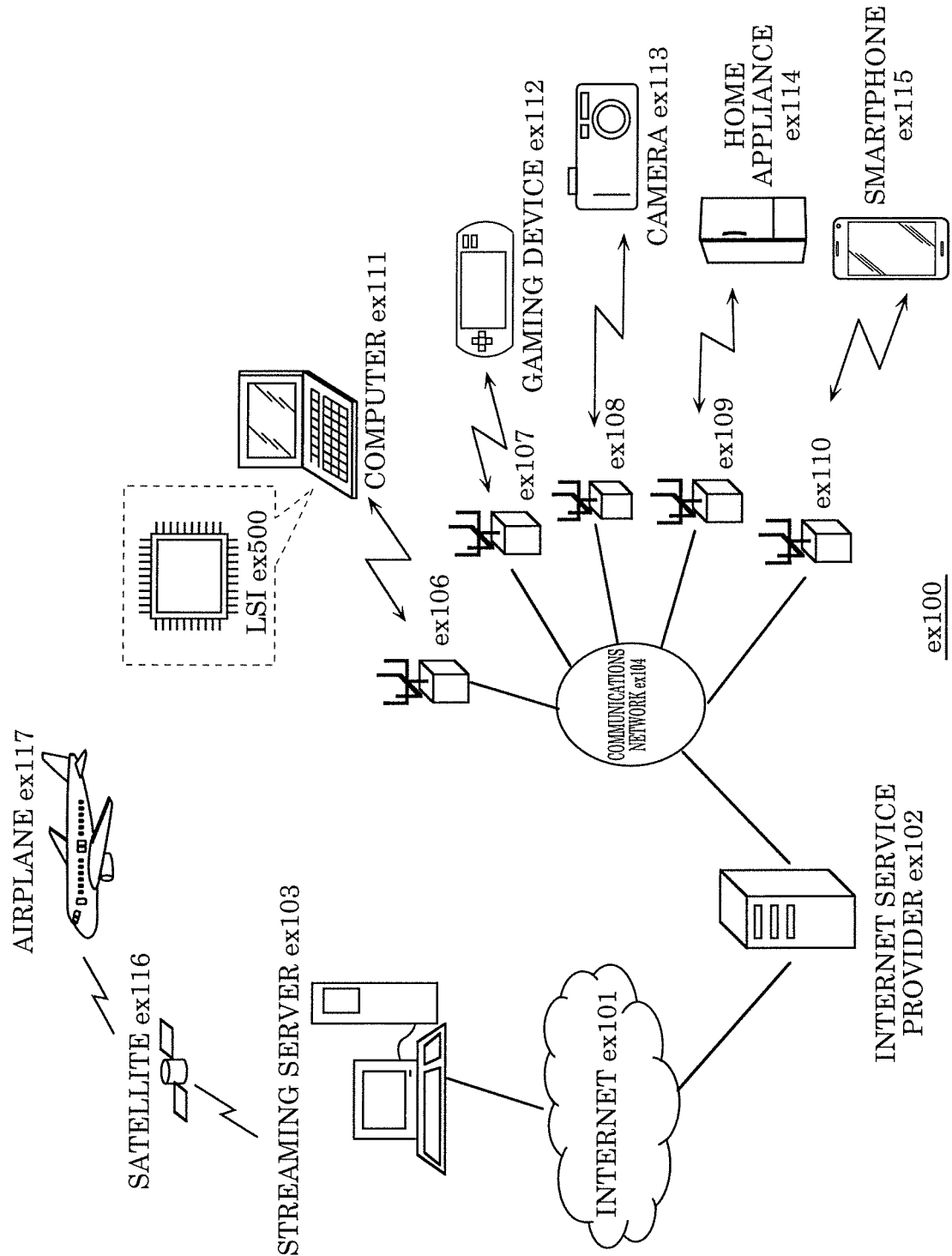
FIG. 39 illustrates an overall configuration of a content providing system for implementing a content distribution service.

FIG. 39 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations.

Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

(Decentralized Processing) Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming. Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

(3D, Multi-Angle)

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result. In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

Figure 40:
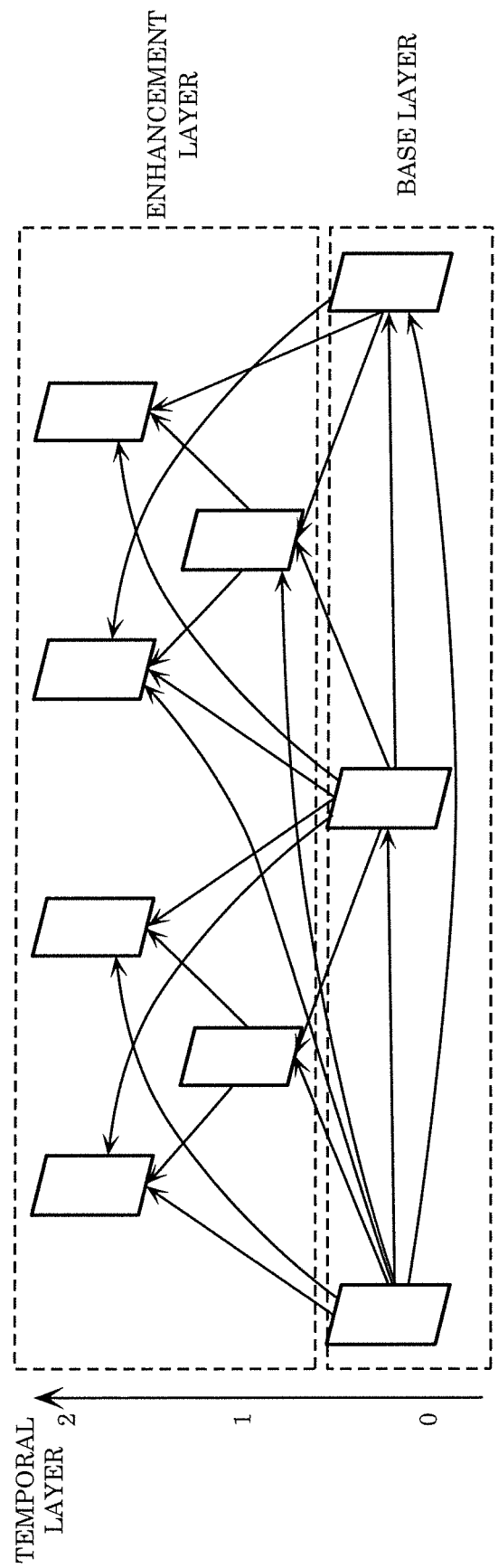
FIG. 40 illustrates one example of encoding structure in scalable encoding.

(Scalable Encoding) The switching of content will be described with reference to a scalable stream, illustrated in FIG. 40, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 40. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Figure 41:
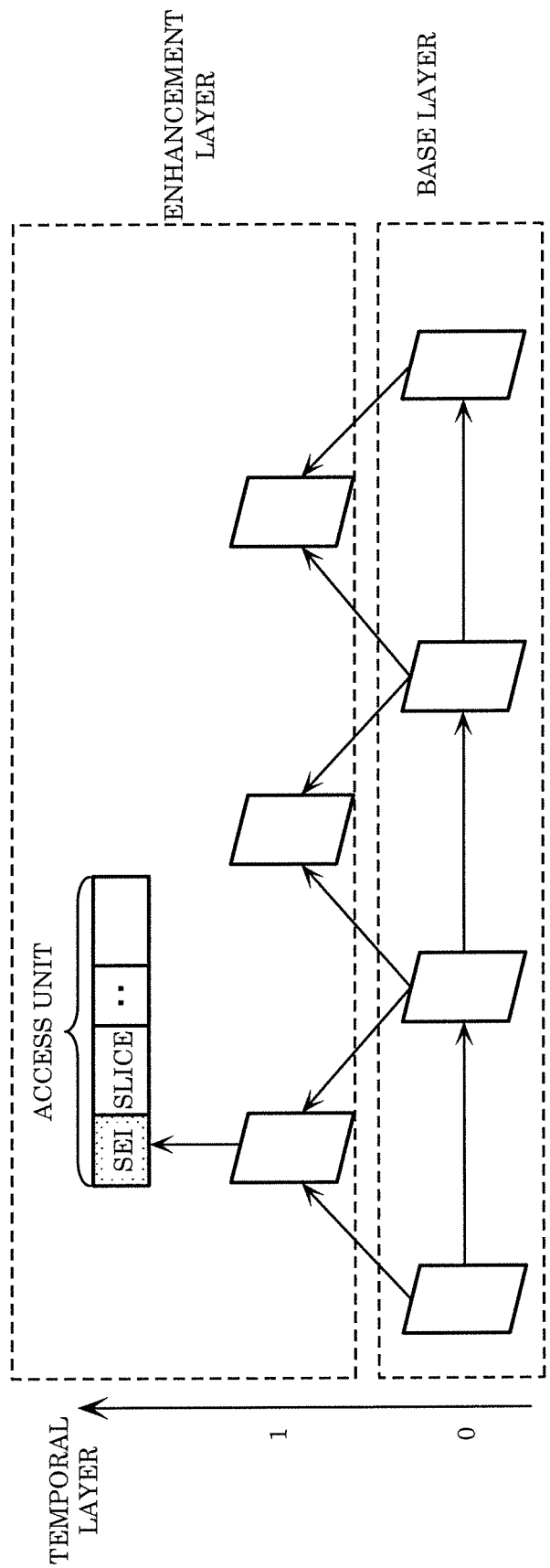
FIG. 41 illustrates one example of encoding structure in scalable encoding.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing. Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 41, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

(Web Page Optimization)

Figure 42:
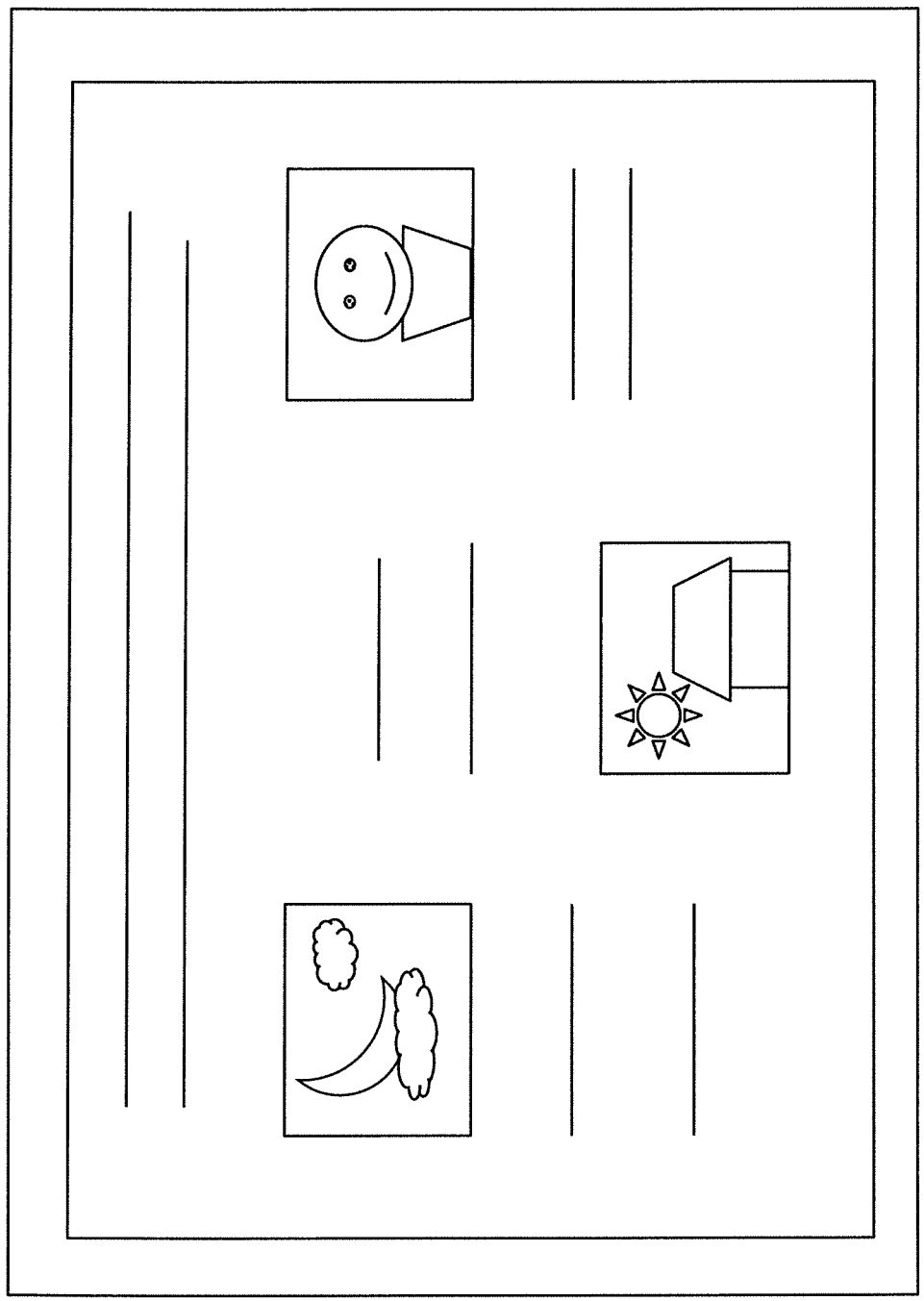
FIG. 42 illustrates an example of a display screen of a web page.
Figure 43:
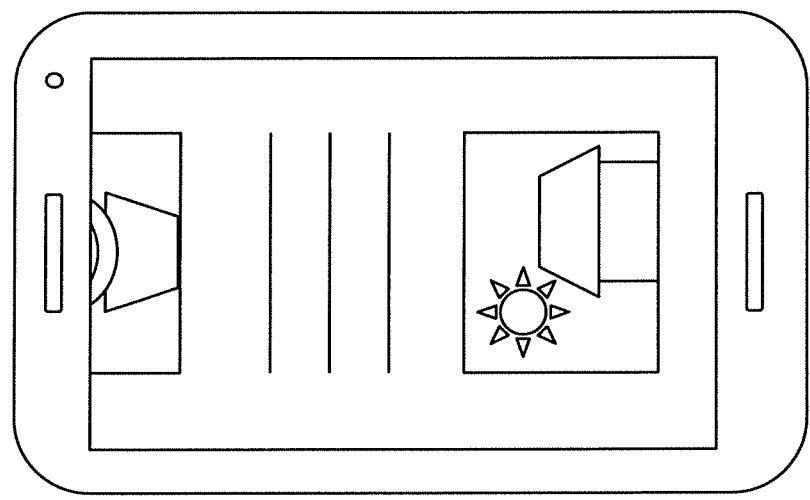
FIG. 43 illustrates an example of a display screen of a web page.

FIG. 42 illustrates an example of a display screen of a web page on, for example, computer ex111. FIG. 43 illustrates an example of a display screen of a web page on, for example, smartphone ex115. As illustrated in FIG. 42 and FIG. 43, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

(Autonomous Driving)

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

(Streaming of Individual Content)

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

(Other Usage Examples)

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

(Hardware Configuration)

Figure 44:
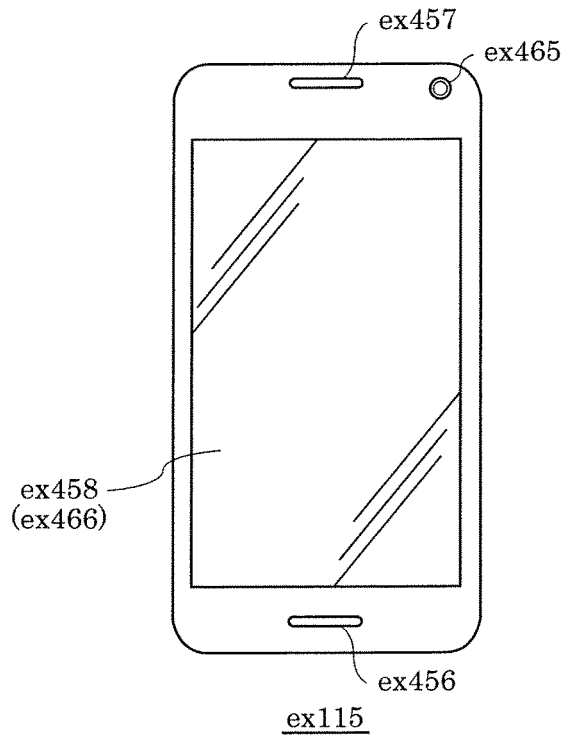
FIG. 44 illustrates one example of a smartphone.
Figure 45:
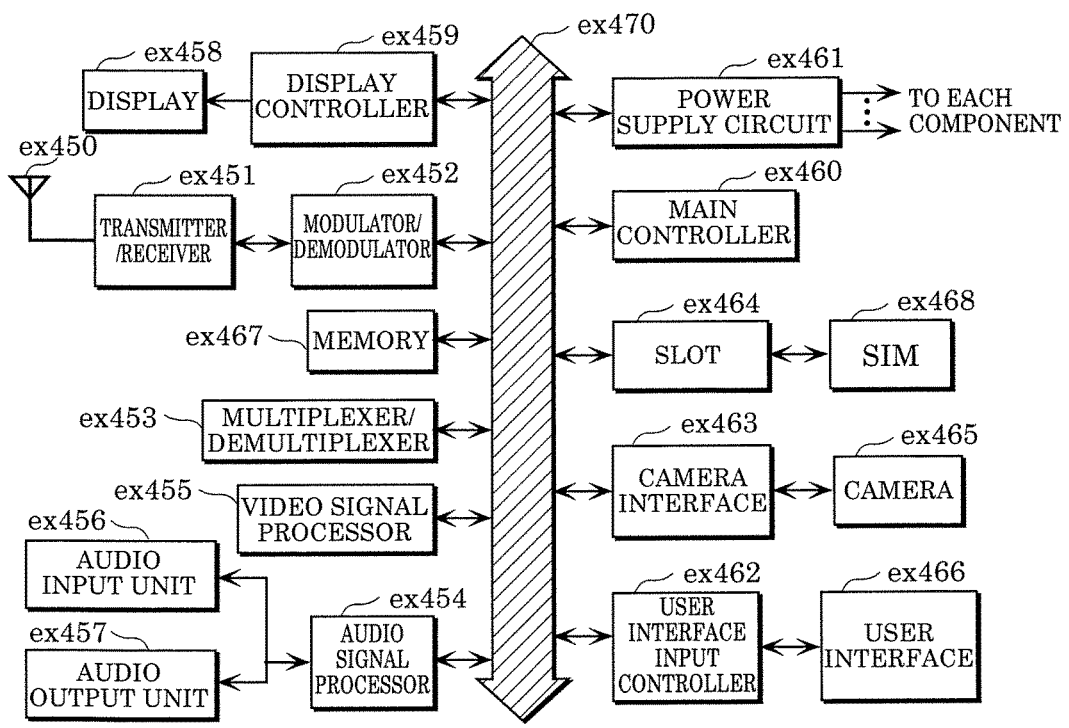
FIG. 45 is a block diagram illustrating a configuration example of a smartphone.

FIG. 44 illustrates smartphone ex115. FIG. 45 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

At least of a portion of this aspect may be combined with at least a portion of one or more of other aspects. A portion of the process in flowcharts, a part of the devices, syntax, and/or other features may be combined with the other aspects.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

One or more exemplary embodiments disclosed herein are applicable to image coding methods, image decoding methods, image coding apparatuses, and image decoding apparatuses. The image coding method, the image decoding method, the image coding apparatus, and the image decoding apparatus consistent with one or more exemplary embodiments of the present disclosure can be used for information display devices and imaging devices with high resolution which include televisions, digital video recorders, car navigation systems, cellular phones, digital cameras, and digital video cameras.

What is claimed is:
1. An encoding apparatus, comprising:
 a circuit; and
 a memory,
 wherein the circuit, using the memory:
  writes a first parameter that specifies an arrangement order for a plurality of parameters which includes a second parameter, into a header, the plurality of parameters including a motion vector predictor and an intra most probable mode, and the second parameter being a reference picture index;
  writes the second parameter for a block into a bitstream according to the arrangement order, the second parameter being a parameter related to inter prediction; and
 performs encoding operation for a block using the second parameter,
 wherein when writing the second parameter into the bitstream according to the arrangement order, the second parameter is written with less bits when the second parameter is positioned earlier in the arrangement order than when the second parameter is positioned later in the arrangement order, and
 wherein when writing the second parameter into the bitstream according to the arrangement order, the second parameter is binarized into less binary symbols when the second parameter is positioned earlier in the arrangement order than when the second parameter is positioned later in the arrangement order.

2. The encoding apparatus according to claim 1,
wherein, the circuit, using the memory:
- performs a first encoding of at least a portion of a picture using at least a prediction process and a transform process;
- derives from the first encoding the arrangement order for the plurality of parameters which includes the second parameter;
- writes the first parameter specifying the derived arrangement order into the header; and
- performs a second encoding of the portion of the picture using the derived arrangement order wherein the second encoding does not include a prediction process, a transform process, and a quantization process and the second encoding includes writing a plurality of second parameters into a bitstream.

3. The encoding apparatus according to claim 1,
wherein the circuit, using the memory:
- writes a third parameter that identifies an arrangement order for a plurality of partitioning operations into a header;
- writes a fourth parameter to identify a partitioning operation for a block into a bitstream;
- performs an operation to partition a block based on the third parameter and the fourth parameter; and
- encodes the partitioned block.

4. The encoding apparatus according to claim 3,
wherein the plurality of block partitioning operations includes at least one of an operation to split a block into four blocks, an operation to split a block horizontally into two blocks, and an operation to split a block vertically into two blocks, and
the second encoding includes writing a block partitioning operation into a bitstream using the derived arrangement order.

5. The encoding apparatus according to claim 1,
wherein the circuit, using the memory:
- performs a first encoding of at least a portion of a picture using at least a prediction process and a transform process;
- derives from the first encoding an arrangement order for a plurality of block partitioning operations for the portion of the picture;
- writes one or more parameters related to the derived arrangement order into a header; and
- performs a second encoding of the portion of the picture using the derived arrangement order wherein the second encoding does not include a prediction process, a transform process, and a quantization process.

6. The encoding apparatus according to claim 1,
wherein the circuit, using the memory:
- writes one or more parameters related to a process to define a plurality of motion vector candidates into a header;
- writes a motion vector candidate index for a block into a bitstream;
- derives a motion vector for the block using at least the plurality of motion vector candidates and the motion vector candidate index; and
- encodes a block using a motion compensation process based on the derived motion vector.

7. The encoding apparatus according to claim 1,
wherein the circuit, using the memory:
- performs a first encoding of at least a portion of a picture using at least a prediction process;
- derives from the first encoding a plurality of motion vector candidates for the portion of the picture;
- writes one or more parameters related to the plurality of motion vector candidates into a header; and
- performs a second encoding of the portion of the picture using the plurality of motion vector candidates wherein the second encoding does not include a prediction process, a transform process, and a quantization process.

8. The encoding apparatus according to claim 7,
wherein the second encoding includes writing a motion vector candidate index into a bitstream using the plurality of motion vector candidates.

9. The encoding apparatus according to claim 7,
wherein the one or more parameters is used for at least one of an operation to rearrange the order of the plurality of motion vector candidates, an operation to add or remove a motion vector candidate to/from the plurality of motion vector candidates, and an operation to select a plurality of motion vector candidates from a larger set of candidates.

10. The encoding apparatus according to claim 1,
wherein the circuit, using the memory:
- performs a first encoding of at least a portion of a picture wherein first encoding includes a plurality of decisions on use of a block parameter to control a coding tool to encode blocks;
- judges from the first encoding if the plurality of decisions all resulted in a common decision of not using the block parameter to control the coding tool to encode the blocks;
- writes a parameter indicating the judgment into a header; and
- performs a second encoding of the portion of the picture based on the judgment wherein the second encoding does not include a prediction process, a transform process, and a quantization process, and the bitstream produced by the second encoding does not include block parameters to control the coding tool for each block.

11. The encoding apparatus according to claim 10,
wherein the coding tool is one of an affine motion vector prediction tool, an illumination compensation tool, a chrominance prediction tool using luminance samples, and a block sample prediction tool utilizing a search algorithm.

12. The encoding apparatus according to claim 1,
wherein the circuit, using the memory:
- performs a first encoding of at least a portion of a picture using a first set of initial entropy coding probabilities or contexts;
- selects from the first encoding a second set of initial entropy coding probabilities or contexts wherein the second set is different from the first set;
- writes a parameter indicating the selection into a header; and
- performs a second encoding of the portion of the picture based on the selection wherein the second encoding does not include a prediction process, a transform process, and a quantization process.

13. The encoding apparatus according to claim 1,
wherein the circuit, using the memory:
- writes a fifth parameter that selects one out of a plurality of encoding operations controlled by a sixth parameter, into a header;

writes the sixth parameter for a block into a bitstream wherein the sixth parameter is used to control more than one encoding operation selectable by the fifth parameter; and performs an encoding operation for a block selected based on the fifth parameter and controlled by the sixth parameter.

14. The encoding apparatus according to claim 1, wherein the plurality of parameters include an inter prediction mode.

15. A decoding apparatus, comprising:
a circuit; and
a memory,
wherein the circuit, using the memory:
   parses a first parameter that specifies an arrangement order for a plurality of parameters which includes a second parameter, from a header, the plurality of parameters including a motion vector predictor and an intra most probable mode, and the second parameter being a reference picture index;
   parses the second parameter for a block from a bitstream according to the arrangement order, the second parameter being a parameter related to inter prediction; and
   performs decoding operation for a block using the second parameter,
wherein when parsing the second parameter from the bitstream according to the arrangement order, the second parameter is written with less bits when the second parameter is positioned earlier in the arrangement order than when the second parameter is positioned later in the arrangement order, and
wherein when parsing the second parameter from the bitstream according to the arrangement order, the second parameter is converted using less binary symbols when the second parameter is positioned earlier in the arrangement order than when the second parameter is positioned later in the arrangement order.

16. The decoding apparatus according to claim 15, wherein the circuit, using the memory:
   parses a third parameter that identifies an arrangement order for a plurality of block partitioning operations from a header;
   parses a fourth parameter to identify a partitioning operation for a block from a bitstream;
   parses an operation to partition a block based on the third parameter and the fourth parameter; and
   decodes the partitioned block.

17. The decoding apparatus according to claim 16, wherein the plurality of block partitioning operations includes at least one of an operation to split a block into four blocks, an operation to split a block horizontally into two blocks, and an operation to split a block vertically into two blocks, and
the second encoding includes writing a block partitioning operation into a bitstream using the derived arrangement order.

18. The decoding apparatus according to claim 15, wherein the circuit, using the memory:
   parses one or more parameters related to the process to define plurality of motion vector candidates from a header;
   parses a motion vector candidate index for a block from a bitstream;
   derives a motion vector for the block using at least the plurality of motion vector candidates and the motion vector candidate index; and
   decodes a block using a motion compensation process based on the derived motion vector.

19. The decoding apparatus according to claim 18, wherein the one or more parameters is used for at least one of an operation to rearrange the order of the plurality of motion vector candidates, an operation to add or remove a motion vector candidate to/from the plurality of motion vector candidates, and an operation to select a plurality of motion vector candidates from a larger set of candidates.

20. The decoding apparatus according to claim 15, wherein the circuit, using the memory:
   parses a fifth parameter that selects one out of a plurality of decoding operations controlled by a sixth parameter, from a header;
   parses the sixth parameter for a block from a bitstream wherein the sixth parameter is used to control more than one decoding operation selectable by the fifth parameter; and
   performs a decoding operation for a block selected based on the fifth parameter and controlled by the sixth parameter.

21. The decoding apparatus according to claim 15, wherein the plurality of parameters include an inter prediction mode.

22. An encoding method, comprising:
writing a first parameter that specifies an arrangement order for a plurality of parameters which includes a second parameter, into a header, the plurality of parameters including a motion vector predictor and an intra most probable mode, and the second parameter being a reference picture index;
writing the second parameter for a block into a bitstream according to the arrangement order, the second parameter being a parameter related to inter prediction; and
performing encoding operation for a block using the second parameter,
wherein when writing the second parameter into the bitstream according to the arrangement order, the second parameter is written with less bits when the second parameter is positioned earlier in the arrangement order than when the second parameter is positioned later in the arrangement order, and
wherein when writing the second parameter into the bitstream according to the arrangement order, the second parameter is binarized into less binary symbols when the second parameter is positioned earlier in the arrangement order than when the second parameter is positioned later in the arrangement order.

23. A decoding method, comprising:
parsing a first parameter that specifies an arrangement order for a plurality of parameters which includes a second parameter, from a header, the plurality of parameters including a motion vector predictor and an intra most probable mode, and the second parameter being a reference picture index;
parsing the second parameter for a block from a bitstream according to the arrangement order, the second parameter being a parameter related to inter prediction; and
performing decoding operation for a block using the second parameter,
wherein when parsing the second parameter from the bitstream according to the arrangement order, the second parameter is written with less bits when the second parameter is positioned earlier in the arrangement order than when the second parameter is positioned later in the arrangement order, and wherein when parsing the second parameter from the bitstream according to the arrangement order, the second parameter is converted using less binary symbols when the second parameter is positioned earlier in the arrangement order than when the second parameter is positioned later in the arrangement order.

* * * * *